United States Patent
Seex

(10) Patent No.: US 12,551,353 B2
(45) Date of Patent: Feb. 17, 2026

(54) SPINAL PLATE SELECTION AND POSITIONING SYSTEM

(71) Applicant: Retrospine Pty Ltd, Sydney (AU)

(72) Inventor: Kevin Seex, Sydney (AU)

(73) Assignee: Retrospine Pty Ltd (AU)

( * ) Notice: Subject to any disclaimer, the term of this patent is extended or adjusted under 35 U.S.C. 154(b) by 734 days.

(21) Appl. No.: 17/233,265

(22) Filed: Apr. 16, 2021

(65) Prior Publication Data
US 2021/0369467 A1   Dec. 2, 2021

Related U.S. Application Data

(63) Continuation of application No. 17/114,299, filed on Dec. 7, 2020, now abandoned, which is a continuation of application No. 16/937,456, filed on Jul. 23, 2020, now abandoned, which is a continuation of application No. 16/812,146, filed on Mar. 6, 2020,
(Continued)

(51) Int. Cl.
| | |
|---|---|
| *A61F 2/44* | (2006.01) |
| *A61B 17/16* | (2006.01) |
| *A61B 17/17* | (2006.01) |
| *A61F 2/46* | (2006.01) |

(52) U.S. Cl.
CPC ........ *A61F 2/4455* (2013.01); *A61B 17/1633* (2013.01); *A61B 17/1757* (2013.01); *A61F 2/442* (2013.01); *A61F 2/4611* (2013.01)

(58) Field of Classification Search
CPC ...... A61F 2/4455; A61F 2/446; A61F 2/4465; A61F 2/447; A61F 2/4611; A61B 17/56
See application file for complete search history.

(56) References Cited

U.S. PATENT DOCUMENTS

| | | |
|---|---|---|
| 5,755,721 A | 5/1998 | Hearn |
| 5,954,722 A | 9/1999 | Bono |

(Continued)

FOREIGN PATENT DOCUMENTS

| | | |
|---|---|---|
| AU | 2012251944 | 12/2012 |
| EP | 1957009 | 9/2011 |

(Continued)

OTHER PUBLICATIONS

ROI-C LDR ROI-C Cervical Cage, ROI-C Surgical Technique LDR Medical. http://US.ldr.com/Products/Cerfical/ROIC%C2%AECervicalCage downloaded on May 23, 2015.

*Primary Examiner* — Ellen C Hammond
(74) *Attorney, Agent, or Firm* — Morriss O'Bryant Compagni Cannon, PLLC

(57) ABSTRACT

A spinal plate selection and positioning system is provided for use in a spinal fusion procedure. The system may comprise an elongated guide member that is removably securable to an interbody cage by a holding rod. An interbody plate may be aligned and positioned above the interbody cage installed in a disc space. A drill guide may also be aligned and positioned above the interbody plate. The drill guide may be utilized to drill pilot holes in the vertebrae defining the disc space. Fasteners to secure the interbody plate may also by installed using the drill guide. The use of the guide member ensures that the interbody plate is properly aligned and positioned with respect to the interbody cage.

40 Claims, 51 Drawing Sheets

Related U.S. Application Data now abandoned, which is a continuation of application No. 16/598,999, filed on Oct. 10, 2019, now abandoned, which is a continuation of application No. 16/428,564, filed on May 31, 2019, now abandoned, which is a continuation of application No. 16/237,565, filed on Dec. 31, 2018, now abandoned, which is a continuation of application No. 16/049,623, filed on Jul. 30, 2018, now abandoned, which is a continuation of application No. 15/908,610, filed on Feb. 28, 2018, now abandoned, which is a continuation of application No. PCT/IB2016/002025, filed on Aug. 29, 2016.

(60) Provisional application No. 62/212,536, filed on Aug. 31, 2015.

(56) References Cited

U.S. PATENT DOCUMENTS

| | | | |
|---|---|---|---|
| 6,328,738 B1 | 12/2001 | Suddaby | |
| 6,379,364 B1 | 4/2002 | Brace et al. | |
| 6,648,891 B2 | 11/2003 | Kim | |
| 6,932,820 B2 | 8/2005 | Osman | |
| 6,960,216 B2 | 11/2005 | Kolb et al. | |
| 7,097,645 B2 | 8/2006 | Michelson | |
| 7,118,573 B2 | 10/2006 | Michelson | |
| 7,166,111 B2 | 1/2007 | Kolb et al. | |
| 7,172,627 B2 | 2/2007 | Fiere et al. | |
| 7,488,327 B2 | 2/2009 | Rathbun et al. | |
| 7,588,599 B2 | 9/2009 | Sweeney | |
| 7,909,829 B2 | 3/2011 | Patel et al. | |
| 7,935,123 B2 | 5/2011 | Fanger et al. | |
| 7,955,361 B2 | 6/2011 | Kitchens | |
| 7,998,179 B2 | 8/2011 | Lindemann et al. | |
| 8,128,628 B2 | 3/2012 | Freid et al. | |
| 8,172,842 B2 | 5/2012 | Sasing | |
| 8,172,854 B2 * | 5/2012 | Blain | A61B 17/1728 606/86 A |
| 8,187,277 B2 | 5/2012 | Paul et al. | |
| 8,221,421 B2 | 7/2012 | Hearn | |
| 8,343,195 B2 | 1/2013 | Rathbun et al. | |
| 8,388,687 B2 | 3/2013 | Gimbel et al. | |
| 8,435,297 B2 * | 5/2013 | Zubok | A61F 2/4684 623/17.16 |
| 8,568,462 B2 | 10/2013 | Sixto, Jr. et al. | |
| 8,597,358 B2 | 12/2013 | Landry et al. | |
| 8,840,667 B1 * | 9/2014 | Tumialan | A61B 17/1728 623/17.11 |
| 2002/0004683 A1 | 1/2002 | Michelson | |
| 2002/0147450 A1 | 10/2002 | LeHuec et al. | |
| 2002/0183757 A1 | 12/2002 | Michelson | |
| 2003/0083667 A1 | 5/2003 | Ralph et al. | |
| 2004/0019353 A1 | 1/2004 | Freid et al. | |
| 2004/0092939 A1 | 5/2004 | Freid et al. | |
| 2005/0038444 A1 | 2/2005 | Binder, Jr. et al. | |
| 2005/0101960 A1 | 5/2005 | Fiere et al. | |
| 2005/0159813 A1 | 7/2005 | Molz, IV | |
| 2006/0189997 A1 | 8/2006 | Guenther et al. | |
| 2006/0200134 A1 | 9/2006 | Freid et al. | |
| 2007/0162013 A1 | 7/2007 | Jacene et al. | |
| 2007/0270965 A1 | 11/2007 | Ferguson | |
| 2008/0125781 A1 | 5/2008 | Hoffman et al. | |
| 2008/0294262 A1 * | 11/2008 | Levieux | A61F 2/4611 606/280 |
| 2009/0012529 A1 | 1/2009 | Blain et al. | |
| 2009/0024132 A1 * | 1/2009 | Blain | A61B 17/1728 606/96 |
| 2009/0177239 A1 | 7/2009 | Castro | |
| 2010/0228297 A1 | 9/2010 | Bray et al. | |
| 2011/0190892 A1 * | 8/2011 | Kirschman | A61F 2/4611 606/247 |
| 2012/0226319 A1 * | 9/2012 | Armstrong | A61B 17/808 606/279 |
| 2012/0232599 A1 | 9/2012 | Schoenly et al. | |
| 2012/0245689 A1 | 9/2012 | Gimbel et al. | |
| 2014/0316419 A1 * | 10/2014 | Perry | A61F 2/4611 606/86 A |
| 2015/0005879 A1 * | 1/2015 | Georges | A61F 2/447 623/17.11 |
| 2015/0100094 A1 | 4/2015 | Milz et al. | |
| 2016/0235448 A1 * | 8/2016 | Seex | A61B 17/808 |

FOREIGN PATENT DOCUMENTS

| | | | |
|---|---|---|---|
| EP | 2865347 | 4/2015 | |
| WO | WO2008034140 | 3/2008 | |
| WO | WO2008070863 | 6/2008 | |
| WO | WO2010107692 | 9/2010 | |
| WO | WO-2010107692 A1 * | 9/2010 | ......... A61B 17/1728 |
| WO | WO2013036687 | 3/2013 | |
| WO | WO2014188280 | 11/2014 | |
| WO | WO-2014188280 A2 * | 11/2014 | ......... A61B 17/1728 |
| WO | WO2017175024 | 10/2017 | |

\* cited by examiner

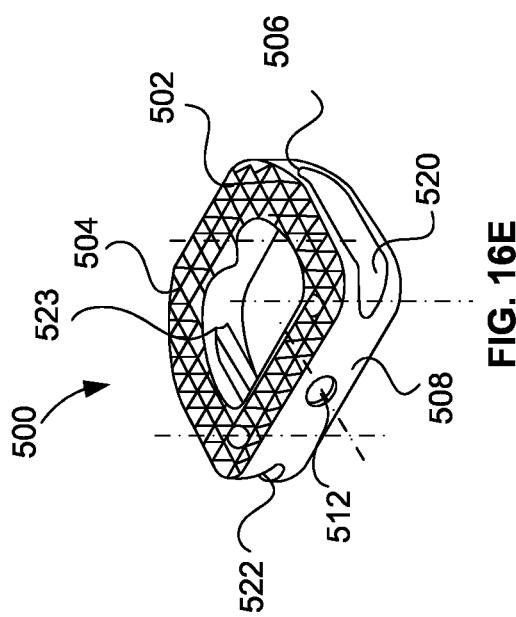
FIG. 16E
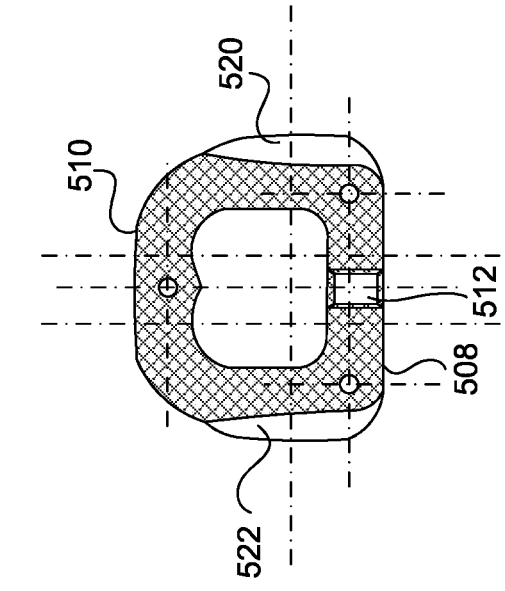
FIG. 16F
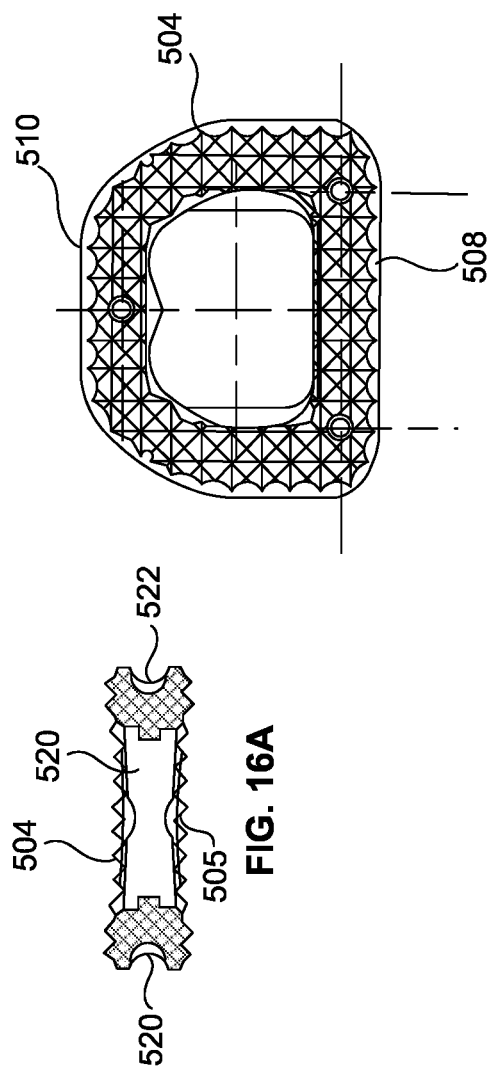
FIG. 16C
FIG. 16D
FIG. 16A
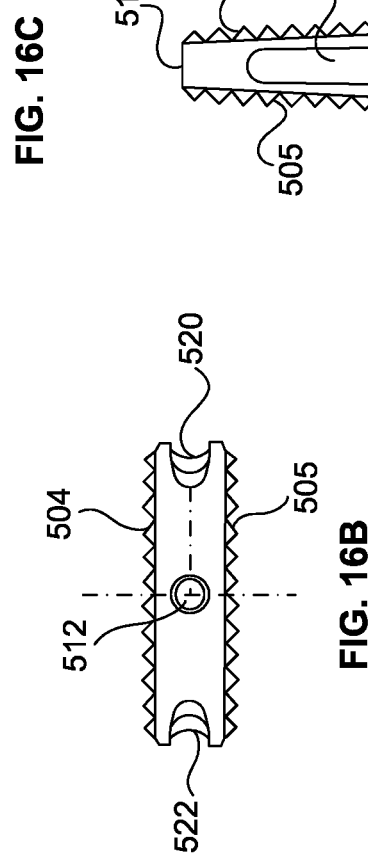
FIG. 16B

530

532

530  540C  532  538  544A  540B  539  544B  540A

SPINAL PLATE SELECTION AND POSITIONING SYSTEM

CROSS-REFERENCE TO RELATED APPLICATIONS

This application is a continuation of U.S. patent application Ser. No. 17/114,299, filed Dec. 7, 2020, which is a continuation of U.S. patent application Ser. No. 16/937,456, filed Jul. 23, 2020, which is a continuation of U.S. patent application Ser. No. 16/812,146, filed Mar. 6, 2020, which is a continuation of U.S. patent application Ser. No. 16/598,999, filed Oct. 10, 2019, which is a continuation of U.S. patent application Ser. No. 16/428,564, filed May 31, 2019, which is a continuation of U.S. patent application Ser. No. 16/237,565, filed Dec. 31, 2018, which is a continuation of U.S. patent application Ser. No. 16/049,623, filed Jul. 30, 2018, which is a continuation of U.S. patent application Ser. No. 15/908,610, filed Feb. 28, 2018, which is a continuation of International Application Serial No. PCT/IB2016/002025, with an international filing date of Aug. 29, 2016, which claims the benefit of U.S. Provisional Application No. 62/212,536, filed Aug. 31, 2015, entitled "SPINAL PLATE SELECTION AND POSITIONING SYSTEM," which are hereby incorporated by reference herein in their entirety, including but not limited to those portions that specifically appear hereinafter, the incorporation by reference being made with the following exception: In the event that any portion of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to medical devices, and more particularly, but not necessarily entirely, to medical implants and instrumentation utilized in spinal-fusion surgical procedures.

2. Description of Related Art

Spinal fusion surgery is often performed to reduce pain caused by aging or injury. Spinal fusion surgery typically involves fusing two or more vertebrae in the spinal column. Fusion of the vertebrae may be accomplished using a bone fixation device, such as an interbody plate. In particular, rigid interbody plates may be secured to the vertebrae. The interbody plates may stabilize the spinal column. Fasteners, such as bone screws, may be utilized to secure the interbody plates to the vertebrae. For this reason, interbody plates are generally rigid but may have some adjustability for sizing purposes. Rods may sometimes also be utilized to provide greater stabilization.

It is further known to use an interbody cage in conjunction with a spinal fusion procedure. In particular, an interbody cage may be implanted by press fit into the disc space between two adjacent vertebrae. (This, of course, may first require removal of the patient's natural disc.) In this regard, the use of an interbody cage has been found to reduce post-operative discomfort and pain. Interbody cages may take a wide variety of forms. For example, interbody cages may be formed from alloys or plastic. In some instances, interbody cages are packed with autologous bone material in order to promote fusion. That is, this supplementary bone material, such as an allograft or an autograft, may be used in conjunction with the patient's natural bone growth process to fuse the vertebrae. In other instances, interbody cages may be made entirely of, or partly of, either a human graft (allograft or autograft) or an animal graft (xenograft).

An interbody plate and an interbody cage may be utilized together. In this instance, the interbody plate may extend over a disc space containing the interbody cage. The interbody plate may then be secured to the two vertebrae defining the disc space using fasteners. An interbody plate is ideally positioned parallel to the longitudinal axis of the spine and symmetrically over the disc space. In practice, however, proper alignment and positioning of the interbody cage may be difficult to accomplish due to (i) narrow wounds which obscure surgical landmarks; (ii) blood or other tissue may obscure landmarks; (iii) the interbody plate itself may obscure landmarks; (iv) drill guides that are used to drill pilot holes may further obscure landmarks; and (v) the interbody plate may move prior to being secured without the surgeon being aware.

In the past, some techniques have been developed in an attempt to properly align and position interbody plates and interbody cages. One technique includes the use of a trial cage connected to a drill guide. In particular, the trial cage is temporarily installed into the disc space. The attached drill guide is then utilized to drill pilot holes in the adjacent vertebrae. The trial cage and drill guide are then removed and the interbody cage is implanted into the disc space. The plate is then positioned and fastened to the vertebrae using the pilot holes. This technique, however, has limitations. One limitation is that there is no assurance that the trial cage and the actual interbody cage are located in the same position. Another limitation is that there is no assurance that the interbody plate is positioned correctly with respect to the pilot holes. A further limitation is that the positioning of the interbody cage relative to the interbody plate is not controlled.

Another attempt to properly align and position interbody plates and interbody cages is taught by Fraser et al. (U.S. Patent Publication No. 2011/004253). Fraser teaches the use of an interbody plate that includes integral mating elements that are adapted to slidably engage an interbody cage. One draw back to Fraser's teachings is that there is no assurance that the interbody plate is centered over the interbody cage or that the cage is properly positioned in the disc space prior to the plate being secured.

Despite the advantages of known alignment and positioning techniques, improvements are still being sought. For example, many of the prior art devices cannot assure that an interbody plate and interbody cage are ideally positioned. The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 16a depicts a bottom view of an interbody cage according to an embodiment of the present disclosure.

FIG. 16b depicts a top view of an interbody cage according to an embodiment of the present disclosure.

FIG. 16c depicts a front view of an interbody cage according to an embodiment of the present disclosure.

FIG. 16d depicts a side view of an interbody cage according to an embodiment of the present disclosure.

FIG. 16e depicts a perspective view of an interbody cage according to an embodiment of the present disclosure.

FIG. 16f depicts a cross-sectional front view of an interbody cage according to an embodiment of the present disclosure.

DETAILED DESCRIPTION

Figure 1:
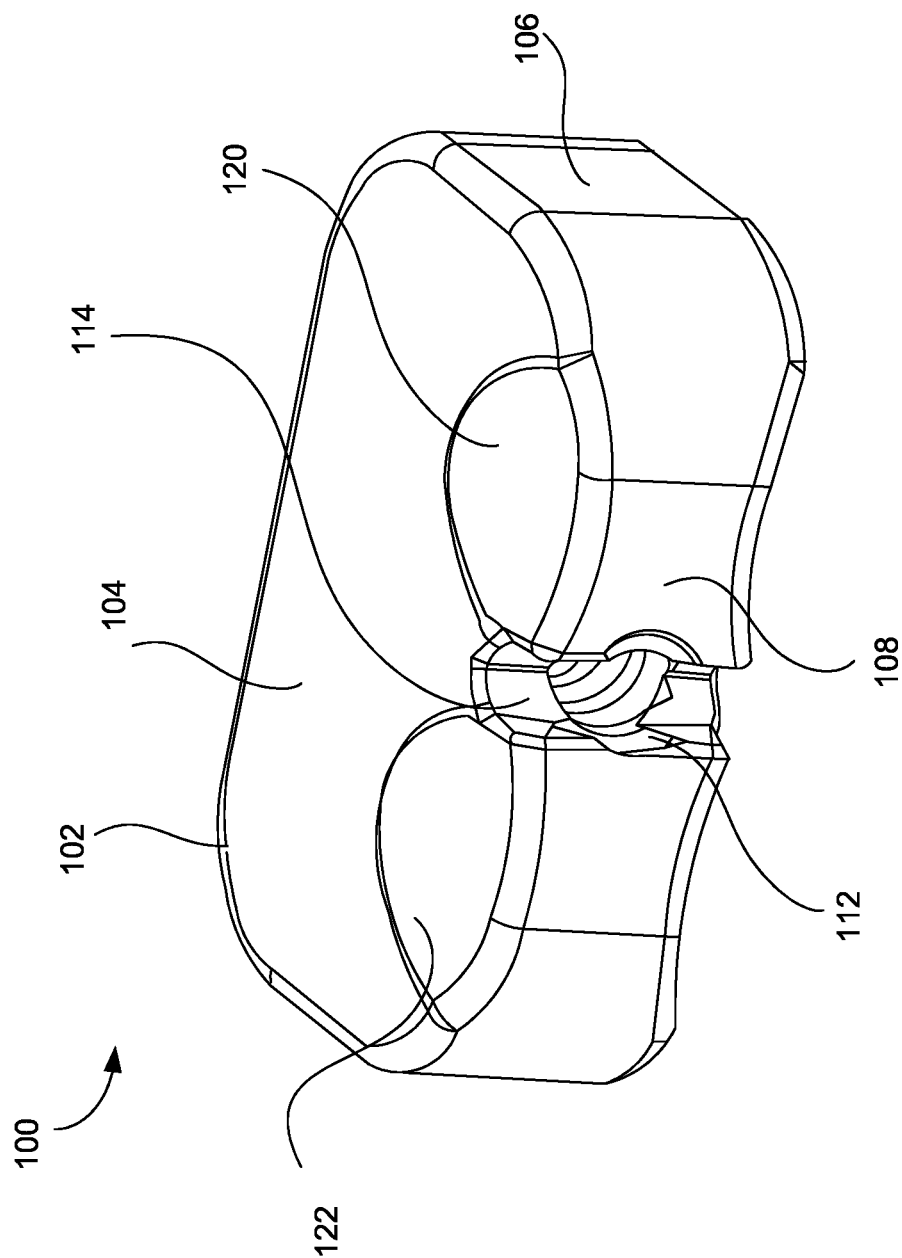
FIG. 1 is a perspective view of an interbody cage according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

Applicant has discovered a spinal plate selection and positioning system for use in a spinal fusion surgery. In an embodiment, the system may include a guide member removably attached to an interbody cage by a holding rod. After the interbody cage has been installed into a disc space defined between a first vertebra and a second vertebra using the holding rod, the guide member may be utilized to align and position an interbody plate over the disc space. The guide member may center the interbody plate over the interbody cage and also prevent the interbody plate from rotating about a longitudinal axis of the guide member. Thus, the guide member may align and position the interbody plate with reference to the interbody cage since the guide member and interbody cage are coupled.

A drill guide may then also be aligned and positioned over the disc space using the guide member. Pilot holes may then be drilled in the vertebrae defining the disc space using the drill guide. Using the drill guide, fasteners may be installed to secure the interbody plate to the vertebrae. The drill guide may then be removed from the guide member and the guide member may be detached from the interbody cage, now secured in the disc space beneath the interbody plate.

Referring now to FIG. 1, there is depicted an exemplary interbody cage 100 pursuant to an embodiment of the present disclosure. The interbody cage 100 may include a body member 102. The body member 102 may have a superior surface 104 and an inferior surface 105 (not explicitly visible in FIG. 1, but understood to be opposite of the superior surface 104). A sidewall 106 may circumscribe the body member 102. The sidewall 106 may extend between the superior surface 104 and the inferior surface 105. The sidewall 106 may define, for the body member 102, a proximal surface 108 and a distal surface 110 (not explicitly visible in FIG. 1, but understood to be opposite of the proximal surface 108).

A threaded bore 112 may be formed in the proximal surface 108 of the sidewall 106. As will be explained in more detail hereinafter, the threaded bore 112 may engage a threaded end of a holding rod that is utilized to position and implant the interbody cage 100 in a disc space defined between two adjacent vertebrae. A key slot 114 may also be formed in the proximal surface 108 of the sidewall 106. The key slot 114 may extend from the superior surface 104 to the inferior surface 105 of the body member 102. In an embodiment, the key slot 114 may pass through the threaded bore 112. As will be explained in more detail hereinafter, the key slot 114 may engage key members extending from a guide member.

Formed in the superior surface 104 of the body member 102 may be grooves or cutouts 120 and 122. As will be explained in detail hereinafter, the grooves 120 and 122 may form reliefs in the superior surface 104 to allow passage of fasteners utilized to secure an interbody plate to vertebrae in a spinal column. The grooves 120 and 122 may extend from the proximal surface 108 of the sidewall 106 toward the distal surface 110 of the sidewall 106. The grooves 120 and 122 may taper upwards, in the superior direction, as they extend toward the distal surface 110 such that they taper out.

One of the grooves 120 and 122 may be disposed on either side of the threaded bore 112. It will be appreciated that the inferior surface 105 of the body member may contain grooves similar in size, shape and location to the grooves 120 and 122 in the superior surface 104. In an embodiment, the grooves in the inferior surface 105 may differ in size, shape, and location to the grooves 120 and 122 in the superior surface 104.

Although the body member 102 is depicted as a solid member, it will be appreciated that the body member 102 may take a wide variety of configurations according to embodiments of the present disclosure. In an embodiment, the body member 102 may comprise a hollow interior portion for receiving a bone graft. Further, the body member 102 may be formed from a wide range of biocompatible materials as is known to one having ordinary skill.

Pursuant to an embodiment of the present disclosure, the present disclosure may provide a plurality of interbody cages of varying height, i.e., the distance between the superior surface 104 and the inferior surface 105, to accommodate disc spaces of varying sizes. In an embodiment, a surgeon may trial fit multiple interbody cages until the right fit is obtained.

Figure 2:
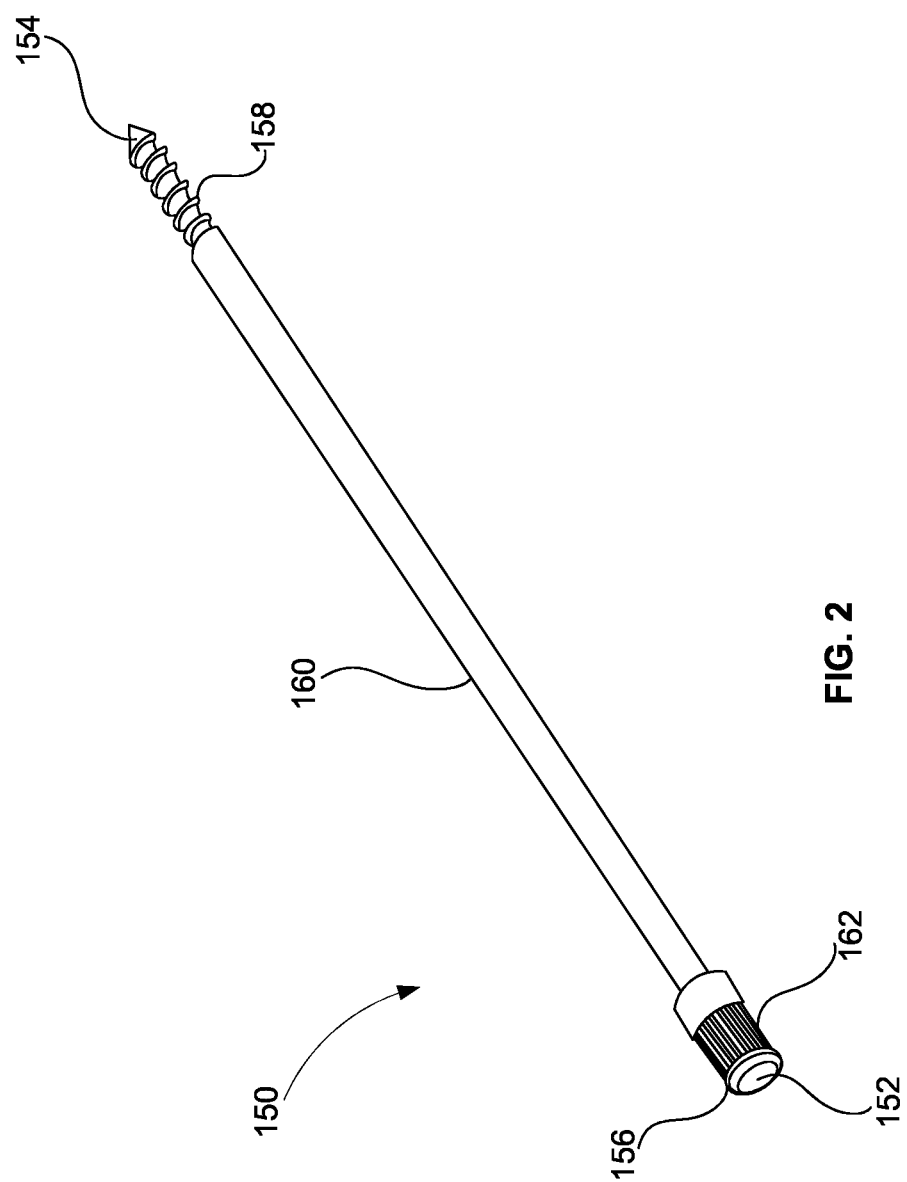
FIG. 2 is a perspective view of a holding rod according to an embodiment of the present disclosure.

Referring now to FIG. 2, there is depicted a holding rod 150 pursuant to an embodiment of the present disclosure. The holding rod 150 may extend from a proximal end 152 to a distal end 154. A knob 156 may be located at the proximal end 152 of the holding rod 150. The distal end 154 may include a plurality of threads 158. A shaft 160 may extend between the proximal end 152 and the distal end 154. The knob 156 may include grip enhancing means 162, such as serrations. In an embodiment, the threads 158 on the distal end 154 of the holding rod 150 are configured and adapted to engage the threaded bore 112 of the interbody cage 100 (see FIG. 1). It will be appreciated that the holding rod 150 may be utilized to facilitate the installation of the interbody cage 100 into a disc space between two adjacent vertebrae.

The present disclosure further contemplates other means of securing the holding rod 150 to the interbody cage 100. In an embodiment, the holding rod 150 may engage the interbody cage 100 by a snap or press fit. In an embodiment, the holding rod 150 may include an expandable head, activated proximally, that engages a receiving portion in the interbody cage 100 when the head is expanded. In an embodiment, the holding rod 150 may engage the interbody cage 100 using a twist-lock mechanism.

Figure 3:
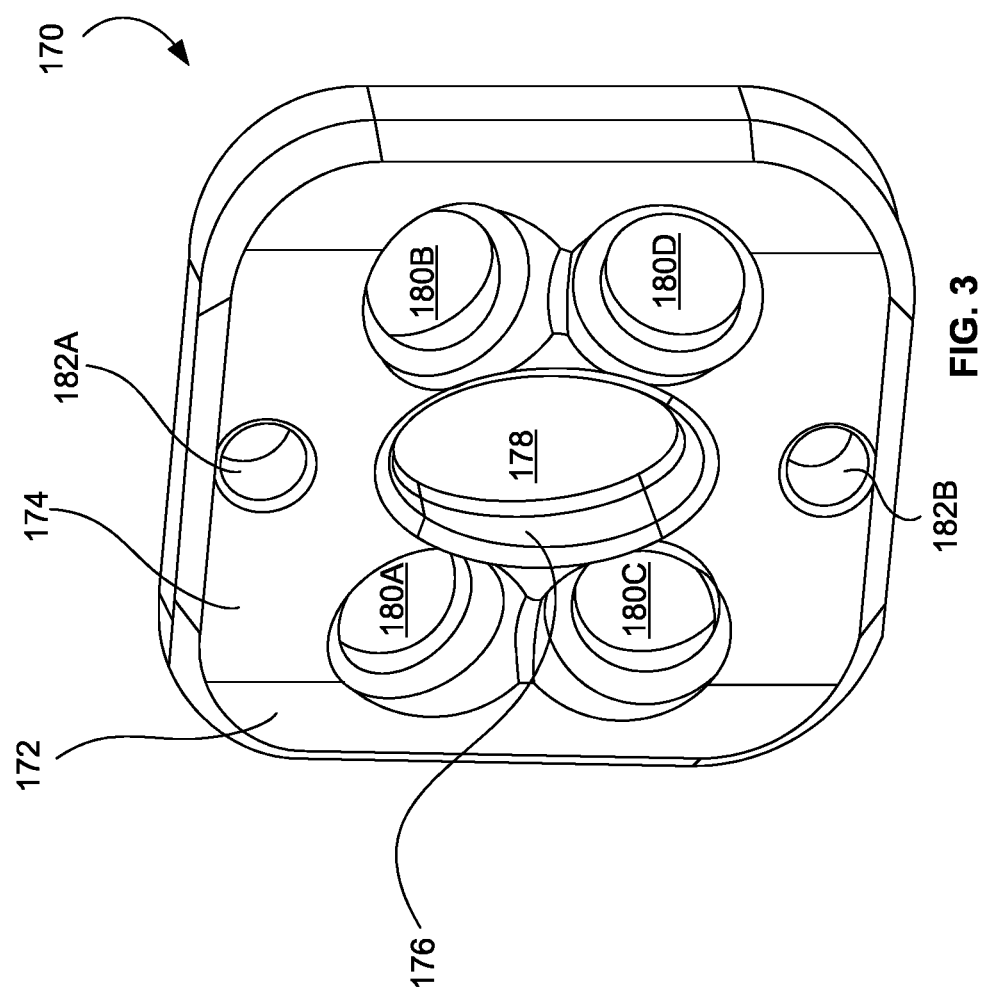
FIG. 3 is a perspective view of an interbody plate according to an embodiment of the present disclosure.

Referring now to FIG. 3, there is depicted an interbody plate 170 pursuant to an embodiment of the present disclosure. The plate 170 may include a body member 172 according to an embodiment of the present disclosure. The body member 172 may include a proximal end 174 and a distal end 175 (not explicitly visible in FIG. 3, but the distal end 175 is understood to be on the opposite side of the interbody plate 170 from the proximal end 174). In an embodiment, the body member 172 of the plate 170 is substantially rectangular in shape.

An inner surface 176 of the body member 172 may define a guide hole 178. In an embodiment, the guide hole 178 may be located in the center of the body member 172. The guide hole 178 may extend from the proximal end 174 to the distal end 175. In an embodiment, the guide hole 178 may be noncircular. In an embodiment, the guide hole 178 may be oval.

The body member 172 may further comprise fastener holes 180A, 180B, 180C and 180D. Holes 180A and 180B may define a first set of holes and holes 180C and 180D may define a second set of holes. The first set of holes 180A, 180B may allow fasteners (not explicitly shown) to secure the plate 170 to a first vertebra (not explicitly shown) and the second set of holes 180C, 180D may allow fasteners (not explicitly shown) to secure the plate 170 to a second vertebra (not explicitly shown). One of the first set of holes 180A, 180B may be disposed on either side of the guide hole 178. One of the second set of holes 180C, 180D may be disposed on either side of the guide hole 178. The first set of holes 180A, 180B may be angled. The second set of holes 180C, 180D may be angled.

The body member 172 may further comprise a pair of guide holes 182A and 182B. The guide holes 182A and 182B may facilitate the positioning of a drill guide over the holes 180A-180D as will be explained in detail hereinafter.

Figure 4:
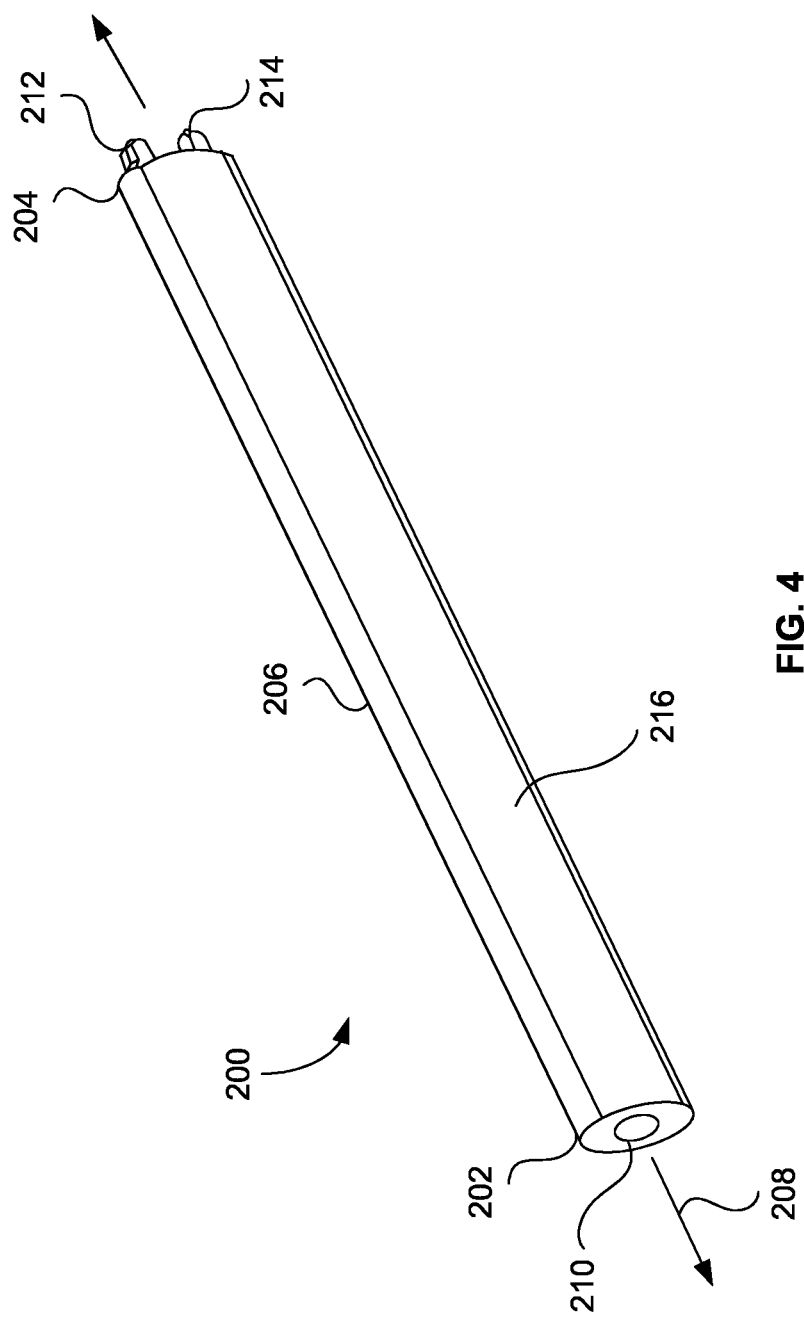
FIG. 4 is a perspective view of a guide member according to an embodiment of the present disclosure.

Referring now to FIG. 4, there is depicted an elongated guide member 200 pursuant to an embodiment of the present disclosure. The guide member 200 may have a proximal end 202 and a distal end 204. A body portion 206 of the guide member 200 may extend between the proximal end 202 and the distal end 204. The body portion 206 may extend along a longitudinal axis 208. A cannulation 210 may extend from the proximal end 202 to the distal end 204.

In an embodiment, the guide member 200 may include key members 212 and 214 extending from the distal end 204. The key members 212 and 214 are configured and adapted to engage the key slot 114 of the interbody cage 100 (see FIG. 1) as will be explained in more detail hereinafter. It will be appreciated that the use of the key members 212 and 214, and the key slot 114, prevent the elongated guide member 200 from rotating about its longitudinal axis 208 when removably secured to the interbody cage 100.

In an embodiment, the cannulation 210 is configured and adapted to allow the shaft 160 of the holder rod 150 (see FIG. 2) to be inserted into, and pass through, the guide member 200. In an embodiment, a cross section of the guide member 200 in a plane perpendicular to its longitudinal axis 208 may be noncircular. In an embodiment, the cross section is oval. The guide member 200 may have an outer surface 216. In an embodiment, the holding rod 150 and the guide member 200 may be formed as a single unit rather than as a two piece assembly as shown.

Figure 5:
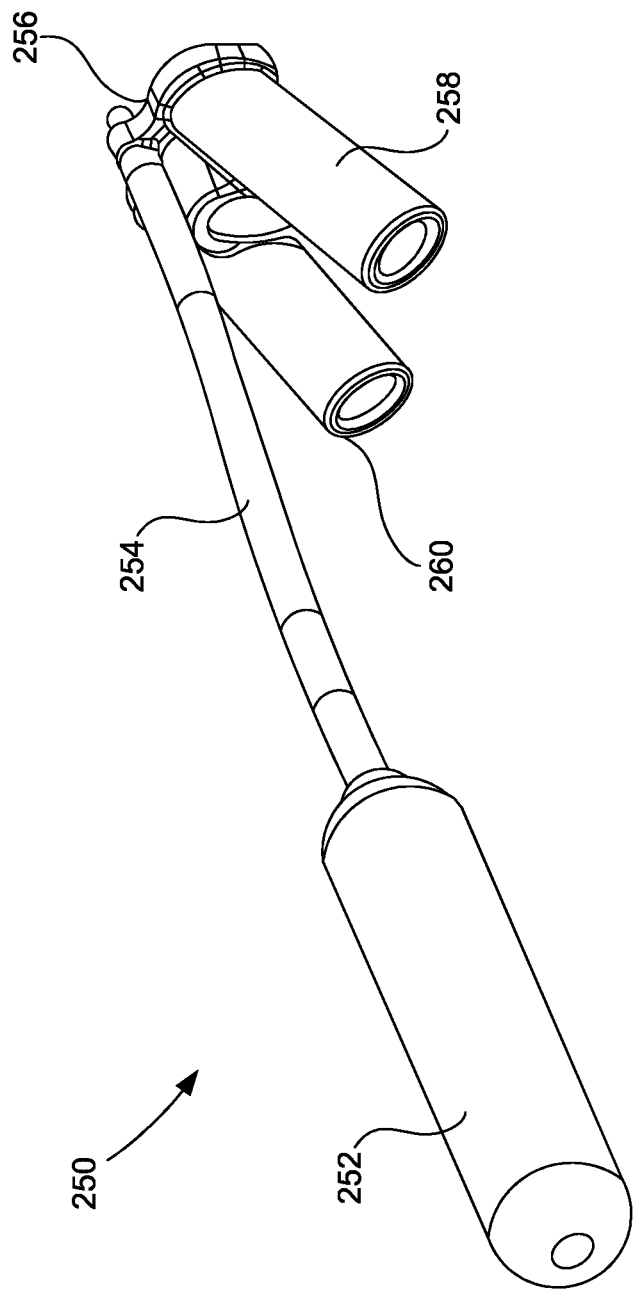
FIG. 5 is a perspective view of a drill guide according to an embodiment of the present disclosure.
Figure 6:
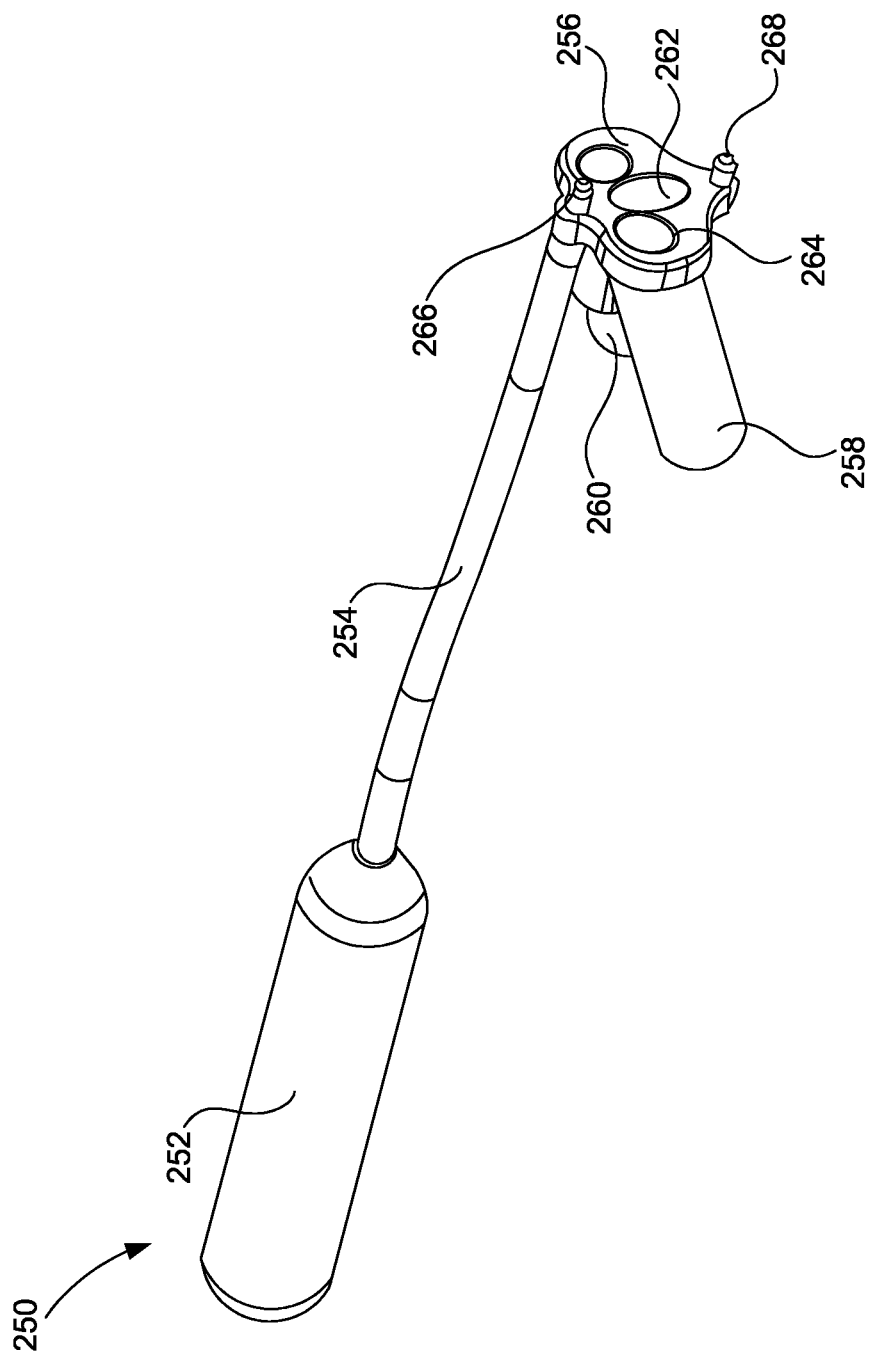
FIG. 6 is another perspective view of the drill guide shown in FIG. 5 according to an embodiment of the present disclosure.

Referring now to FIGS. 5 and 6, there is depicted a drill guide 250 pursuant to an embodiment of the present disclosure. The drill guide 250 may comprise a handle 252. A shaft 254 may extend from the handle 252. A base member 256 may be attached to the distal end of the shaft 254. A first guide tube 258 and a second guide tube 260 may extend from the base member 256. It will be appreciated that the first guide tube 258 and the second guide tube 260 may each include a hollow passageway for allowing the passage of a drill bit and fasteners through the base member 256. Further, while the drill guide 250 is shown with two guide tubes, it will be appreciated that, pursuant to embodiments of the present disclosure, the drill guide 250 may comprise a single guide tube or any number of guide tubes.

As perhaps best seen in FIG. 6, an inner surface 262 of the base member 256 may define a guide hole 264. In an embodiment, the guide hole 264 is noncircular. In an embodiment, the guide hole 264 is oval. As will be explained in further detail hereinafter, the guide hole 264 may receive the guide member 200 to align and position the drill guide 250 over a disc space. Further, extending from the base member 256 may be a first guide post 266 and a second guide post 268. As will be explained in more detail hereinafter, the first guide post 266 and the second guide post 268 may align the drill guide 250 with respect to the interbody plate 170.

Figure 7:
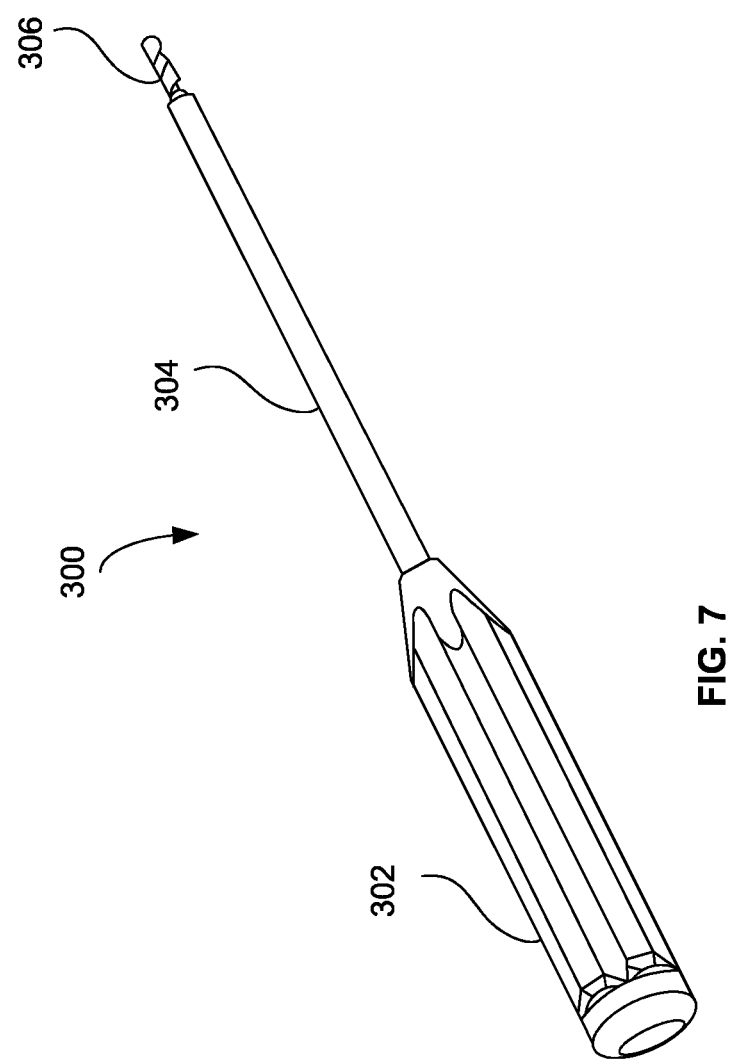
FIG. 7 is a perspective view of another drill according to an embodiment of the present disclosure.

Referring now to FIG. 7, there is depicted a surgical drill 300 according to an embodiment of the present disclosure. The drill 300 may be a manually operated drill. In an embodiment, the drill 300 may be a powered surgical drill.

The drill 300 may comprise a handle 302. A shaft 304 may extend from the handle. It will be appreciated that the diameter of the shaft 304 may allow the shaft 304 to snugly fit in the passageways in the hollow tube guides 258 and 260 of the drill guide 250. Disposed on the end of the shaft 304 may be a drill bit 306. The drill bit 306 may be utilized to drill pilot holes in vertebrae as is known to one having ordinary skill.

Figure 8:
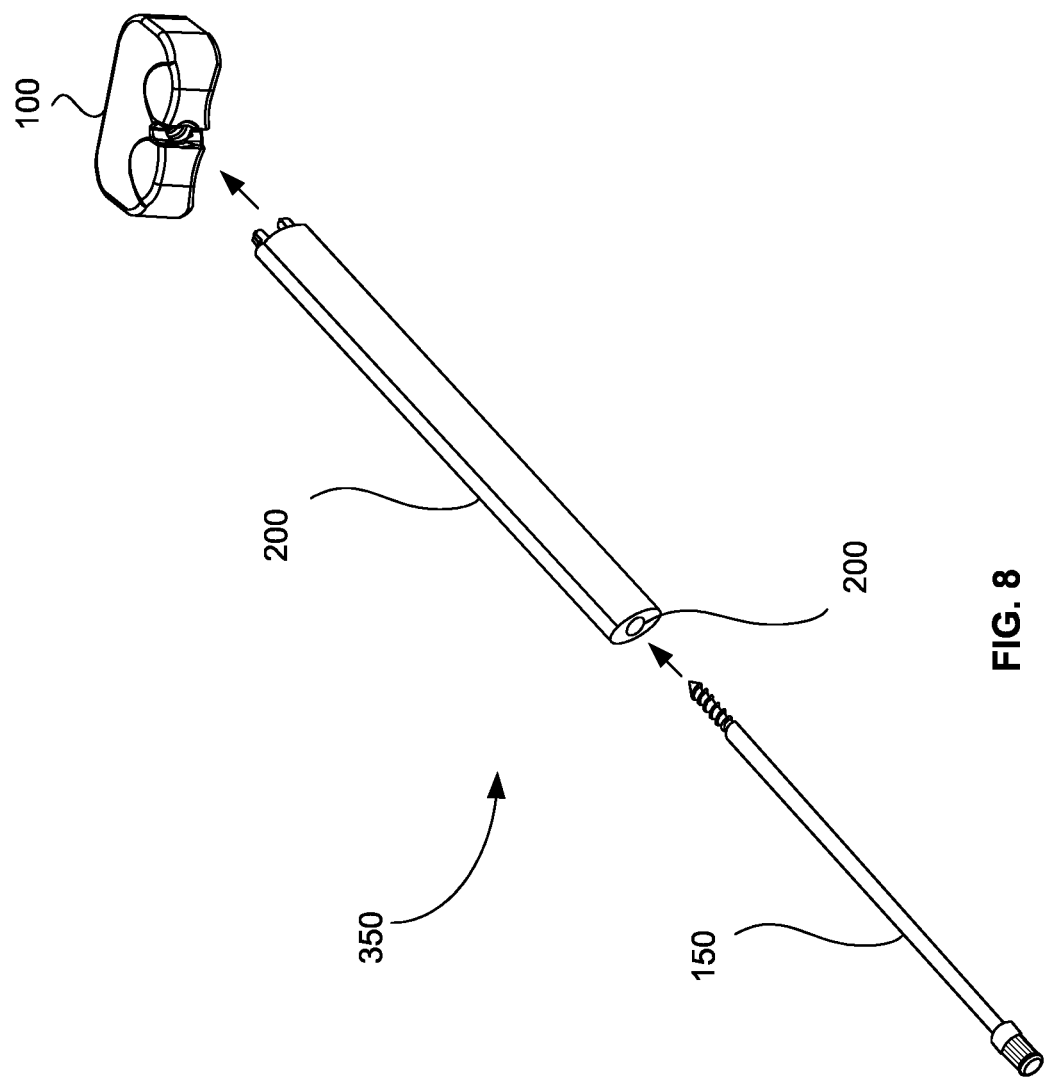
FIG. 8 is an exploded view of an assembly according to an embodiment of the present disclosure.
Figure 9:
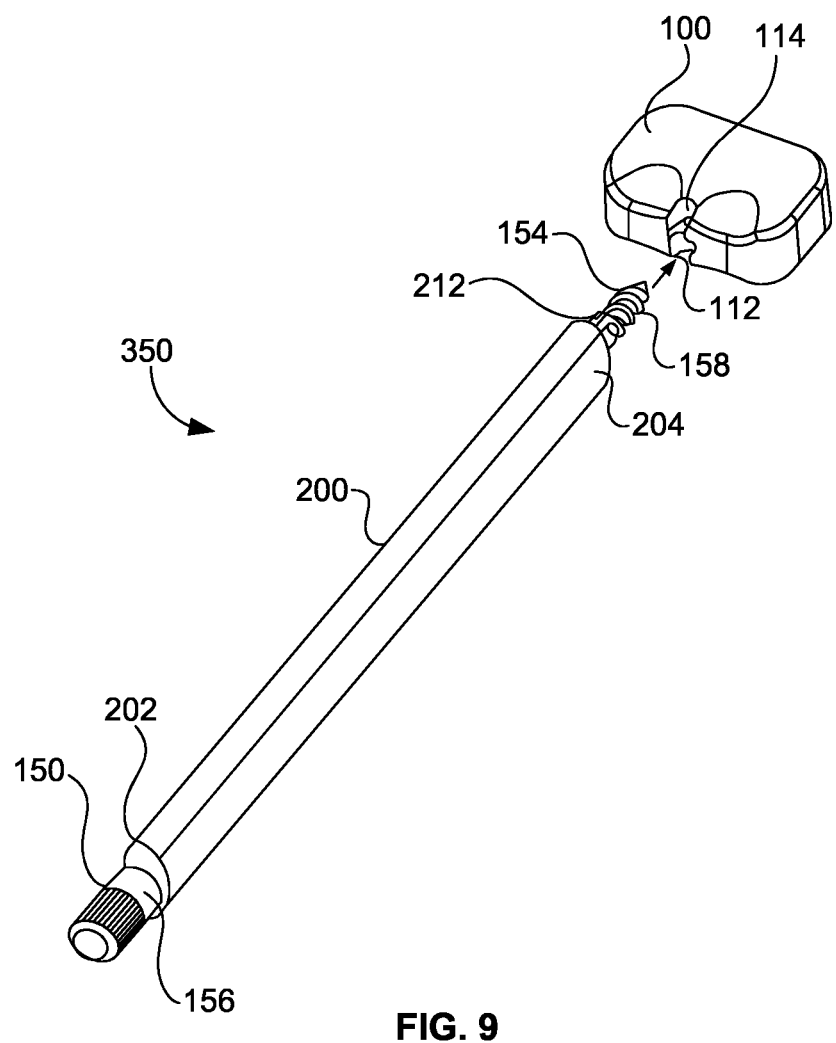
FIG. 9 is a partially exploded view of the assembly shown in FIG. 8 according to an embodiment of the present disclosure.
Figure 10:
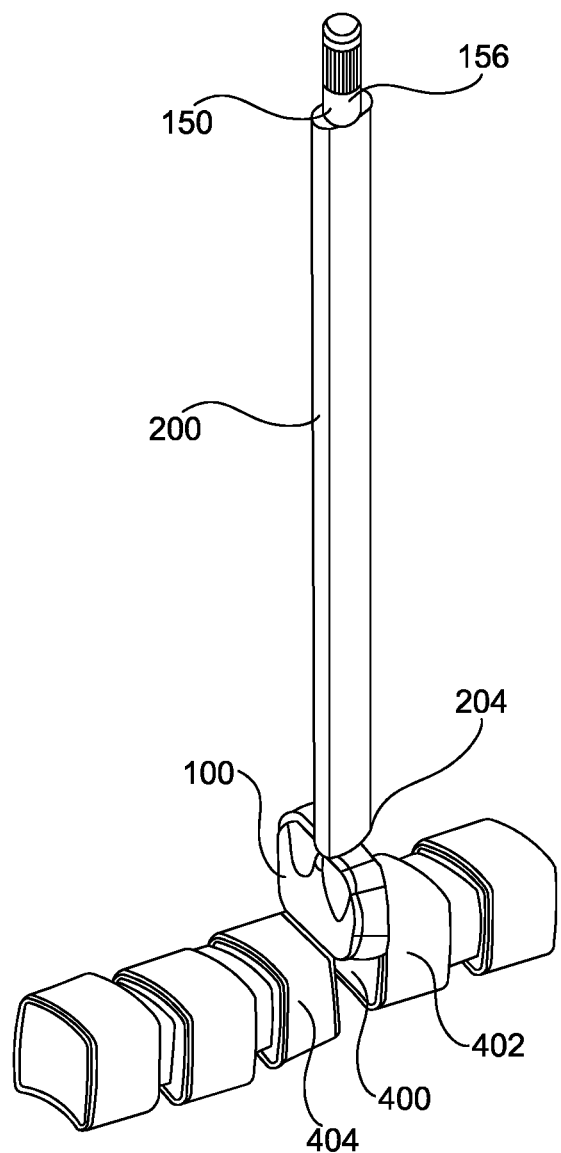
FIG. 10 depicts a procedure for installing an interbody cage in a disc space according to an embodiment of the present disclosure.

Referring now to FIGS. 8, 9, and 10, there is depicted an exploded view of a system 350 for spinal fixation. The system 350 may comprise the interbody cage 100, the guide member 200, and the holding rod 150. As perhaps best viewed in FIG. 9, the holding rod 150 is installed into the cannulation 210 of the guide member 200. The proximal end 202 of the guide member 200 may abut against the knob 156 of the holding rod 150. The length of the holding rod 150 may be sufficient such that the threads 158 on the distal end 154 extend from the distal end 204 of the guide member 200.

As perhaps best observed in FIG. 10, the distal end 154 of the holding rod 150 is installed into the threaded bore 112 of the interbody cage 100. The knob 156 may provide a grip for a surgeon to grasp and position the interbody cage 100. In addition, the knob 156 may receive hits from an impaction tool, such as a hammer, to impact the interbody cage 100. The distal end 204 of the guide member 200 may serve as a depth gauge when installing the interbody cage 100 by abutting against two vertebrae defining the disc space.

Further, the key members 212 and 214 extending from the distal end 204 of the guide member 200 may engage the key slot 114 of the interbody cage 100. It will be appreciated by those of ordinary skill that the key slot engagement positively locates the guide member 200 with respect to the interbody cage 100 and prevents the guide member 200 from moving or rotating about the holding rod 150 or its longitudinal axis 208.

Referring now to FIGS. 10-14, there is depicted a spinal fusion procedure according to an embodiment of the present disclosure. As previously described, the holding rod 150 may be utilized to removably secure the guide member 200 to the interbody cage 100 as observed in FIG. 10. This may be done prior to installing the interbody cage 100 into the disc space.

A disc space 400 defined between a first vertebra 402 and a second vertebra 404 may be prepared by removing the natural disc as is known to those having ordinary skill. Next, the interbody cage 100 may be positioned into the disc space 400 by a surgeon using the holding rod 150 having the guide member 200 disposed thereon. The interbody cage 100 may be impacted into the disc space 400. Once the interbody cage 100 has been installed in the disc space 400, it may be positioned using the holding rod 150. The depth of the cage 100 in the disc space may be determined by the distal end 204 of the guide member 200, which may abut against the first vertebra 402 and the second vertebra 404. It will be appreciated that the guide member 200 may extend outside of the body of the patient when attached to the interbody cage 100.

Figure 11:
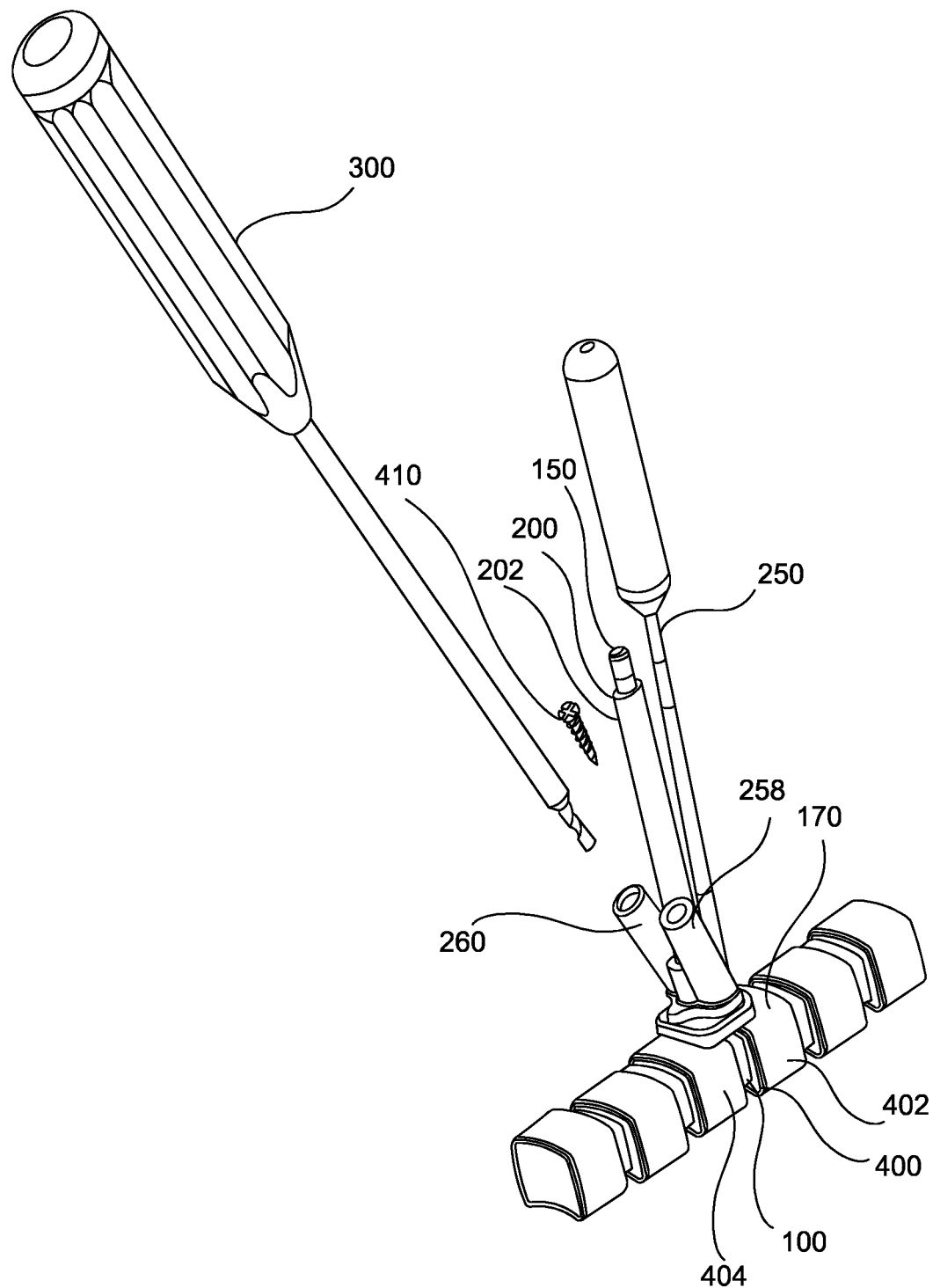
FIG. 11 depicts a procedure for drilling pilot holes and installing plate fasteners in a vertebra according to an embodiment of the present disclosure.

As seen in FIG. 11, with the interbody cage 100 positioned in the disc space 400, the interbody plate 170 is aligned and positioned over the disc space 400 using the guide member 200. In particular, the proximal end 202 of the guide member 200 is installed into the guide hole 178 of the interbody plate 170. The plate 170 is then slid down the length of guide member 200 into position over the disc space 400.

The guide member 200 may position and align the interbody plate 170 above the interbody cage 100. In particular, the inner surface 176 of the plate 170 that defines the guide hole 178 may engage the outer surface 216 of the guide member 200. It will be appreciated that the noncircular nature of the cross section of the guide member 200 prevents the plate 170 from rotating or otherwise becoming misaligned over the disc space 400.

Once the interbody plate 170 is positioned over the disc space 400, the drill guide 250 may be installed onto the guide member 200 and positioned over the interbody plate 170. In particular, the guide hole 264 of the drill guide 250 is installed onto the proximal end 202 of guide member 200 and slid into position over the interbody plate 170. At this point, the first guide post 266 and the second guide post 268 of the base member 256 of the drill guide 250 may engage the pair of guide holes 182A and 182B of the interbody plate 170 to ensure that the drill guide 250 is properly positioned with respect to the plate 170 and the cage 100.

In an embodiment, the drill guide 250 and the plate 170 may be preassembled such that they can be installed as one unit over the guide member 200. Various methods of securing the drill guide 250 and the plate 170 together are envisioned and fall within the scope of the present disclosure. In an embodiment, the guide posts 266 and 268 may have a press or snap fit into the guide holes 182A and 182B of the plate 170. In an embodiment, the guide posts 266 and 268 may threadably engage the guide holes 182A and 182B of the plate 170. In an embodiment, the drill guide 250 and the plate 170 may be magnetically coupled. Thus, the present disclosure contemplates various engagements means to secure the drill guide 250 and the plate 170 together such that they can be inserted together. Once the fasteners are installed to secure the plate 170, as explained below, the drill guide 250 may be detached from the plate 170 to allow the drill guide 250 to be removed.

Once the drill guide 250 is in place and locked with the plate 170, the drill 300 may be utilized to drill pilot holes in the vertebrae 402 and 404. In particular, with the guide tubes 258 and 260 of the drill guide 250 aligned over the first set of holes 180A, 180B, the drill 300 may be utilized to drill two pilot holes in the vertebra 402. It will be appreciated that the drill bit 306 passes through the holes 180A and 180B in the plate 170. Further, as the diameter of the shaft 304 of the drill 300 is just slightly smaller than the diameter of the guide tubes 258 and 260 of the drill guide 250, the bit 306 will be properly aligned. Once the pilot holes have been created, and before the drill guide 250 is removed, fasteners 410 may be installed into the guide tubes 258 and 260 to secure the plate 170 to the first vertebra 402.

Figure 12:
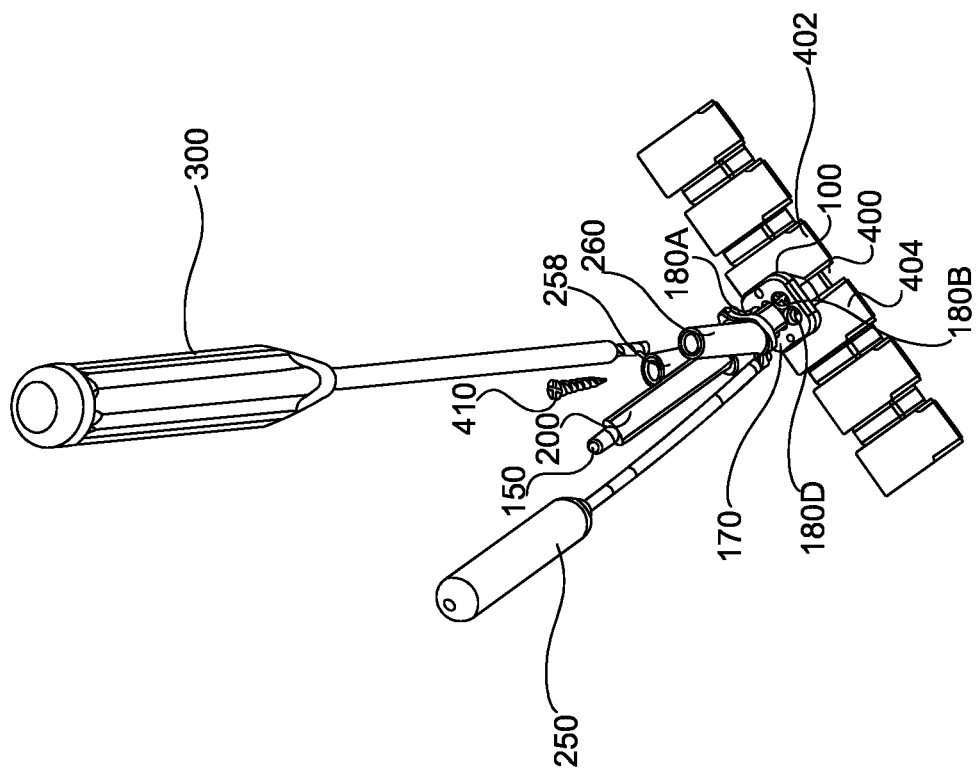
FIG. 12 depicts a procedure for drilling pilot holes and installing plate fasteners in a vertebra according to an embodiment of the present disclosure.
Figure 13:
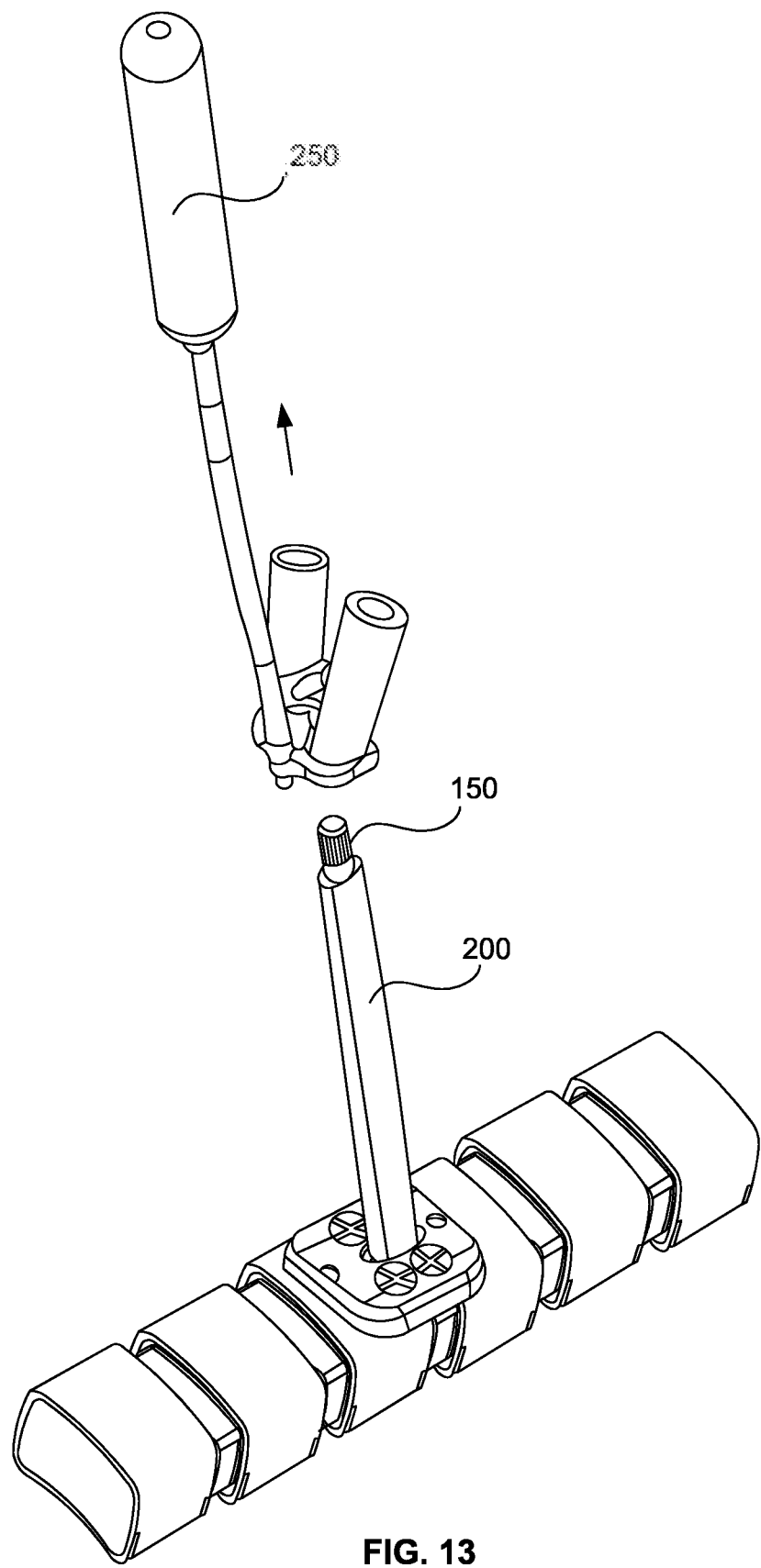
FIG. 13 depicts a procedure for removing a drill guide according to an embodiment of the present disclosure.
Figure 14:
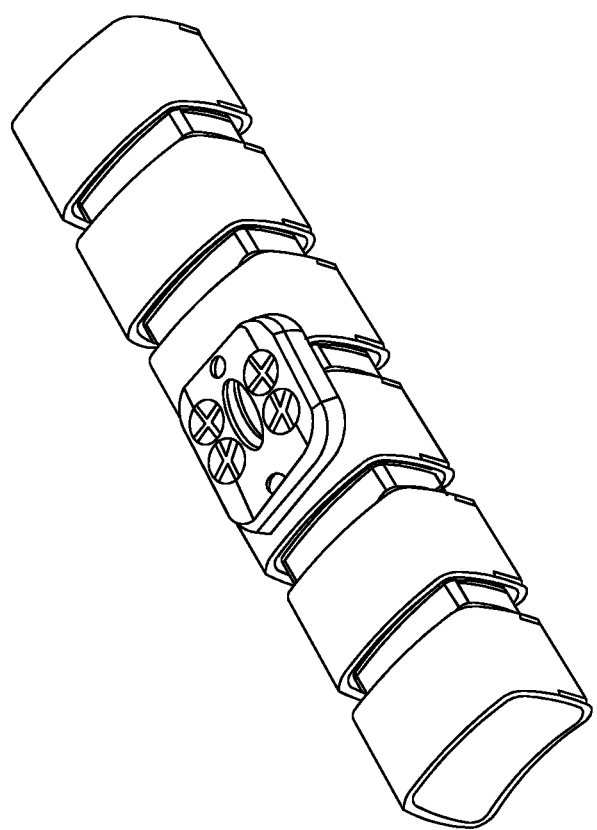
FIG. 14 depicts an installed interbody plate and interbody cage according to an embodiment of the present disclosure.
Figure 15:
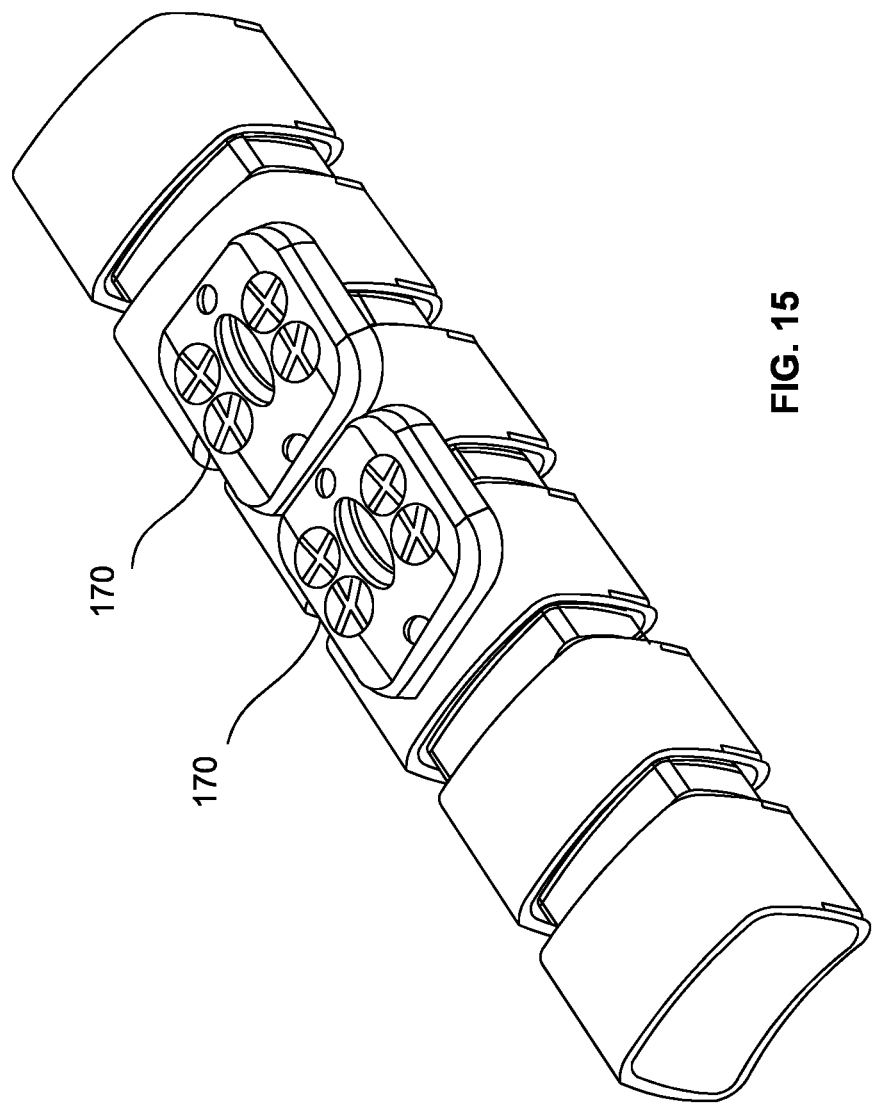
FIG. 15 depicts a pair of installed interbody plates and interbody cages according to an embodiment of the present disclosure.

As seen in FIG. 12, once the fasteners 410 have been installed into the first set of holes 180A, 180B in the first vertebra 402, the drill guide 250 may be removed from the guide member 200, reoriented by 180 degrees, and then reinstalled onto the guide member 200. The drill 300 may then be utilized to drill pilot holes in the vertebra 404. Again fasteners 410 may be utilized to secure the interbody plate 170 to the vertebra 404 through the second set of holes 180C, 180D in the plate 170. With the interbody plate 170 secured, the drill guide 250 and the elongated guide member 200 may be removed as shown in FIGS. 13 and 14. In particular, to remove the elongated guide member 200, the threads 158 on the distal end 154 of the guide member 200 may be unscrewed from the threaded bore 112 of the interbody cage 100. As shown in FIG. 15, multiple interbody plates 170 may be utilized to fuse several levels of vertebrae of a patient.

It will be appreciated that although the engagement that removably secures the guide member 200 to the interbody cage 100 has been described herein as a threaded engagement between the holding rod 150 and the threaded bore 112, that any engagement that removably secures the guide member 200 to the interbody cage 100 falls within the scope of the present disclosure. Further, it will be appreciated that the grooves in the superior surface 104 and the inferior surface 105 of the body member 102 of the interbody cage 100 allow the fasteners utilized to secure the interbody plate 170 to pass within the grooves.

It will be appreciated that it is a distinct advantage of the present disclosure to accurately position the interbody plate 170 above a vertebral gap. This accurate positioning of the plate 170 may allow the length of the interbody plate 170 to be kept to a minimum, which may allow the use of multiple plates 170 at multiple adjacent levels in the spine as shown in FIG. 15. This feature may have biomechanical advantages and improve fusion rates over single long plates. It also means that where access is limited, such as in minimally invasive procedures, the more easily small plates can be selected and positioned without fear the screws will damage or move a cage installed between the vertebral space.

Further, it will be appreciated that using the plate 170 would mean that the bone fasteners may cut into the cage 100 without the grooves in the superior and inferior surfaces of the cage 100 (see FIG. 1). In an embodiment, the grooves are positioned to align with the shortest plates possible for any given size of cage so that even with a very short plate, the fasteners will not cut the cage.

In an embodiment, the plate 170 may be utilized as a buttress plate that is only secured to a single vertebra and whose sole function is prevent back out of a cage. It will be appreciated that this may be useful where a second stage adjustment of the relative position of the vertebrae is desired and would be limited by having fasteners installed into both vertebrae. Such a buttress plate may have one or two screws, but again correct alignment and ease of placement would be helpful using the concepts of the present invention.

Referring now to FIG. 16, there is depicted an exemplary interbody cage 500 pursuant to an embodiment of the present disclosure. The interbody cage 500 may include a body member 502. The body member 502 may have a superior surface 504 and an inferior surface 505. A sidewall 506 may circumscribe the body member 502. The sidewall 506 may extend between the superior surface 504 and the inferior surface 505. The sidewall 506 may define, for the body member 502, a proximal surface 508 and a distal surface 510.

A threaded bore 512 may be formed in the proximal surface 508 of the sidewall 506. As will be explained in more detail hereinafter, the threaded bore 512 may engage a threaded end of a holding rod that is utilized to position and implant the interbody cage 500 in a disc space defined between two adjacent vertebrae.

Formed in the sidewall 506 of the body member 502 may be grooves or cutouts 520 and 522. In alternative embodiments, the grooves 520 and 522 may be holes. As will be explained in detail hereinafter, the grooves 520 and 522 may form receiving slots in the sidewall 506 to allow passage of legs or guide posts utilized to place and secure the cage 500 between the desired vertebra in a spinal column. The grooves 520 and 522 may extend from the proximal surface 508 of the sidewall 506 toward the distal surface 510 of the sidewall 506. The grooves 520 and 522 may be substantially parallel to one another or taper outwards, in opposing lateral directions, as they extend toward the distal surface 510 such that they taper outwardly. In another embodiment, the groove 520 and 522 may also be formed as holes, configured to receive the legs or guide post discussed below in more detail.

Body member 502 also includes a cavity 523 which can be configured to receive can contain bone graft material to facilitate fusion of adjacent vertebra. Alternatively, the body member 502 can also be configured as a solid member or other desired configurations. Further, the body member 502 may be formed from a wide range of biocompatible materials as is known to one having ordinary skill.

Interbody cage 500 may be formed of varying height, i.e., the distance between the superior surface 504 and the inferior surface 505, and the distance between the proximal end 508 and the distal end 510, to accommodate disc spaces of varying sizes. In an embodiment, a surgeon may trial fit multiple interbody cages until the right fit is obtained.

Figure 17B:
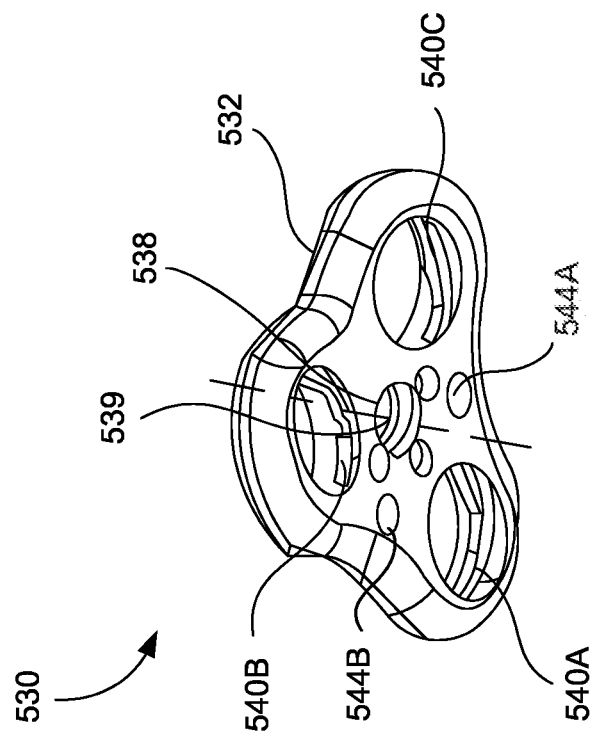
FIG. 17b depicts a perspective view of an interbody plate according to an embodiment of the present disclosure.
Figure 17A:
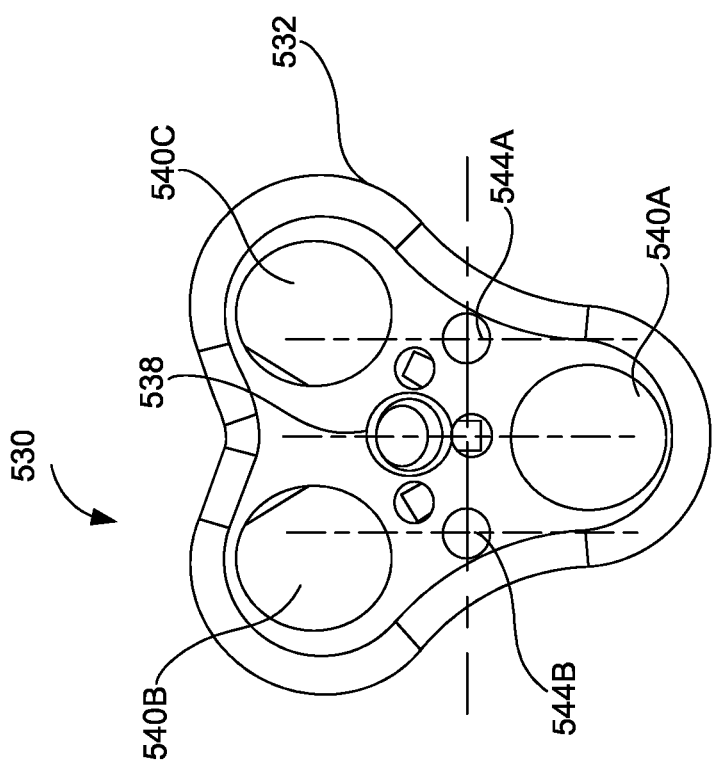
FIG. 17a depicts a bottom view of an interbody plate according to an embodiment of the present disclosure.
Figure 17C:
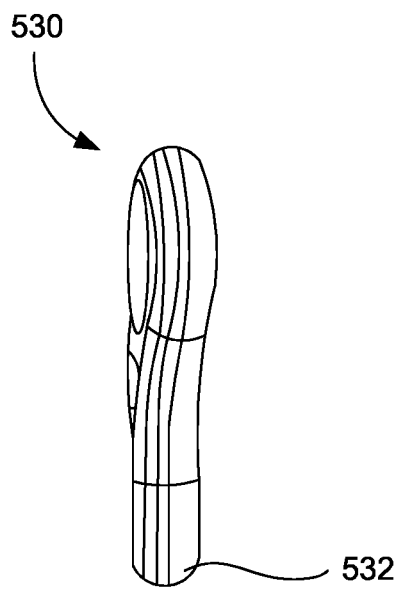
FIG. 17c depicts a side view of an interbody plate according to an embodiment of the present disclosure.
Figure 17D:
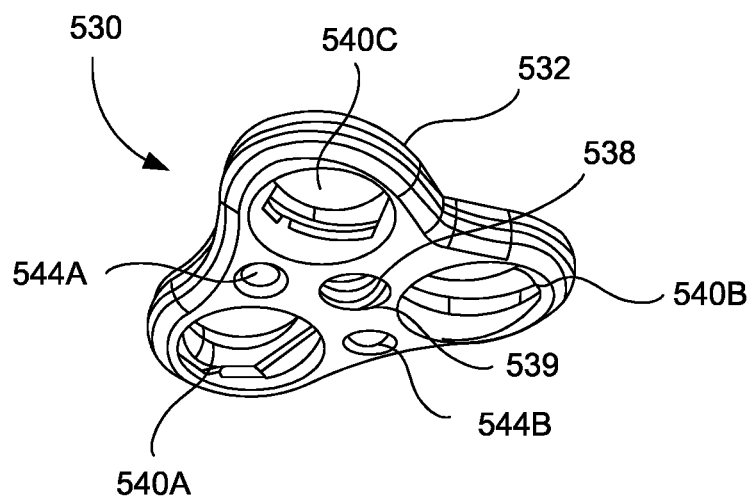
FIG. 17d depicts a perspective view of an interbody plate according to an embodiment of the present disclosure.
Figure 17E:
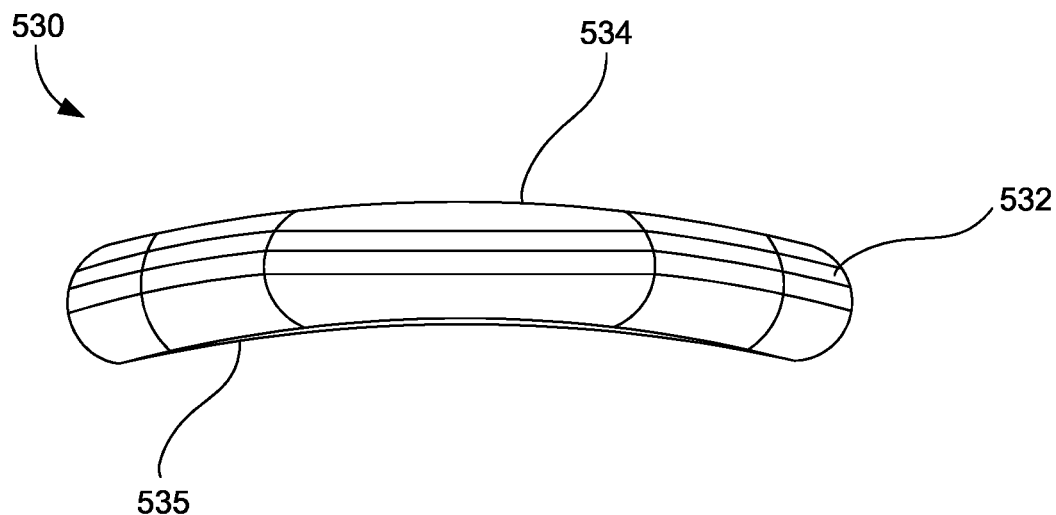
FIG. 17e depicts a side view of an interbody plate according to an embodiment of the present disclosure.

Referring now to FIGS. 17a-17f, there is depicted an interbody plate 530 pursuant to an embodiment of the present disclosure. The plate 530 may include a body member 532 according to an embodiment of the present disclosure. The body member 532 may include a proximal surface 534 and a distal surface 535. As shown in FIG. 17e, the proximal surface 534 has a generally convex curvature and the distal surface 535 has a corresponding concave surface. The proximal surface 534 and the distal surface 535 may have a radius of curvature of 26 mm, or they can be formed with a smaller or larger radius of curvature. The body member 532 maintains a substantially uniform thickness throughout the curvature of the distal and proximal surfaces 534 and 535. The thickness of the plate 530 may be 2.2 mm, or alternatively, the thickness may be increased or decreased if desired. The curvatures of the proximal and distal surfaces 534 and 535 help the plate 530 conform more closely to the anatomical shape of a patient's spine and vertebrae, facilitating a more secure fit to the desired vertebra and a more compact profile, which can reduce obstruction and irritation to the patient.

Figure 17F:
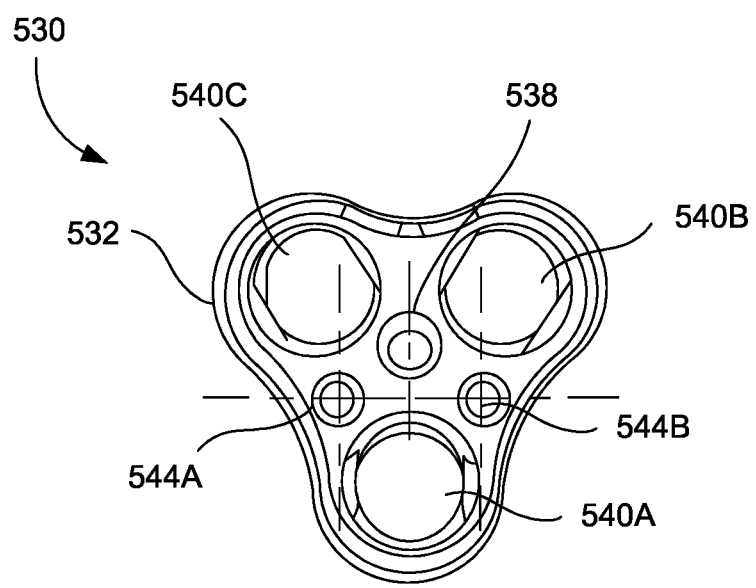
FIG. 17f depicts a top view of an interbody plate according to an embodiment of the present disclosure.
Figure 18B:
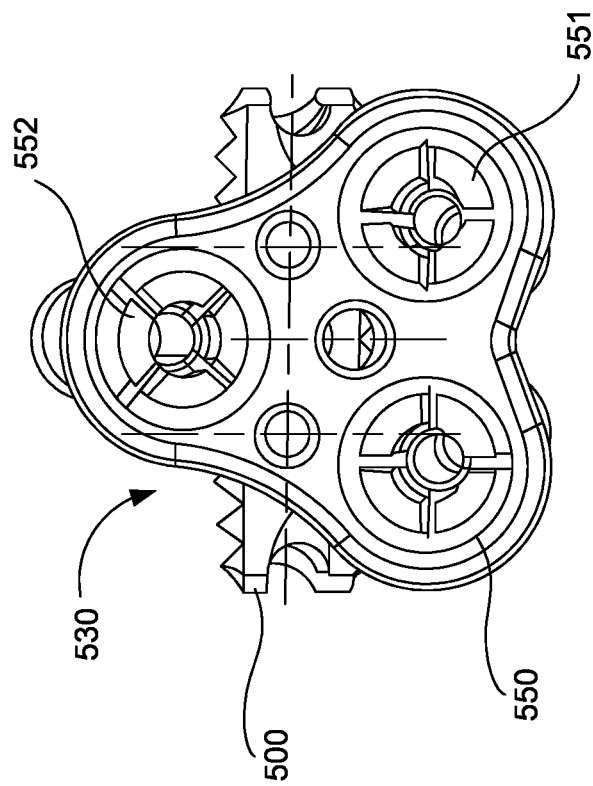
FIG. 18b depicts a top view of an assembled combination of an interbody cage and an interbody plate according to an embodiment of the present disclosure.
Figure 18A:
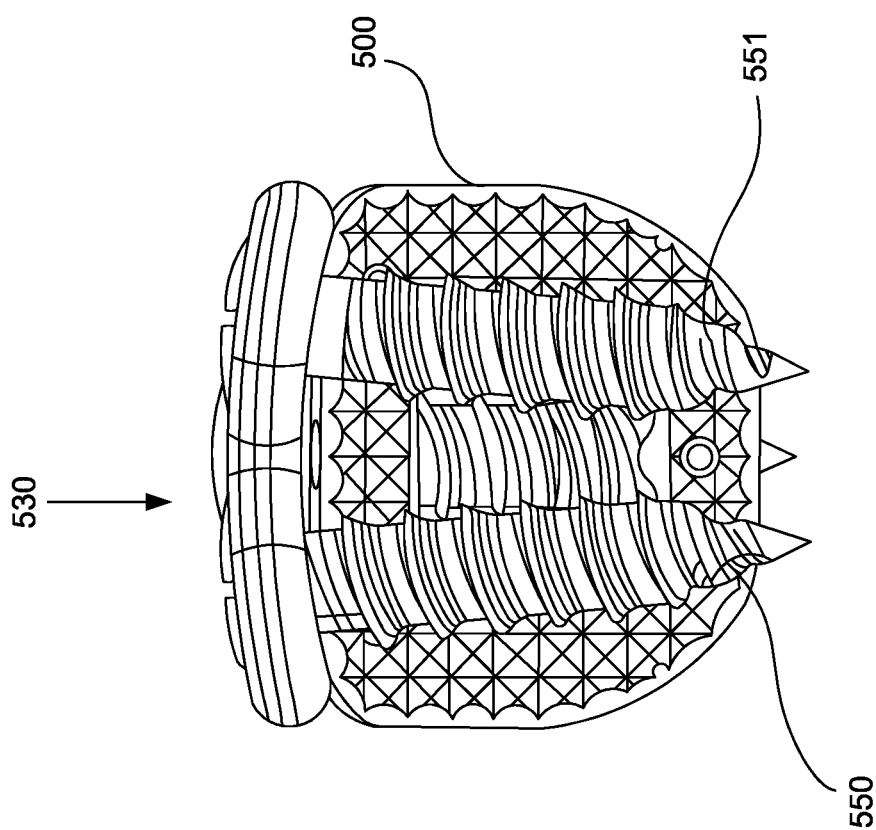
FIG. 18a depicts a front view of an assembled combination of an interbody cage and an interbody plate according to an embodiment of the present disclosure.
Figure 18D:
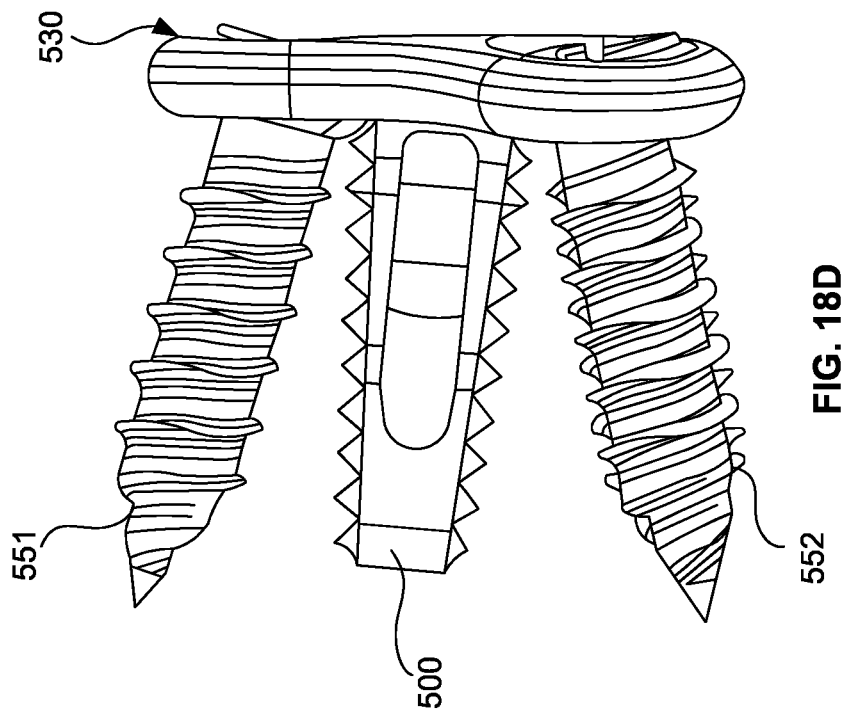
FIG. 18d depicts a side view of an assembled combination of an interbody cage and an interbody plate according to an embodiment of the present disclosure.
Figure 18C:
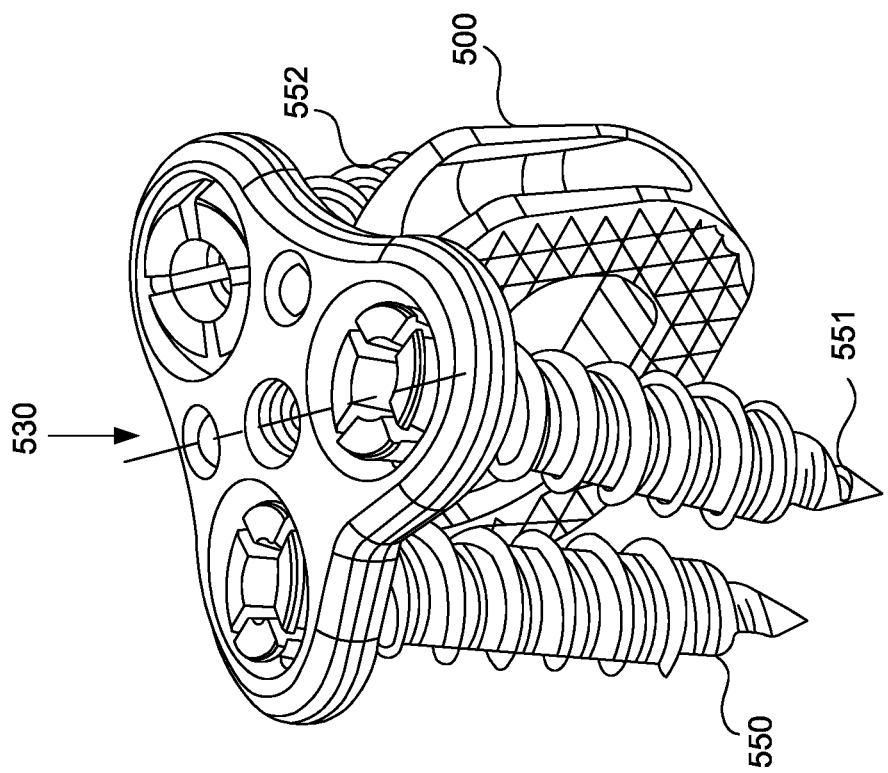
FIG. 18c depicts a perspective view of an assembled combination of an interbody cage and an interbody plate according to an embodiment of the present disclosure.
Figure 18F:
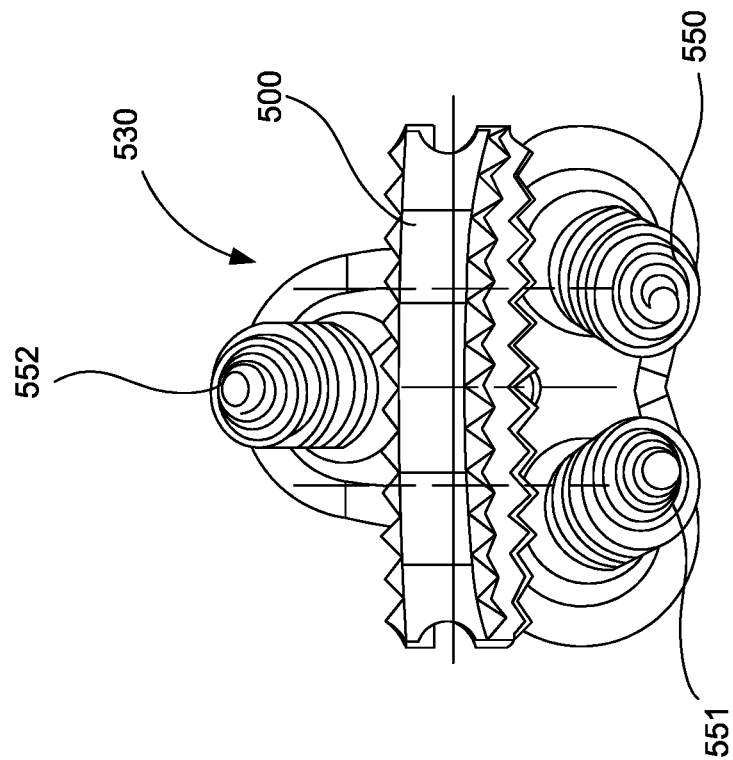
FIG. 18f depicts a bottom view of an assembled combination of an interbody cage and an interbody plate according to an embodiment of the present disclosure.
Figure 18E:
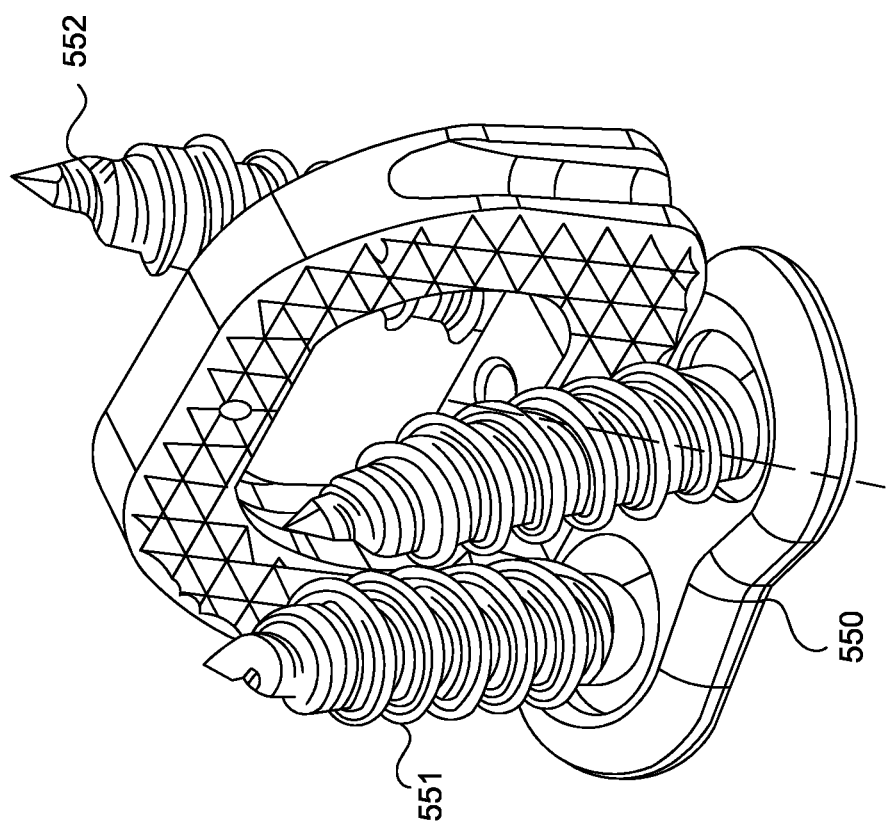
FIG. 18e depicts a perspective view of an assembled combination of an interbody cage and an interbody plate according to an embodiment of the present disclosure.

In an embodiment, the body member 532 of the plate 530 has a generally triangular shape, as shown in FIGS. 17a and 17f. The body member 532 can also include a bore 538 that may extend entirely through the body member 532, and the bore 538 can be substantially centrally located with respect to the body member 532. In another embodiment, the bore 538 can extend through the proximal surface 534 without extending all the way through the distal surface 535. The bore 538 may include an internal thread 539 which can threadedly engage a positioning tool or instrument. In another embodiment, the bore 538 may be noncircular.

The body member 532 may further include fastener holes 540A, 540B and 540C. Holes 540A, 540B and 540C may be substantially equidistant from one another around a general periphery of the body member 532. The holes 540A, 540B and 540C may allow at least one of fasteners 542A, 542B and 542C, shown in FIGS. 17a-17f to secure the plate 530 to a first vertebra (not explicitly shown) and also allow at least one of the fasteners 542A, 542B and 542C to secure the plate 530 to a second vertebra (not explicitly shown). At least one of the holes 540A, 540B and 540C may be disposed on a first side the bore 538 and at least one of the holes 540A, 540B and 540C may be disposed on a second side the bore 538. In an embodiment, the holes 540A, 540B and 540C may be angled with respect to the proximal and distal surfaces 534 and 535 of the body member 532.

The body member 532 may also include a pair of guide holes 544A and 544B. The guide holes 544A and 544B may facilitate the positioning of a drill guide over the holes 540A-540C as will be explained in detail hereinafter.

FIGS. 18a-18f, illustrate an exemplary embodiment of how the cage 500 and the plate 530 may be oriented with respect to one another, when secured to adjacent vertebrae with fasteners 550, 551 and 552. The adjacent vertebrae are not shown in FIGS. 18a-18f to more clearly show the relative orientations of the cage 500, plate 530 and fasteners 550, 551, 552. When the plate 530 is secured to the desired adjacent vertebrae, the fasteners 550, 551 and 552 can be driven through respective holes 540A, 540B and 540C, at predetermined angles to ensure secured attachment of the plate 530 to the adjacent vertebrae and over the cage 500.

Referring now to FIGS. 19a-19d, there is depicted an elongated guide member 600 pursuant to an embodiment of the present disclosure. The elongated guide member 600 may comprise a handle 602. A first shaft 604 may extend from the handle 602. The first shaft 604 may include slot or hollowed portion 606 which can allow a drill or other desired instrument to pass through without damaging the shaft 604. The slot 606 may be oblong and extend a majority of the length of the shaft 604. Alternatively, the slot 606 may be smaller in size, extending only a minority of the length of the first shaft 604, and may be formed of any desired shaped.

Figure 19A:
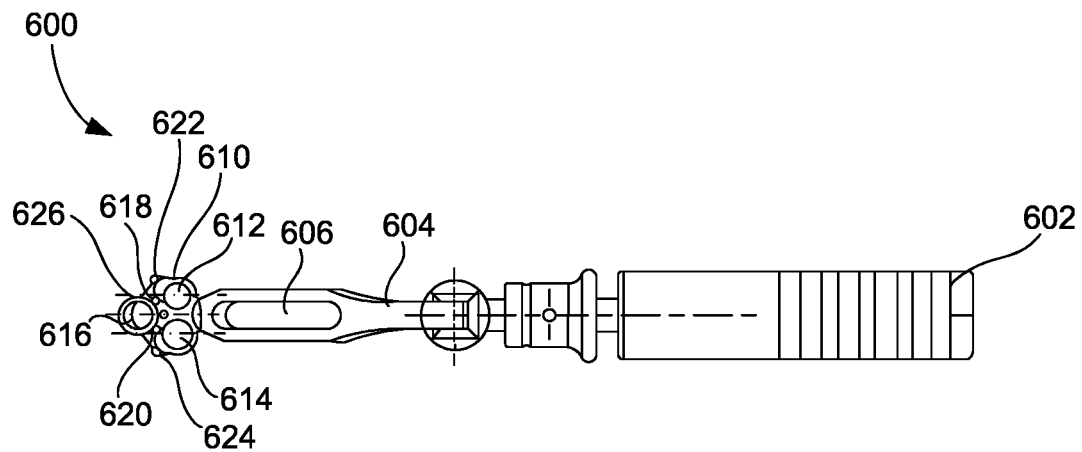
FIG. 19a depicts a bottom view of an elongated guide member according to an embodiment of the present disclosure.
Figure 19B:
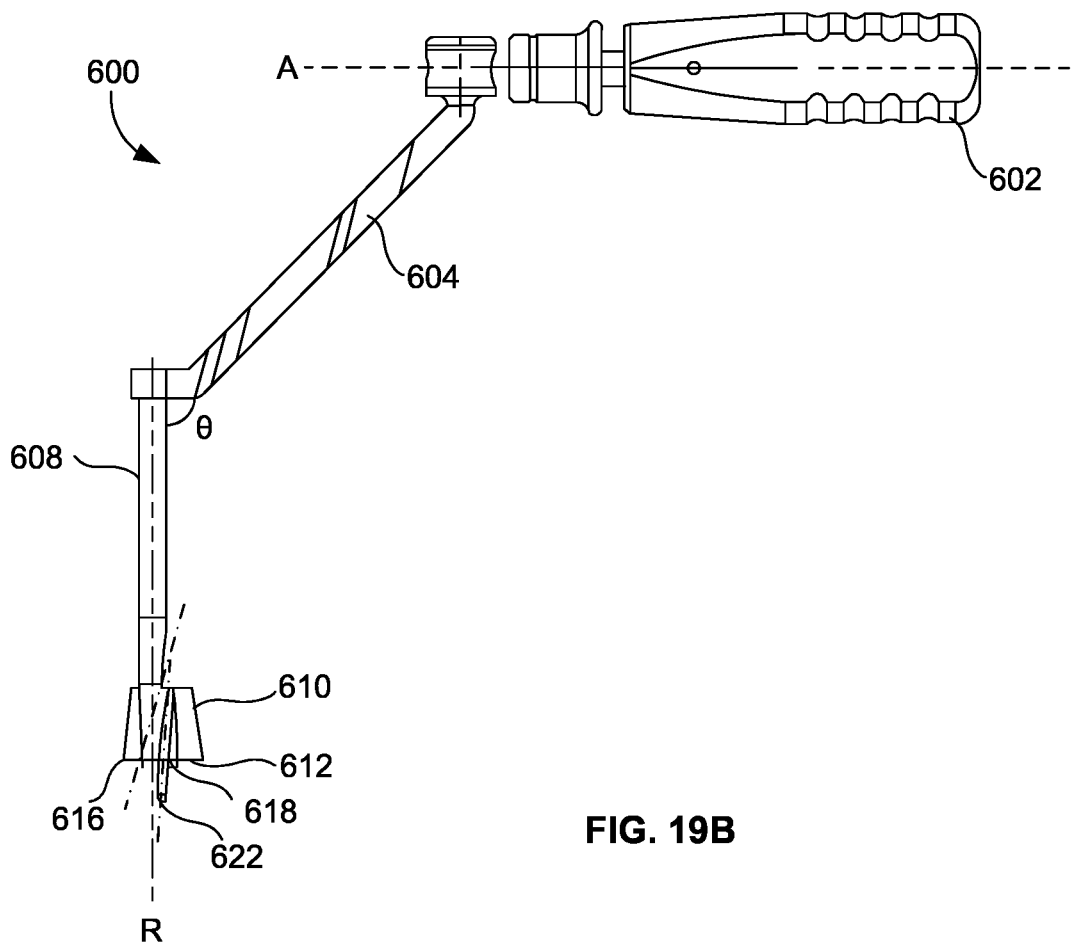
FIG. 19b depicts a side view of an elongated guide member according to an embodiment of the present disclosure.
Figure 19D:
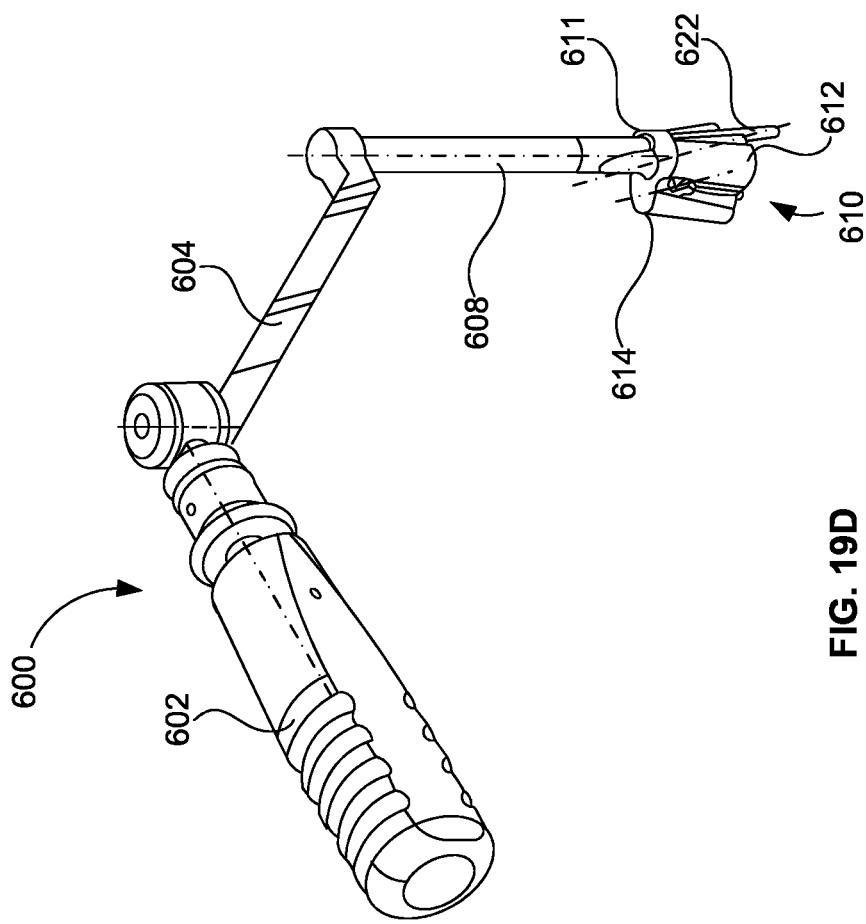
FIG. 19d depicts a perspective view of an elongated guide member according to an embodiment of the present disclosure.
Figure 19C:
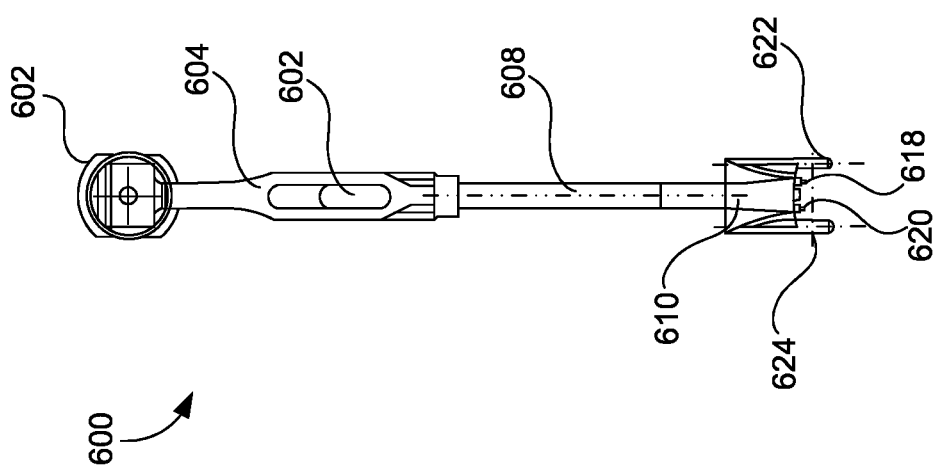
FIG. 19c depicts a front view of an elongated guide member according to an embodiment of the present disclosure.

A second shaft 608 extends from a distal end of the first shaft 604, such that the first shaft 604 and the second shaft 608 form an angle θ where the angle θ can be obtuse as shown in FIG. 19b, or alternatively, angle θ may be 90 degrees or any other desired angle.

A drill guide 610 may be attached to the distal end of the second shaft 608. A first guide tube 612, a second guide tube 614, and a third guide tube 616 may extend through the drill guide 610. It will be appreciated that the first, second and third guide tubes 612, 614 and 616 may each include a hollow passageway for allowing the passage of a drill bit and fasteners 550, 551 and 552 through the drill guide 610. Further, while the drill guide 610 is shown with three guide tubes 612, 614 and 616, it will be appreciated that, pursuant to embodiments of the present disclosure, the drill guide 610 may comprise a single guide tube or any number of guide tubes.

Extending from a bottom surface of the base member 610 may be a first guide post 612 and a second guide post 614. The first guide post 612 and the second guide post 614 may align the drill guide 600 with respect to the plate 530. The first and second guide posts 612 and 614 may be received in corresponding guide holes 544A and 544B of the plate 530, which facilitates alignment of guide tubes 610, 612 and 614, with corresponding holes 540A, 540B and 540C of the plate 530, and prevent unwanted rotation of the plate 530 with respect to the elongated guide member 600. This alignment enables a user to align and drill fasteners, at predetermined angles, through the guide tubes 610, 612 and 614 and the holes 540A, 540B and 540C of the plate 530 and into adjacent vertebra.

The drill guide 610 also includes a first leg 622 and a second leg 624 that extend from the bottom surface of the drill guide 610. In an embodiment, the first and second legs 622 and 624 may be substantially parallel with one another, and in alternative embodiments, the first and second legs 622 and 624 may be substantially convergent with one another. The first and second legs 622 and 624 are configured to be received in corresponding grooves 520 and 522 of the cage 500 and can retained in engagement with the drill guide during installation of the cage in a desired disc space.

The legs 622 and 624 may extend from the drill guide 610 at a fixed angle, for example, the legs 622 and 624 can be slanted 5 degrees from perpendicular with the bottom surface of the drill guide 610. The legs 622 and 624 may also be slanted at a greater or reduced angle. Since, anatomically, the disc space where the cage 500 is inserted is generally not perpendicular to the front of the spine, the respective slant of the legs 622 and 624 enable the plate 530 to align with the cage 500 at an angle that allows the plate 530 to be anatomically flush with the adjacent vertebrae.

Therefore, the drill guide 600 can utilize the first and second legs 622 and 624 to locate a cage 500 that has already been inserted into the spine and thereby align a corresponding plate 530, attached to the base member 630, with respect to the cage 500. This type of configuration allows a surgeon to insert a cage 500 at a first position and depth into a spine and then retain the ability to align the plate 530 at a varied distance or depth relative to the cage 500.

Figure 20A:
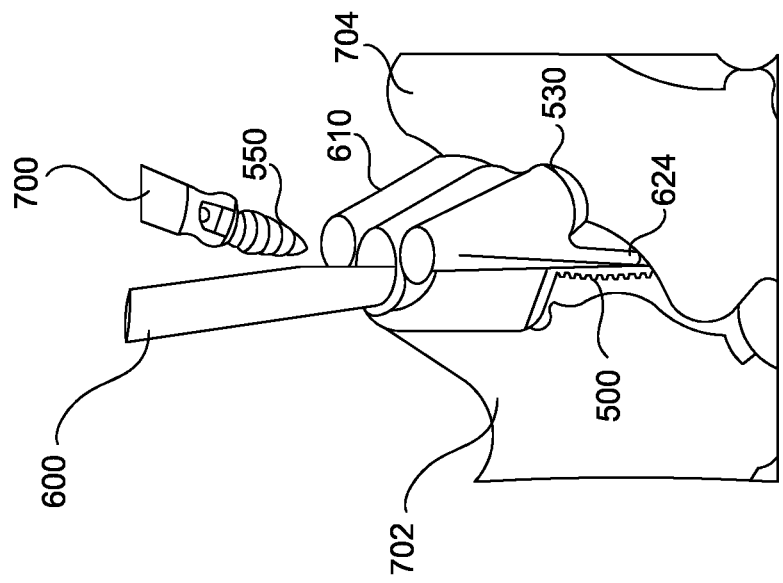
FIG. 20a depicts a procedure for drilling pilot holes in a vertebra according to an embodiment of the present disclosure.
Figure 20B:
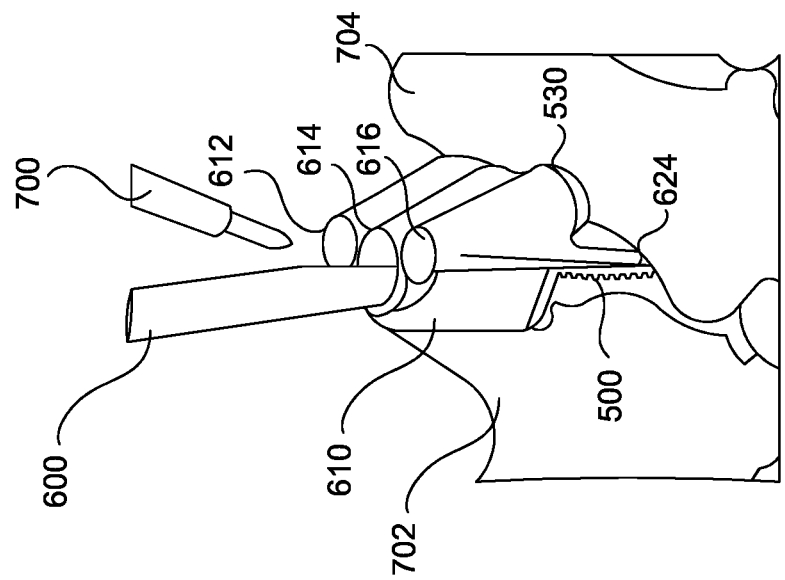
FIG. 20b depicts a procedure for drilling fasteners to secure an interbody plate to a vertebra according to an embodiment of the present disclosure.

In an embodiment shown in FIG. 20a, a surgeon or user can use a drill 700 to drill pilot holes into adjacent vertebrae 702 and 704 using the guide tubes 612, 614 and 616 to direct the drill 700 at respective fixed angles, in preparation for inserting fasteners 550, 551 and 552 into adjacent vertebrae 702 and 704. The drill guide 610 maintains the relative positions of the cage 500 and the plate 530 while the surgeon proceeds to drill the pilot holes. Then, as shown in FIG. 20b, a drill 700 can be used to drive the fasteners 550, 551 and 552 (only fastener 550 is shown) using the same guide tubes 612, 614 and 616 to direct the user to screw fasteners through the plate 530 and into the corresponding pilot holes in the adjacent vertebrae 702 and 704.

Figure 21:
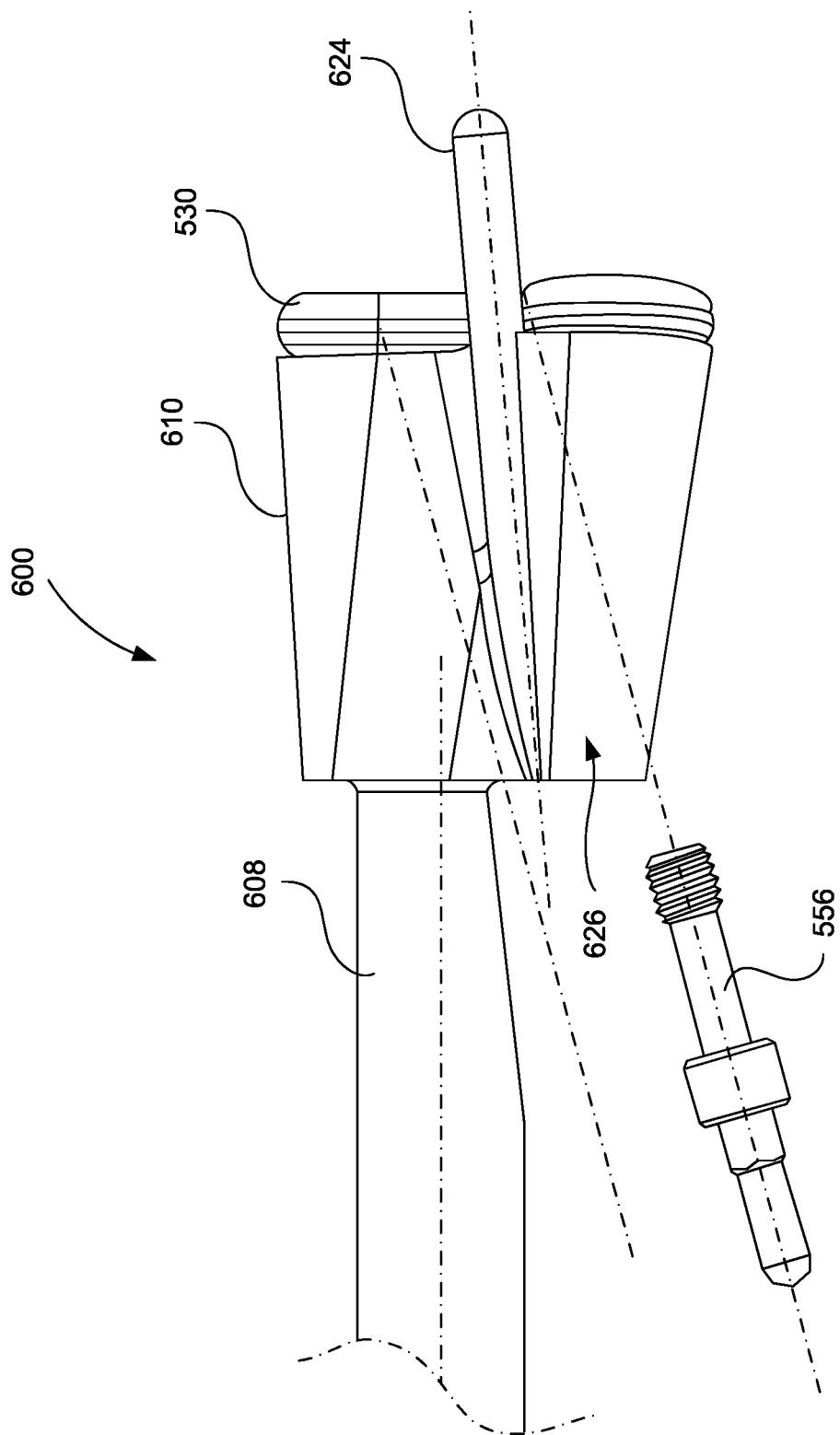
FIG. 21 depicts an exploded side view of an elongated guide member, drill guide and interbody plate according to an embodiment of the present disclosure.
Figure 22:
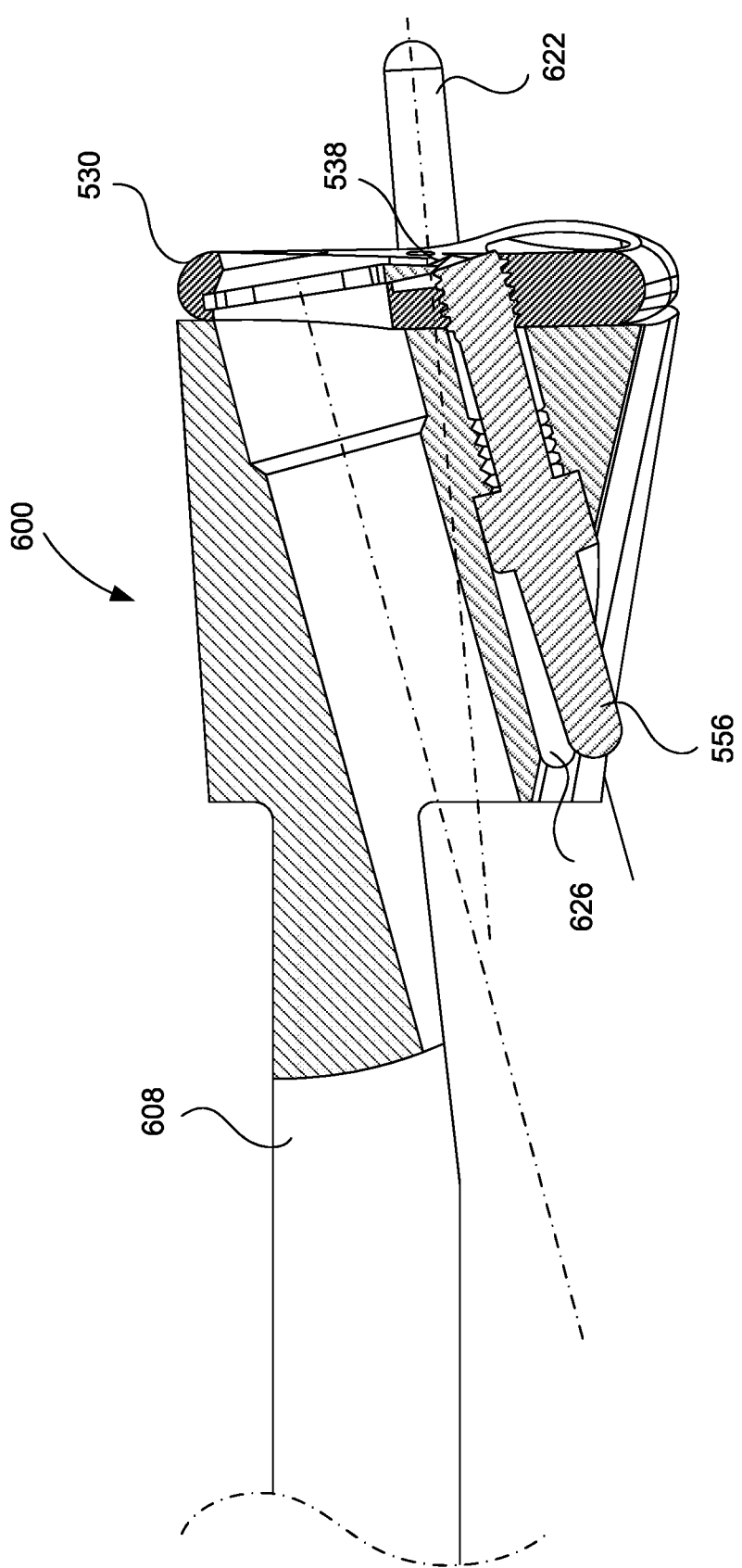
FIG. 22 depicts an cross-sectional side view of an elongated guide member, drill guide and interbody plate according to an embodiment of the present disclosure.

As shown in FIGS. 21-22, the plate 530 can be secured to drill guide 610 of the elongated guide member 600 via a removable fastener 556. The fastener 556 can be inserted through a hole 626 in the drill guide 610 and then threadedly engaged with a threaded bore 538 of the plate 530, thereby removably securing the plate 530 to the base member 610. A surgeon or user can fasten the plate 530 to the drill guide 610 which fixes the relative orientation of the plate 530 with respect to the drill guide 610. After the plate 530 has been positioned and fixed in the desired location, the surgeon can the remove the fastener 556 which will release the plate 530 from the drill guide 610.

Figure 23:
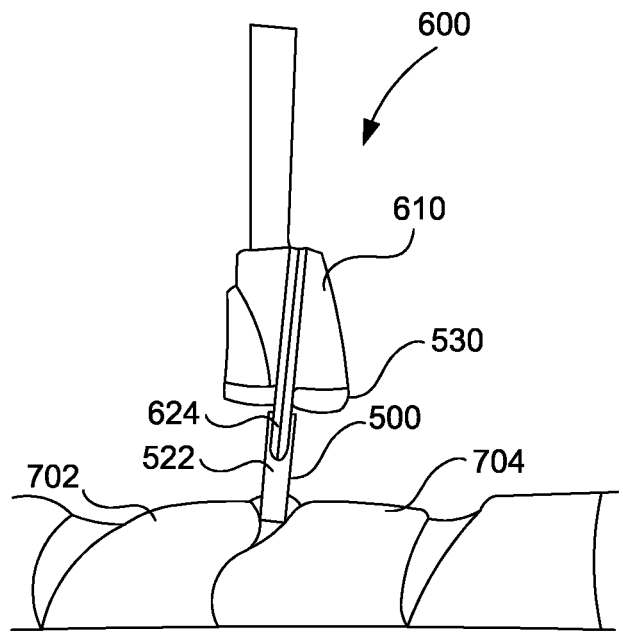
FIG. 23 depicts a procedure for installing an interbody cage an interbody plate to a spine according to an embodiment of the present disclosure.

As shown in FIG. 23, a method of installing the cage 500 and the plate 530 of the present disclosure can include, securing the plate 530 to the drill guide 610, as explained above, and also securing the cage 500 to the drill guide 610 via engagement between the first and second legs 622 and 624 which are received by corresponding grooves 520 and 522 on the lateral sides of the cage 500. Then the cage 500 and the plate 530 can be installed in the spine together, simultaneously, at the desired location with the cage 500 being inserted between adjacent vertebrae 702 and 704. This simultaneous installation of the cage 500 and the plate 530 facilitates the use of less steps during installation and helps to ensure the desired relative orientation between the cage 500 and the plate 530 during installation into the spine.

Figure 24:
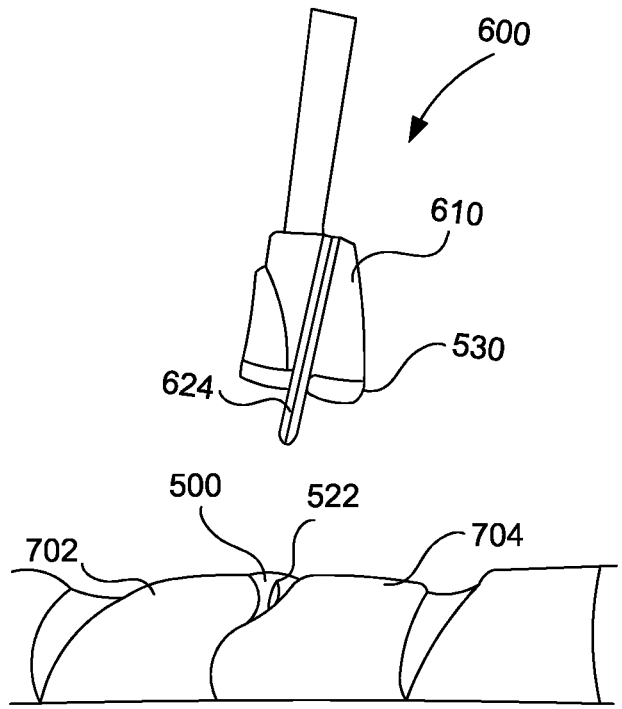
FIG. 24 depicts a procedure for positioning and aligning an interbody plate with respect to an interbody cage installed in a disc space according to an embodiment of the present disclosure.

FIG. 24 illustrates another method of installation, where the elongated guide member 600 can be used to, first, install the cage 500 in the desired disc space between the intended vertebrae 702 and 704. After the cage 500 is installed, the plate 530 can be secured to base member 610 of the drill guide 600, as explained above, the first and second legs 622 and 624 of the drill guide 600 can be used to locate the cage 500 via engagement with the corresponding grooves 520 and 522, which ensures proper orientation of the plate 530 with respect to the cage 500. However, by installing the plate 530 separately from the cage 500, a surgeon can vary the depth of the cage 500 into the spine with respect to plate 530, while maintaining a desired rotational orientation between the cage 500 and plate 530.

Figure 25A:
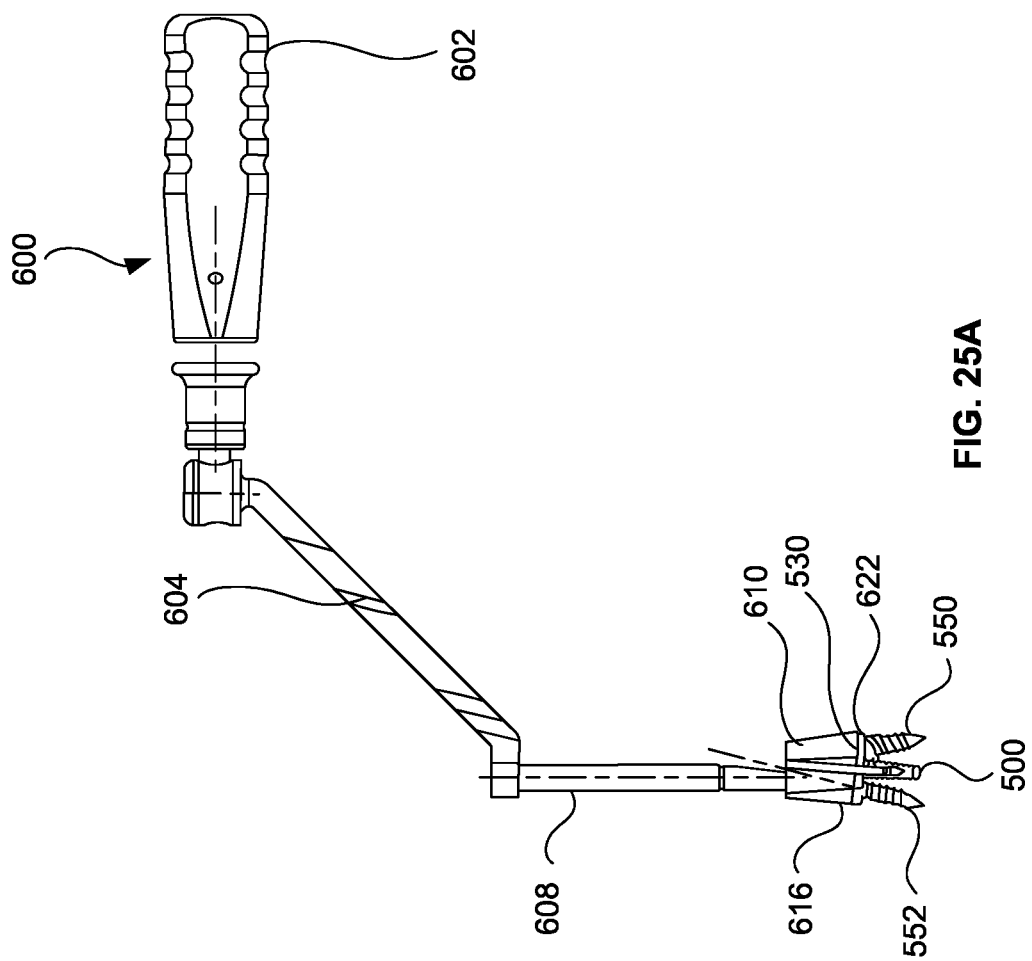
FIG. 25a depicts a side view of an assembled combination of an elongated guide member, interbody cage, interbody plate and corresponding fasteners according to an embodiment of the present disclosure.
Figure 25B:
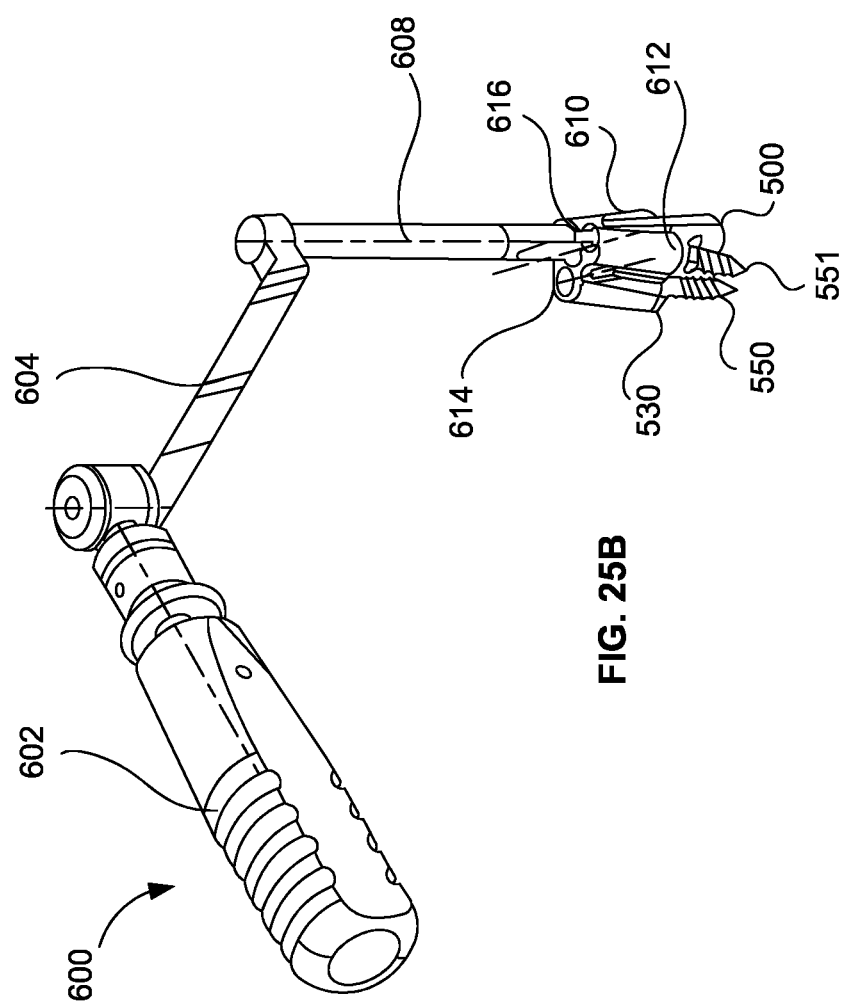
FIG. 25b depicts a perspective view of an assembled combination of an elongated guide member, interbody cage, interbody plate and corresponding fasteners according to an embodiment of the present disclosure.
Figure 26:
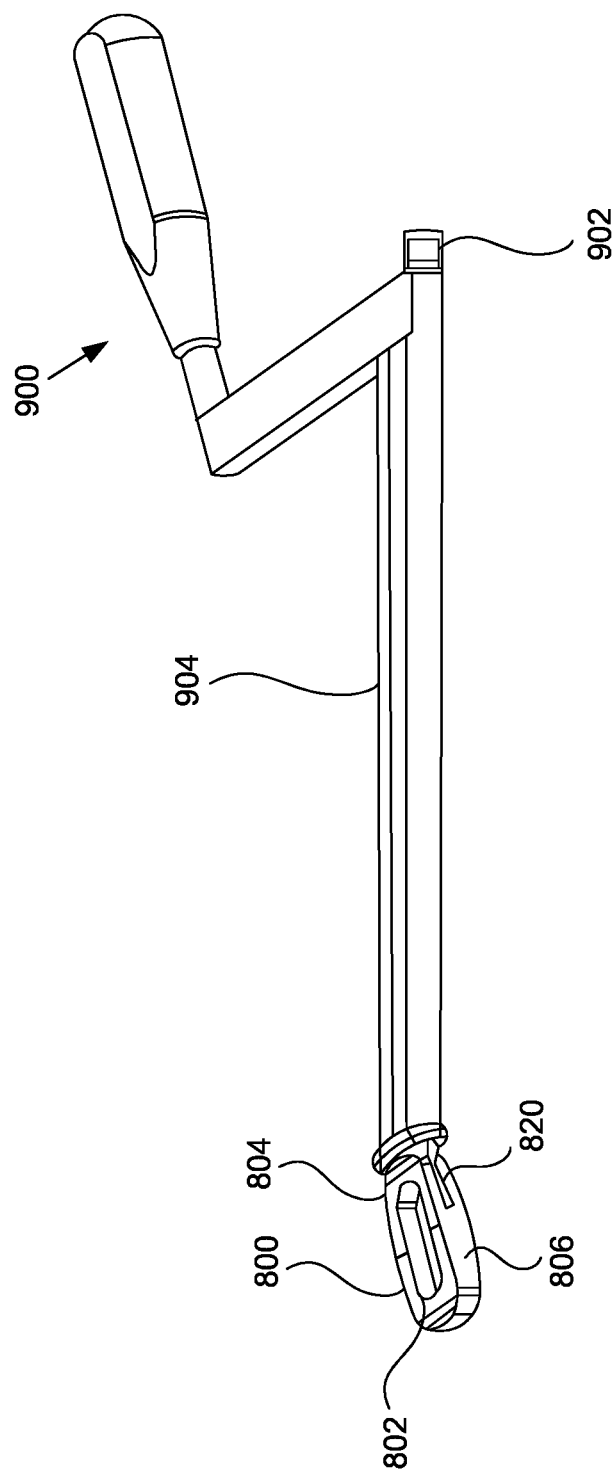
FIG. 26 depicts a perspective view of an assembled combination of an inserter and an interbody cage according to an embodiment of the present disclosure.
Figure 27:
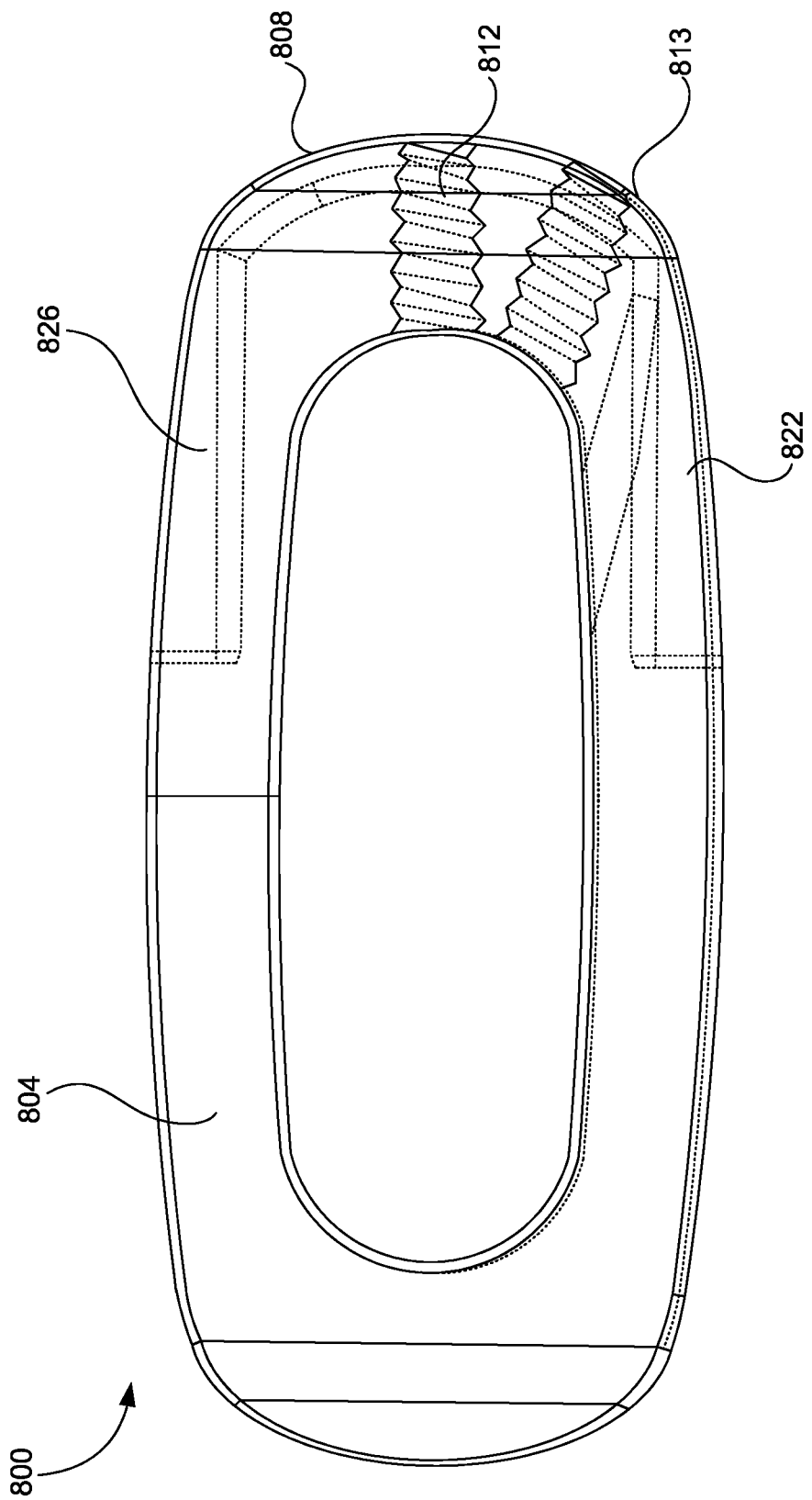
FIG. 27 depicts a side view of the interbody cage of FIG. 26.
Figure 28:
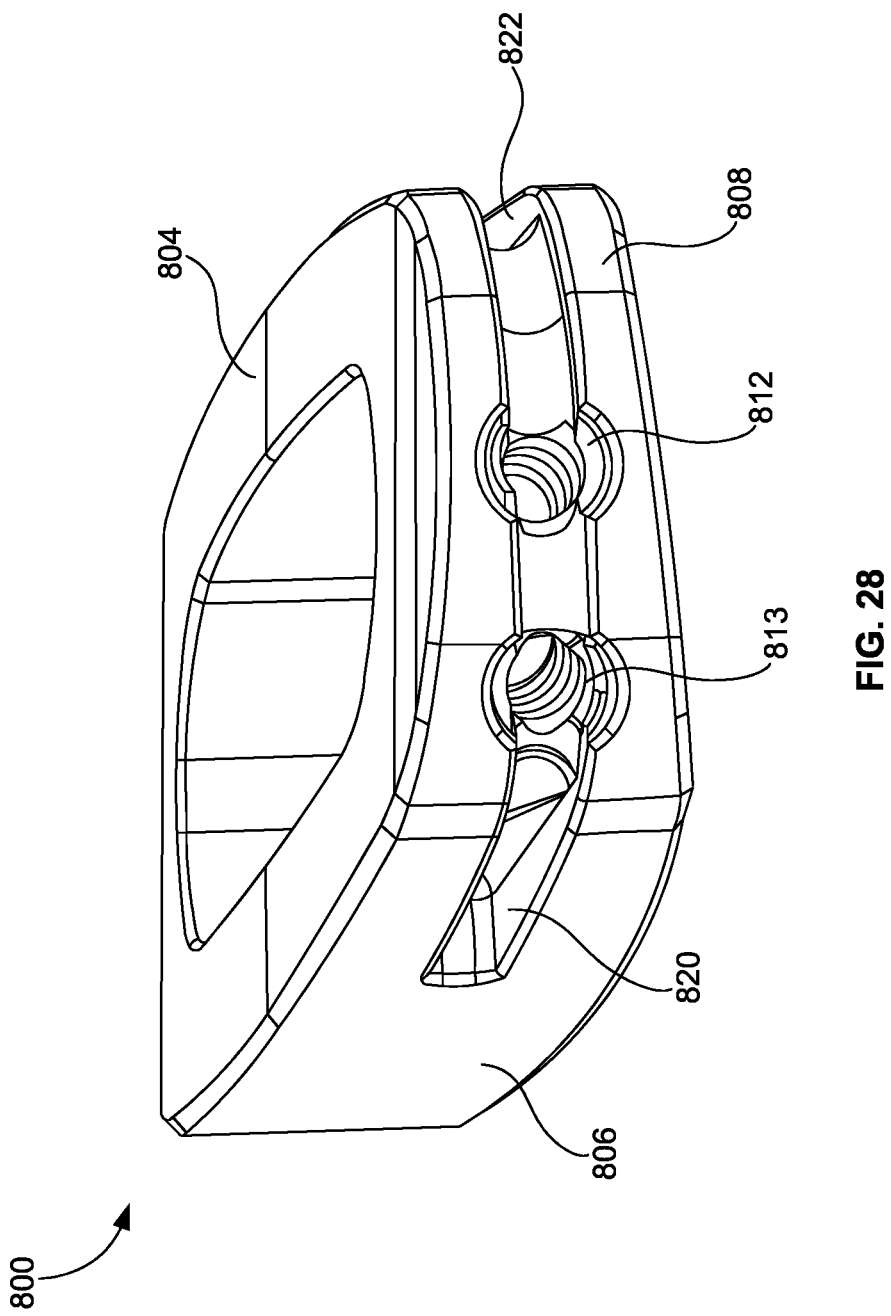
FIG. 28 depicts a top perspective view of the interbody cage of FIG. 26.
Figure 29:
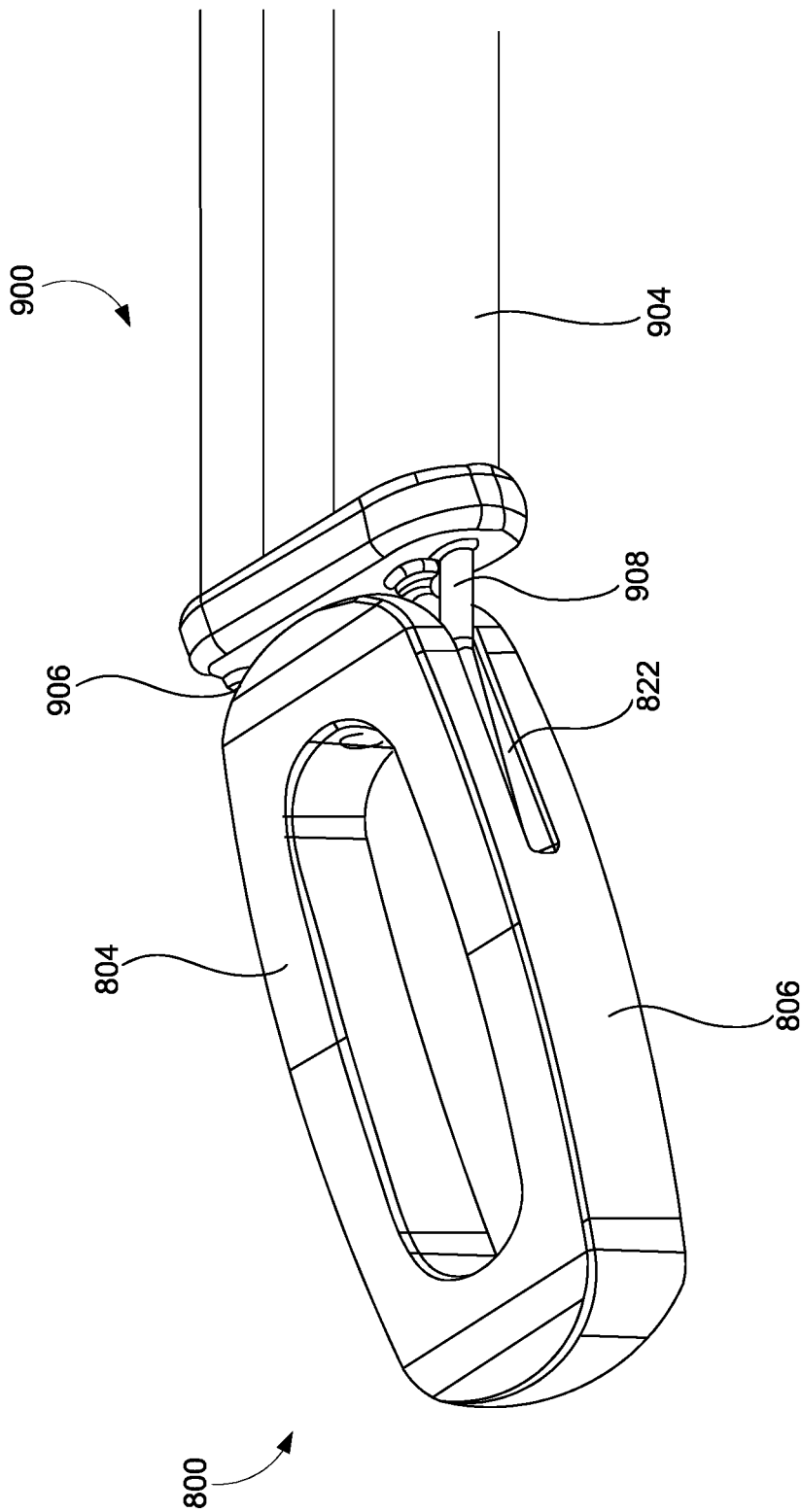
FIG. 29 depicts a perspective view of the assembled combination of the inserter and the interbody cage of FIG. 26.

FIGS. 25*a* and 25*b* also illustrate the elongated guide member 600 with an attached interbody cage 500 and interbody plate 530, as they would be assembled prior to installing the cage 500 and plate 530 to a spine.

An another embodiment, illustrated in FIGS. 26-29, a surgeon or user can insert an interbody cage 800 between desired vertebrae (not shown) using an oblique inserter 900. The interbody cage 800 may include a body member 802 having a superior surface 804, an inferior surface 805 and a sidewall 806 that circumscribes the body member 802. The cage 800 may also include a first threaded bore 812 and a second threaded bore 813 that extend into a proximal end 808 of the cage 800. The first threaded bore may extend generally orthogonally into the proximal side 808 of the cage 800. The second threaded bore can extend into the proximal side 808 of the cage 800 at an angle, which may be between 0 and 90 degrees.

The first and second threaded bores 812 and 813 are configured to receive a central screw 902 which is threaded through an arm 904 of the inserter 900. The central screw 902 can be threaded and secured to one of the first bore 812 or the second bore 813, which locks the cage 800 in place with respect to the inserter 900. The cage 800 can be locked to the inserter 900 at an angle if, for example, the central screw is threaded into the threaded bot 813. The alternative angles of the threaded bores 812 and 813 enable a user to customize the angle at which the cage 800 is inserted in the spine of a patient.

The cage 800 can also include grooves or cutouts 820 and 822. In alternative embodiments the grooves 820 and 822 may also be holes. The grooves 820 and 822 may form receiving slots in the sidewall 806 to allow passage of legs or guide posts 906 and 908 of the inserter 900. The grooves 820 and 822 may be substantially parallel to one another or tapered and may extend around the proximal side 806 of the cage 800 to permit the guide posts 906 and 908 to engage the cage 800 at different and varying desired angles.

The guide posts 906 and 908 may extend from a proximal end of the arm 904 of the inserter 900, and the guide posts 906 and 908 may be substantially parallel or tapered. The guide posts 906 and 908 are configured to locate the cage 800 with respect to the inserter, at a desired angle, and provide additional stability between the cage 800 and the inserter 900 during insertion of the cage 800 into the spine of a patient.

According to an embodiment of the present disclosure, a method of inserting the cage 800 includes inserting the guide posts 906 and 908 into the grooves 820 and 822 of the cage 800. Then the central screw 902 is threaded into one of the first and second bores 812 and 813, which locks the cage 800 into place with respect to the inserter 900. Once the cage is locked into place, a user can position the cage into the desired location whin the spine of a patient. Once the cage 800 is in the desired location, the central screw 902 can be removed and the inserter 900 can be removed from engagement with the cage 800.

Once the cage 800 has been inserted into the spine, an interbody plate 1000 can be placed over the proximal side 808 of the cage 800. The plate 1000 can be used to lock the cage 800 into position with respect to the spine, by fastening the plate 1000 to vertebrae adjacent on both side of the cage 800.

The plate 1000 can include substantially planar body member 1001 which can include four through holes 1002-1005. The through boles 1002-1005 are configured to receive fasteners which can secure the plate 1000 to the desired adjacent vertebrae.

Figure 30:
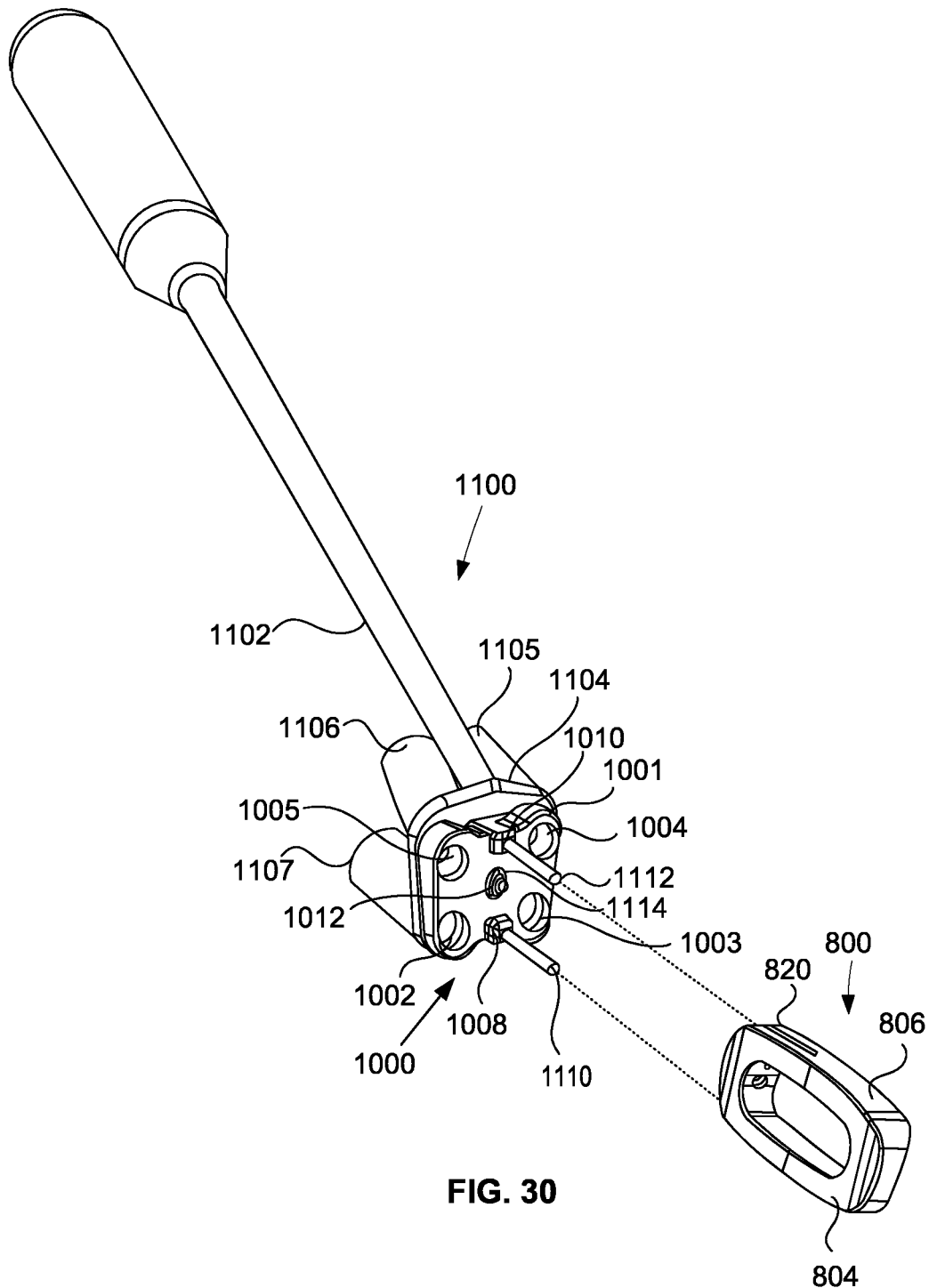
FIG. 30 depicts a perspective view of an assembled combination of an elongated guide member and a interbody plate, and an interbody cage, according to an embodiment of the present disclosure.
Figure 31:
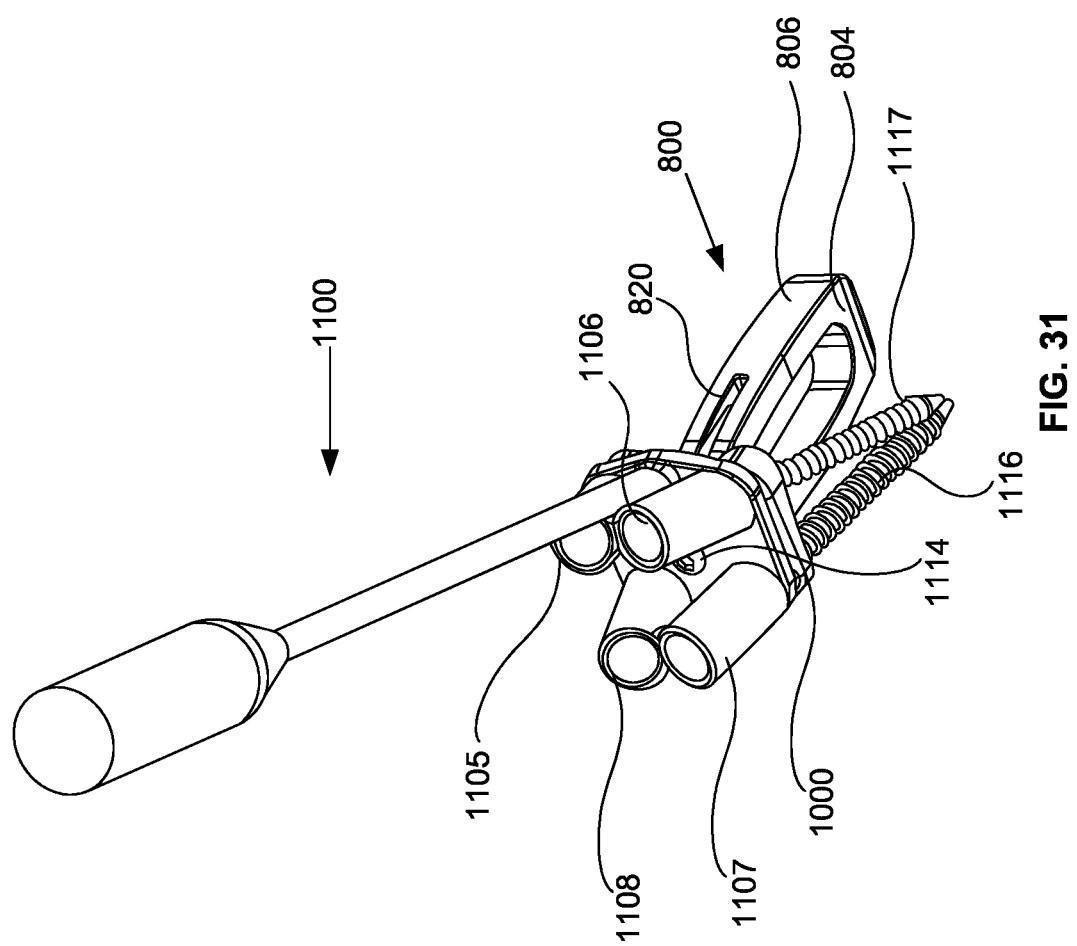
FIG. 31 depicts a top perspective view of an assembled combination of the elongated guide member, interbody plate and interbody cage, of FIG. 30.
Figure 32:
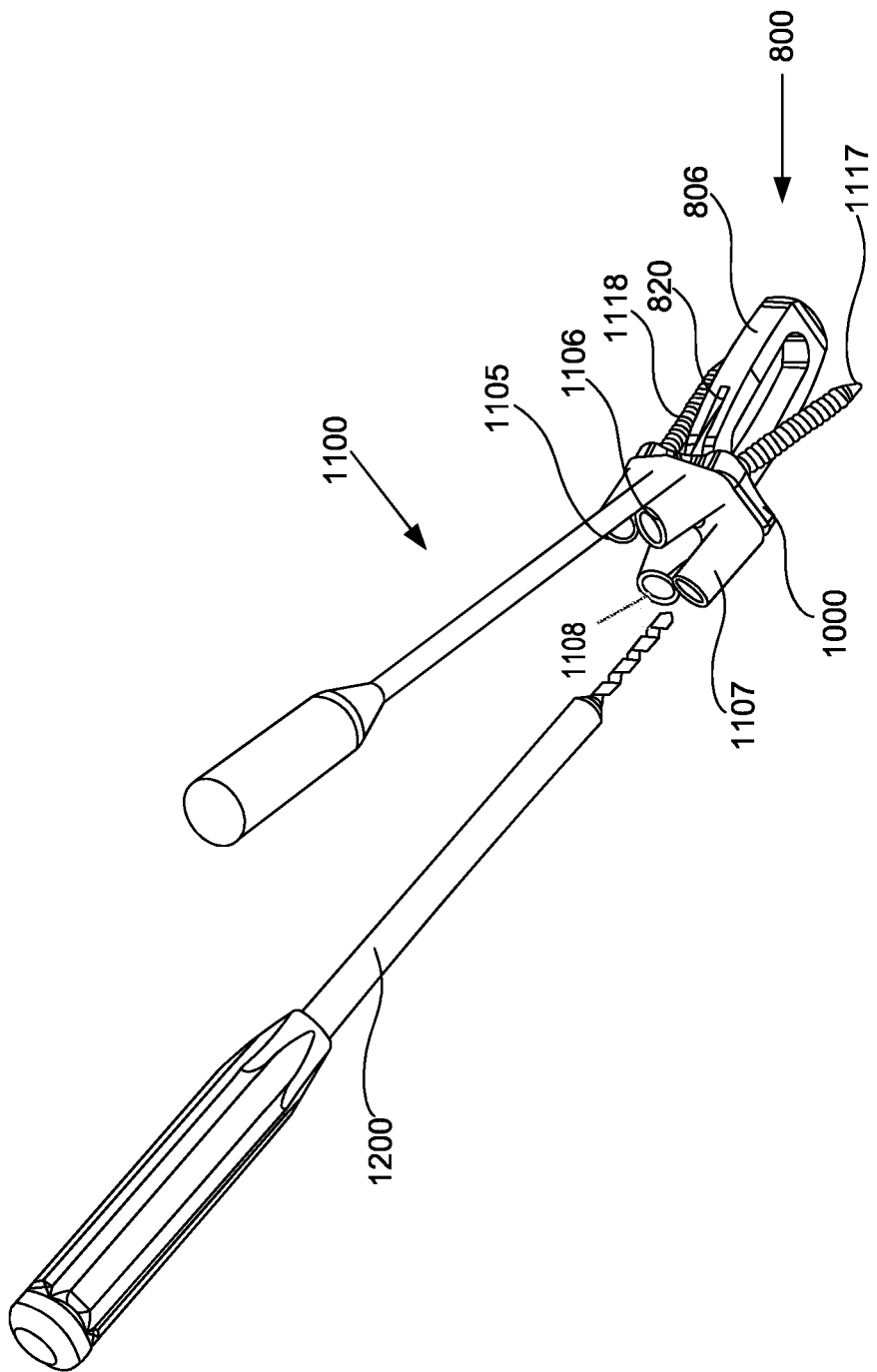
FIG. 32 depicts a perspective view of an assembled combination of the elongated guide member, interbody plate and interbody cage, of FIG. 30 and a drill.
Figure 33:
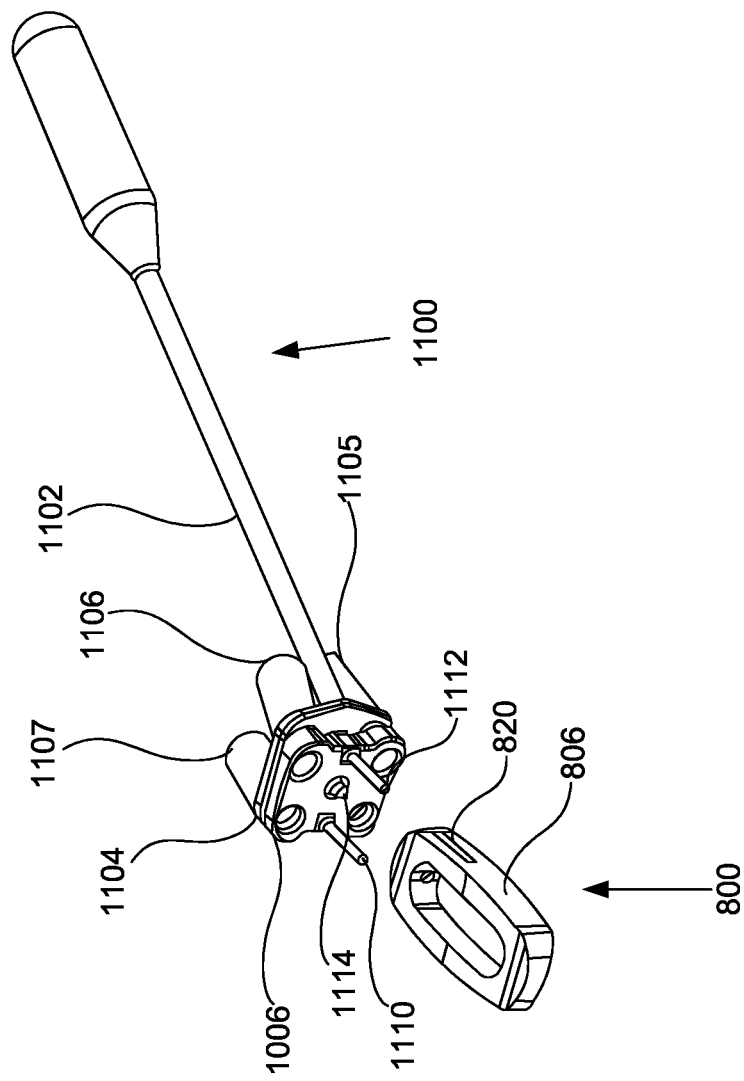
FIG. 33 depicts a top perspective view of an assembled combination of the elongated guide member, interbody plate and interbody cage, of FIG. 30.

The plate 1000 can be positioned with respect to the cage 800 via use of a elongated guide member 1100, as shown in FIGS. 30-32. The elongated guide member 1100 includes a shaft 1102 and a drill guide 1104 fixed to a proximal end of the shaft 1102. The drill guide 1104 may include a plurality of guide tubes 1105-1108, and each guide tube includes a hollow passageway for allowing the passage of a drill bit and/or fasteners through the drill guide 1104. In alternative embodiments the drill guide 1104 may include a single guide tube or any number of guide tubes.

Extending from a bottom surface of the drill guide 1104 may be first and second guide posts 1110 and 1112. Similar to the guide posts 906 and 908 of the inserter 900, the guide posts 1110 and 1112 are configured to be received by the corresponding grooves 820 and 822 of the cage 800. The guide post 1110 and 1112 are also configured to engage with and be received by corresponding grooves 1008 and 1010 of the plate. The grooves 1008 and 110 may be formed on opposing sides of the plate 1000. In alternative embodiments, the grooves 1008 and 1010 may be holes which can receive the guide posts 1110 and 1112.

The drill guide 1104 may also include a central screw 1114 which extend through the drill guide 1104, through a threaded bore 1012 in the plate 1000. The central screw 1114 is used to lock the plate 1000 in place with respect to the drill guide 1104 which enable the user to more effectively position the plate 1000 with respect to the cage 800 on the spine of a patient.

Once the plate 1000 is secured to the drill guide 1104, a user can properly position the plate 1000 with respect to the cage 800 by inserting the guide posts 1110 and 1112 into the grooves 820 and 822 of the cage 800. And once the plate 1000 is properly positioned with respect to the cage 800, the user can use a drill to tap holes in the adjacent vertebrae by inserting the drill 1200 through the guide tubes 1105-1108. Once the holes are tapped, fasteners 1117-1120 can be inserted through the guide tubes 1105-1108 and then through the holes 1002-1005 of the plate 1000 and into the adjacent vertebrae. After the fasteners 1117-1120 are secured in place, the central screw 1114 can be removed, releasing the plate 1000 from the drill guide 1104, and the drill guide 1104 and elongated guide member 1100 can be removed from the plate 1000 and cage 800, leaving the cage 800 and plate 1000 securely and effectively positioned in the spine of the patient.

Figure 34:
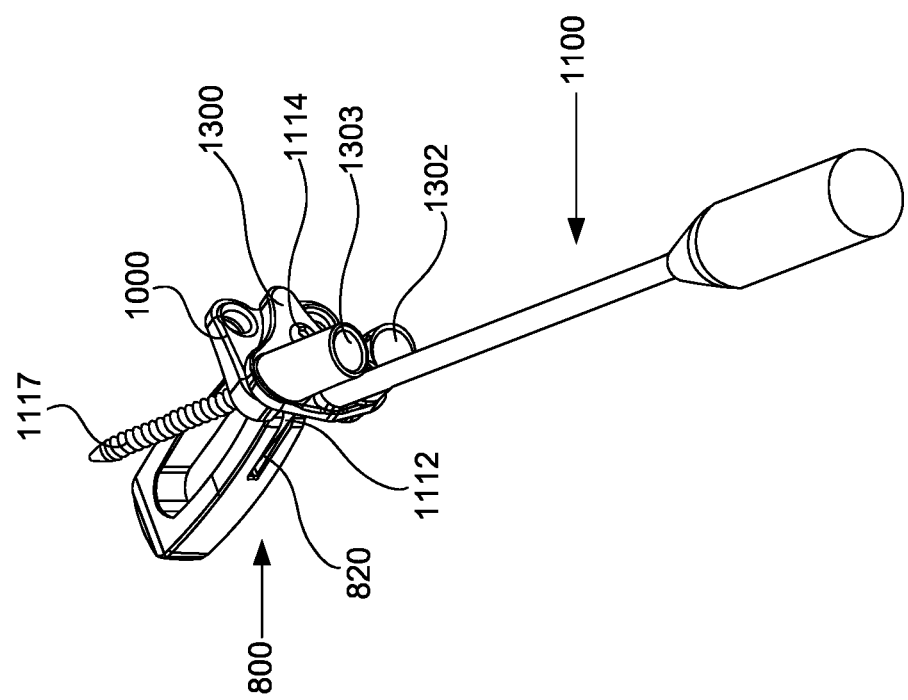
FIG. 34 depicts a perspective view of an assembled combination of the elongated guide member, interbody plate and interbody cage, of an another embodiment of the present disclosure.
Figure 35:
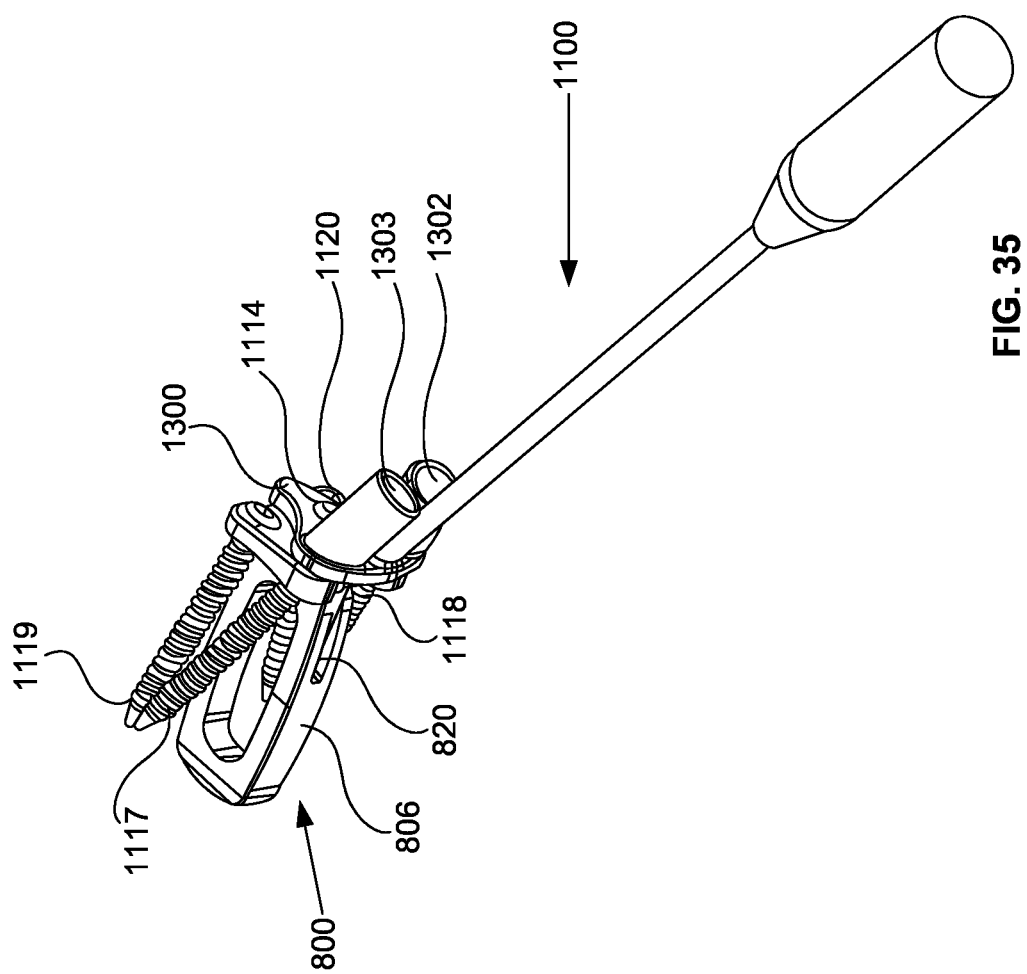
FIG. 35 depicts a perspective view of the assembled combination of the elongated guide member, interbody plate and interbody cage, of an another embodiment of FIG. 34.

In an alternative embodiment of the present disclosure, as illustrated in FIGS. 34 and 35, the elongated guide member 1100 can include a drill guide 1300 having a generally triangular shape and having only two guide tubes 1302 and 1303. This drill guide 1300 embodiment can be advantageous in situations when only two fasteners 1117 and 1118 are necessary to secure the plate 1000 to the adjacent vertebrae, or only two fasteners need the benefit of positioning assistance from the guide tubes 1302 and 1303. In this embodiment, the plate 1000 and cage 800 can be inserted and secured to the spine of a patient in the same manner and using the same method as disclosed above with respect to FIGS. 26-32.

Figure 36:
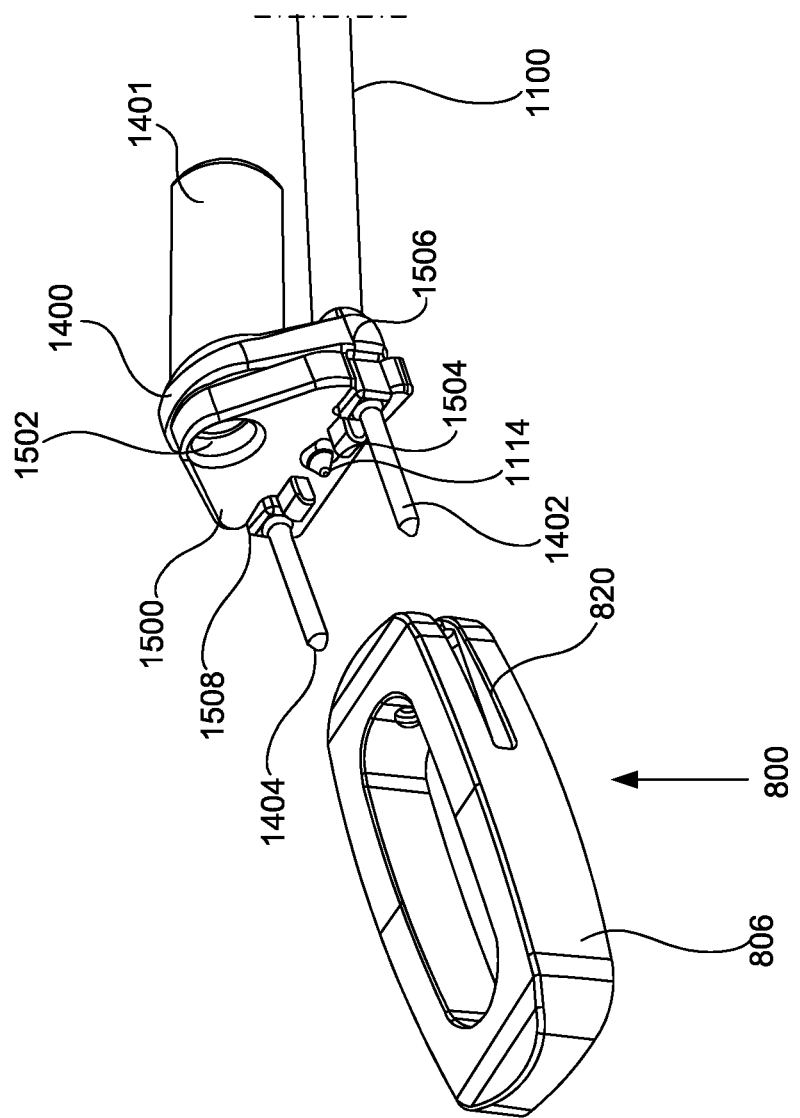
FIG. 36 depicts a perspective view of an assembled combination of an elongated guide member and a interbody plate, and an interbody cage, according to another embodiment of the present disclosure.
Figure 37:
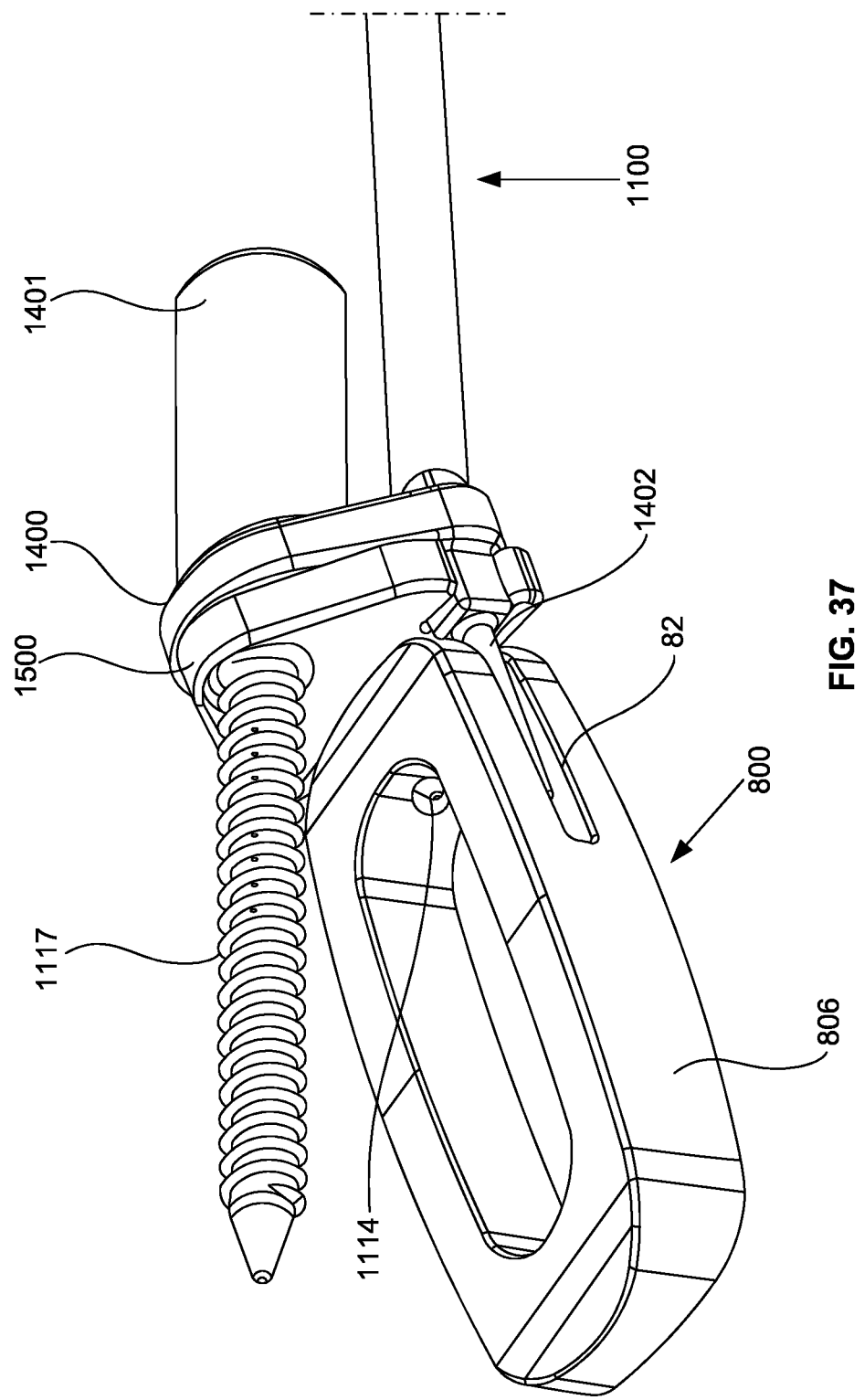
FIG. 37 depicts a perspective view of an assembled combination of the elongated guide member, the interbody plate and the interbody cage, according to FIG. 36.

In an alternative embodiment of the present disclosure, as illustrated in FIGS. 36 and 37, the elongated guide member 1100 can include a drill guide 1400 having a generally triangular shape and having only a single guide tube 1401. This drill guide 1400 embodiment can be advantageous in situations when only one fasteners 1117 is necessary to secure a plate 1500 to the adjacent vertebra, or only one fasteners needs the benefit of positioning assistance from the guide tubes 1401. In this embodiment, the plate 1500 is generally triangular in shape and includes only a single through hole 1502 configured to receive the fastener 1117. Plate 1500 also includes a threaded bore 1504 which is configured to receive the central screw 1114. The plate 1500, similar to plate 1000 disclosed above, include a pair of grooves 1506 and 1508 formed on opposing sides of the plate 1500 and configured to received guide posts 1402 and 1404 which extend from the drill guide 1400.

The plate 1500 and cage 800 can be inserted and secured to the spine of a patient in the same manner and using the same method as disclosed above with respect to FIGS. 26-32.

Figure 38:
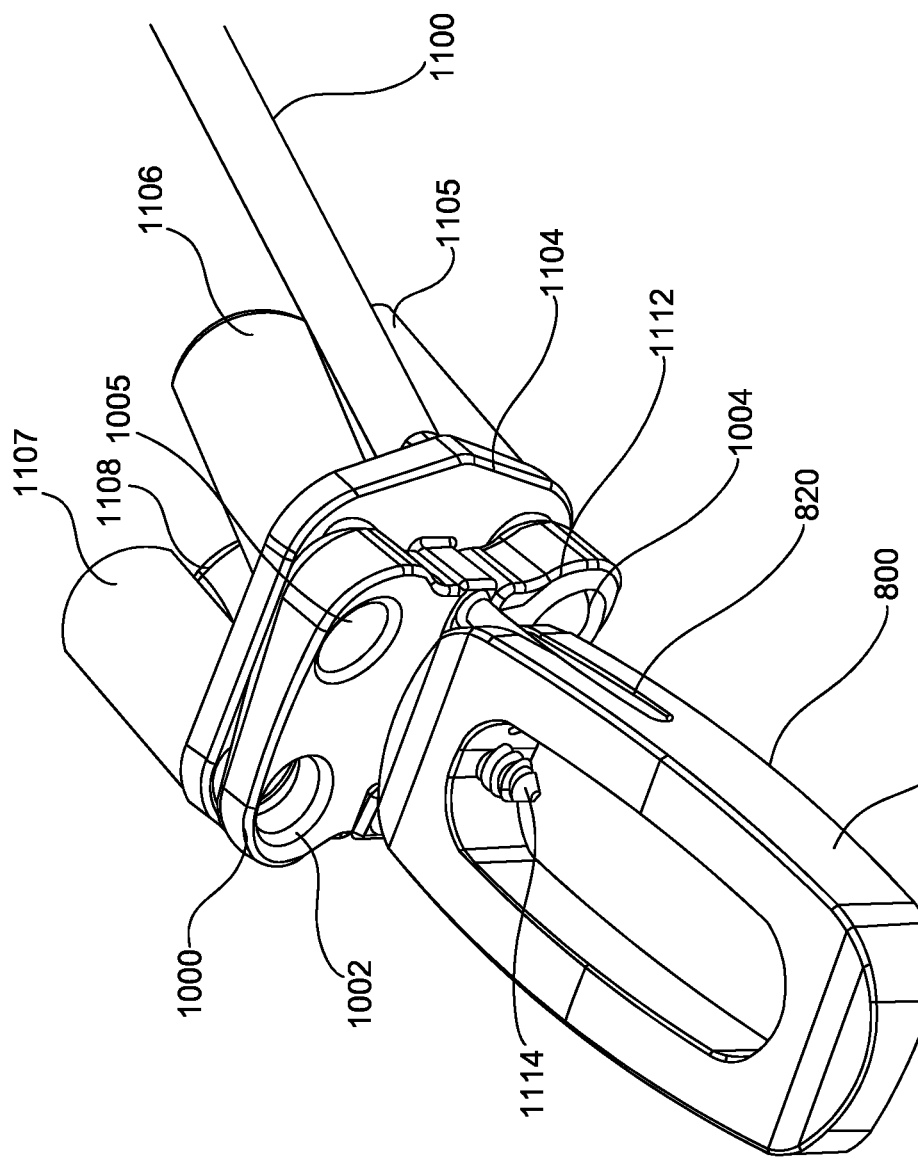
FIG. 38 depicts a perspective view of an assembled combination of an elongated guide member, an interbody plate and an interbody cage, according to another embodiment of the present disclosure.
Figure 39:
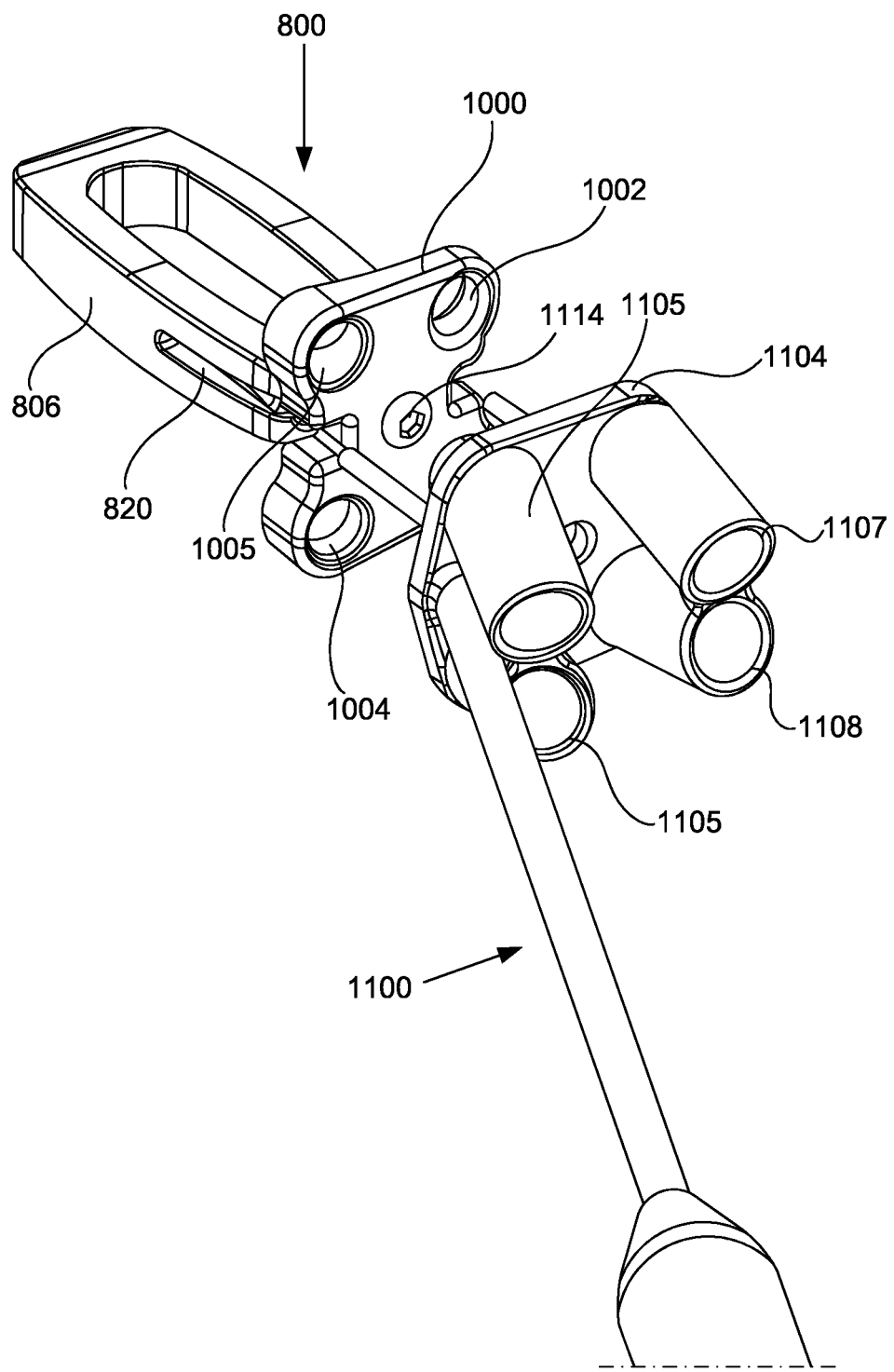
FIG. 39 depicts a perspective view of an assembled combination of an interbody plate and an interbody cage, and an elongated guide member according to FIG. 38.

In a further method of installing the cage 800 and plate 1000, as illustrated in FIGS. 38 and 39, the cage 800 and plate 1000 can be secured to the drill guide 1104 prior to the cage 800 being inserted into the spine of a patient. The cage 800 and plate 1000 can be secured to the drill guide via the central screw 1114 which, together with the guide posts 1110 and 1112 secure the cage 800 and plate 1000, with respect to the drill guide 1104, against rotation or other movement during insertion into the spine. The guide posts 1110 and 1112 also hold the cage 800 and provide stability during insertion into the spine. Once the cage 800 and plate 1000 positioned properly, fasteners can then be secured to the plate 1000 in the same manner as disclosed above, and the drill guide can then be removed from the cage 800 and plate.

Figure 40:
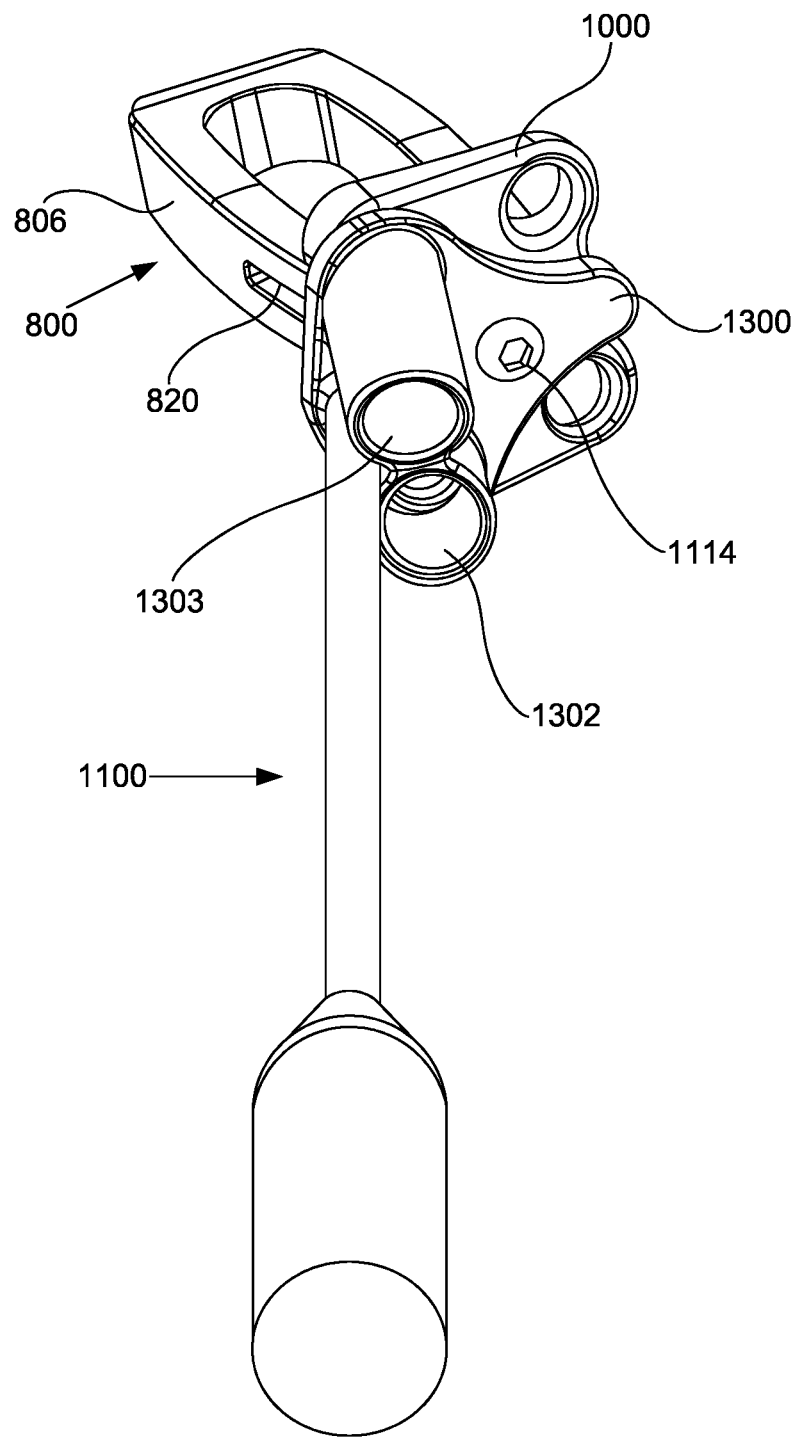
FIG. 40 depicts a perspective view of an assembled combination of an elongated guide member, an interbody plate and an interbody cage, according to another embodiment of the present disclosure.

In yet a further method of installing the cage 800 and plate 1000, as illustrated in FIG. 40, the cage 800 and plate 1000 can be secured to the drill guide 1300 prior to the cage 800 being inserted into the spine of a patient. The cage 800 and plate 1000 can be secured to the drill guide 1300 via the central screw 1114 which, together with the guide posts 1110 and 1112 secure the cage 800 and plate 1000, with respect to the drill guide 1300, against rotation or other movement during insertion into the spine. The guide posts 1110 and 1112 also hold the cage 800 and provide stability during insertion into the spine. Once the cage 800 and plate 1000 positioned properly, fasteners can then be secured to the plate 1000 in the same manner as disclosed above, and the drill guide 1300 can then be removed from the cage 800 and plate.

Figure 41:
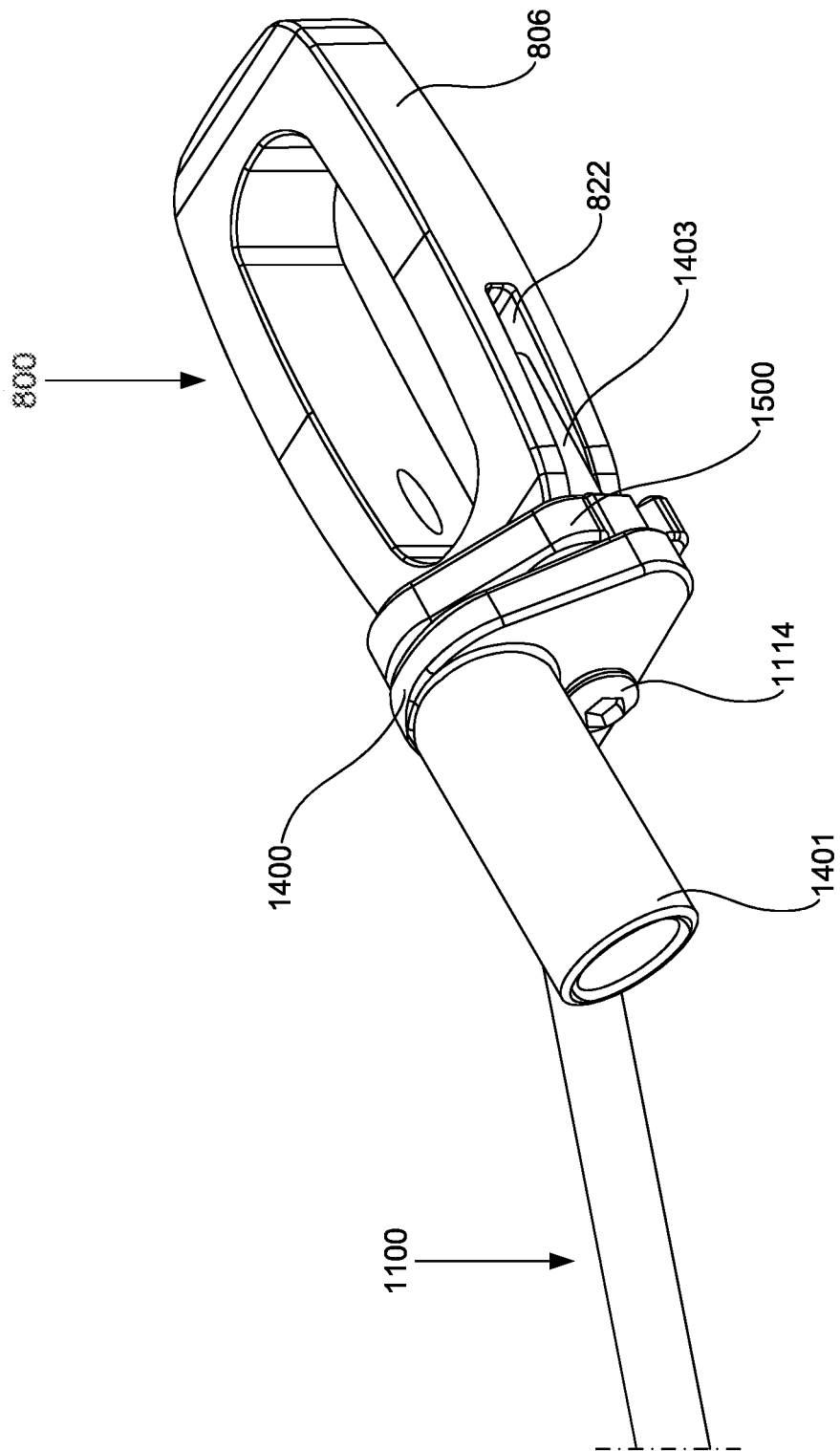
FIG. 41 depicts a perspective view of an assembled combination of an elongated guide member, an interbody plate and an interbody cage, according to another embodiment of the present disclosure.

In another further method of installing the cage 800 and plate 1500, as illustrated in FIG. 41, the cage 800 and plate 1500 can be secured to the drill guide 1400 prior to the cage 800 being inserted into the spine of a patient. The cage 800 and plate 1500 can be secured to the drill guide 1400 via the central screw 1114 which, together with the guide posts 1402 and 1403, secure the cage 800 and plate 1500, with respect to the drill guide 1400, against rotation or other movement during insertion into the spine. The guide posts 1402 and 1403 also hold the cage 800 and provide stability during insertion into the spine. Once the cage 800 and plate 1500 are positioned properly into the spine of the patient, a fastener can then be secured to the plate 1500 in the same manner as disclosed above, and the drill guide 1400 can then be removed from the cage 800 and plate 1500.

Figure 42:
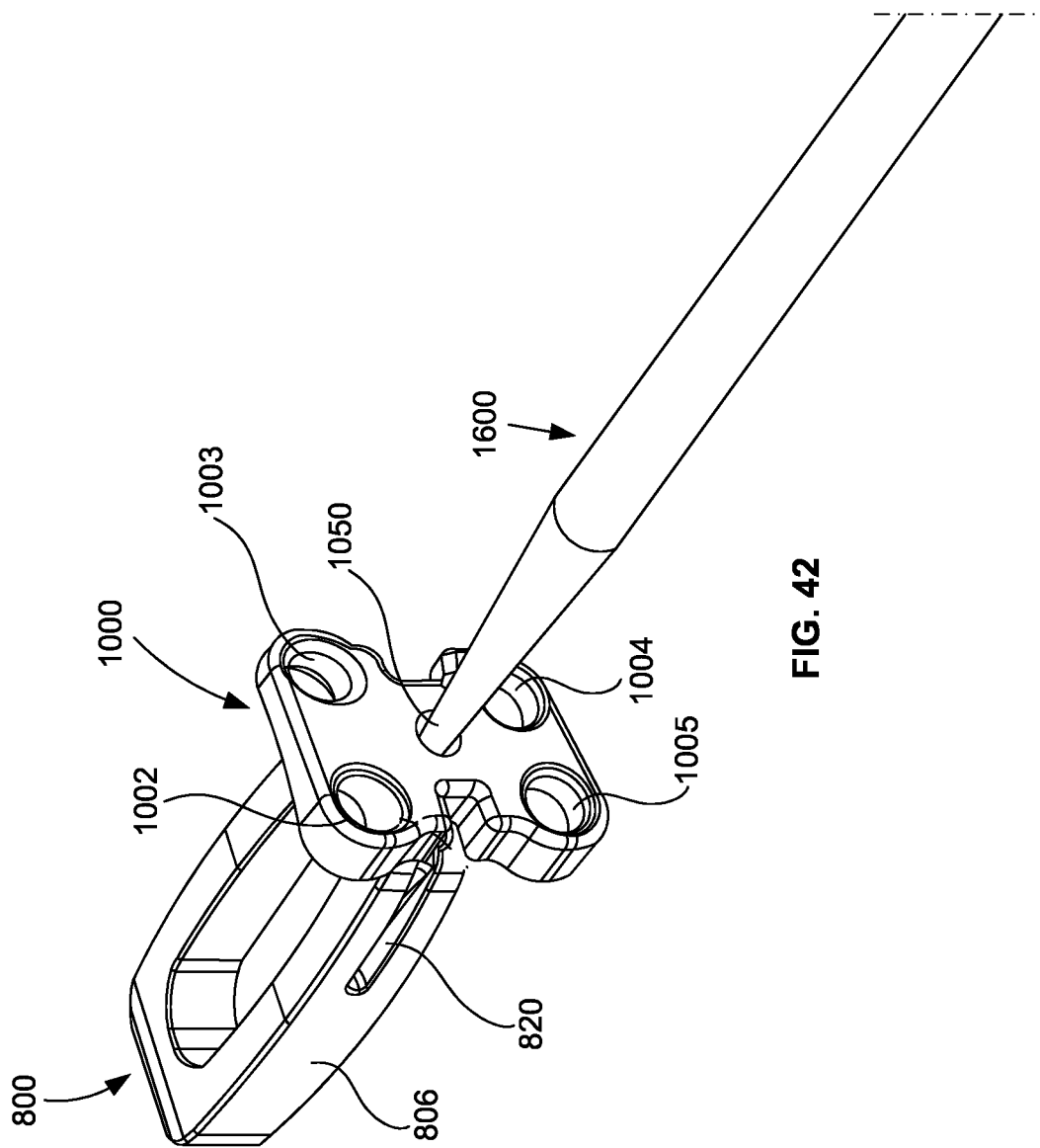
FIG. 42 depicts a perspective view of an assembled combination of an inserter, an interbody plate and an interbody cage, according to another embodiment of the present disclosure.

In another method of installing the cage 800 and plate 1000, as illustrated in FIG. 42, the cage 800 can first be inserted into the spine using a freehand inserter 1600. After the cage 800 has been inserted into the desired position relative to the spine (not shown), the freehand inserter can be secured to the plate 1000 via an engagement between the tapered distal end 1601 of the inserter 1600 and a central bore 1050 of the plate 1000. In another embodiment the central bore 1050 may be threadedly engaged with the distal end 1601 of the inserter 1600. The plate 1000 can then be positionally manipulated with the inserter 1600 such that a user can position the plate 1000, with respect to the spine and the cage 800, in a desired position, and then the user us fasteners to secure the plate to the spine, as discussed above with respect to other similar embodiments.

Once the cage 800 and plate 1000 are positioned properly into the spine of the patient, the inserter 1600 can then be disengaged from the plate 1000 and removed.

Figure 43:
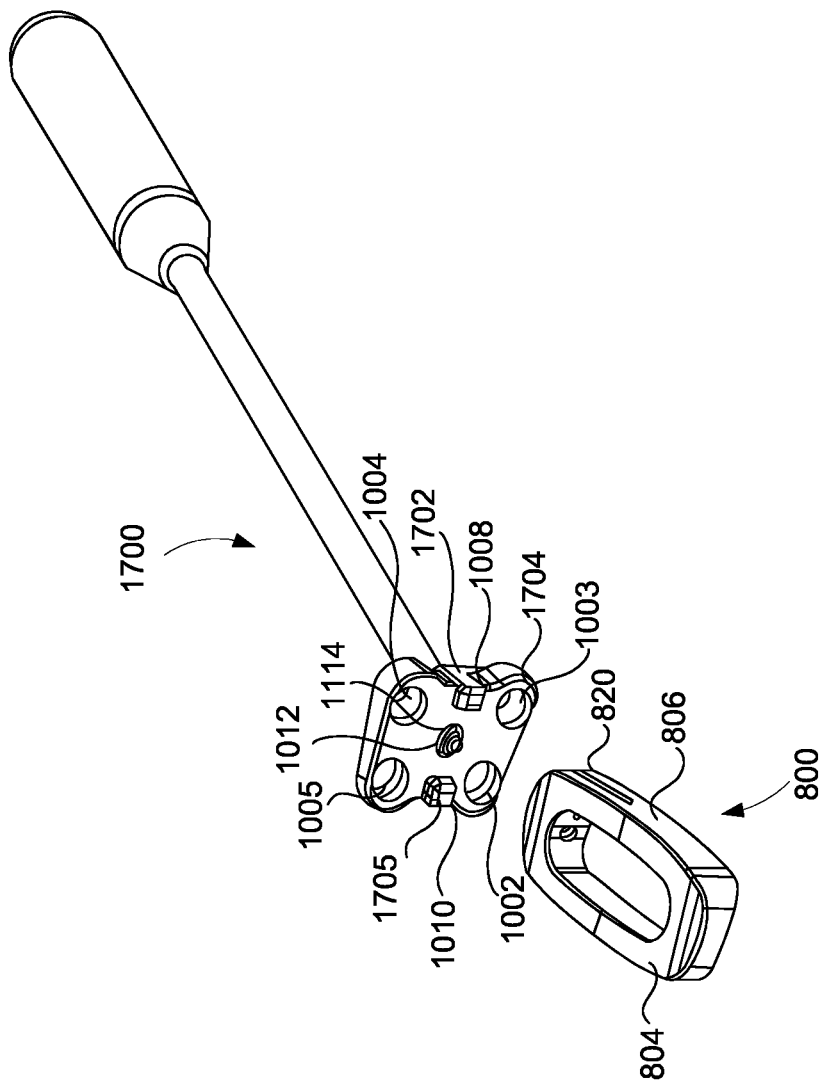
FIG. 43 depicts a perspective view of an assembled combination of an inserter and an interbody plate, and an interbody cage, according to another embodiment of the present disclosure.
Figure 44:
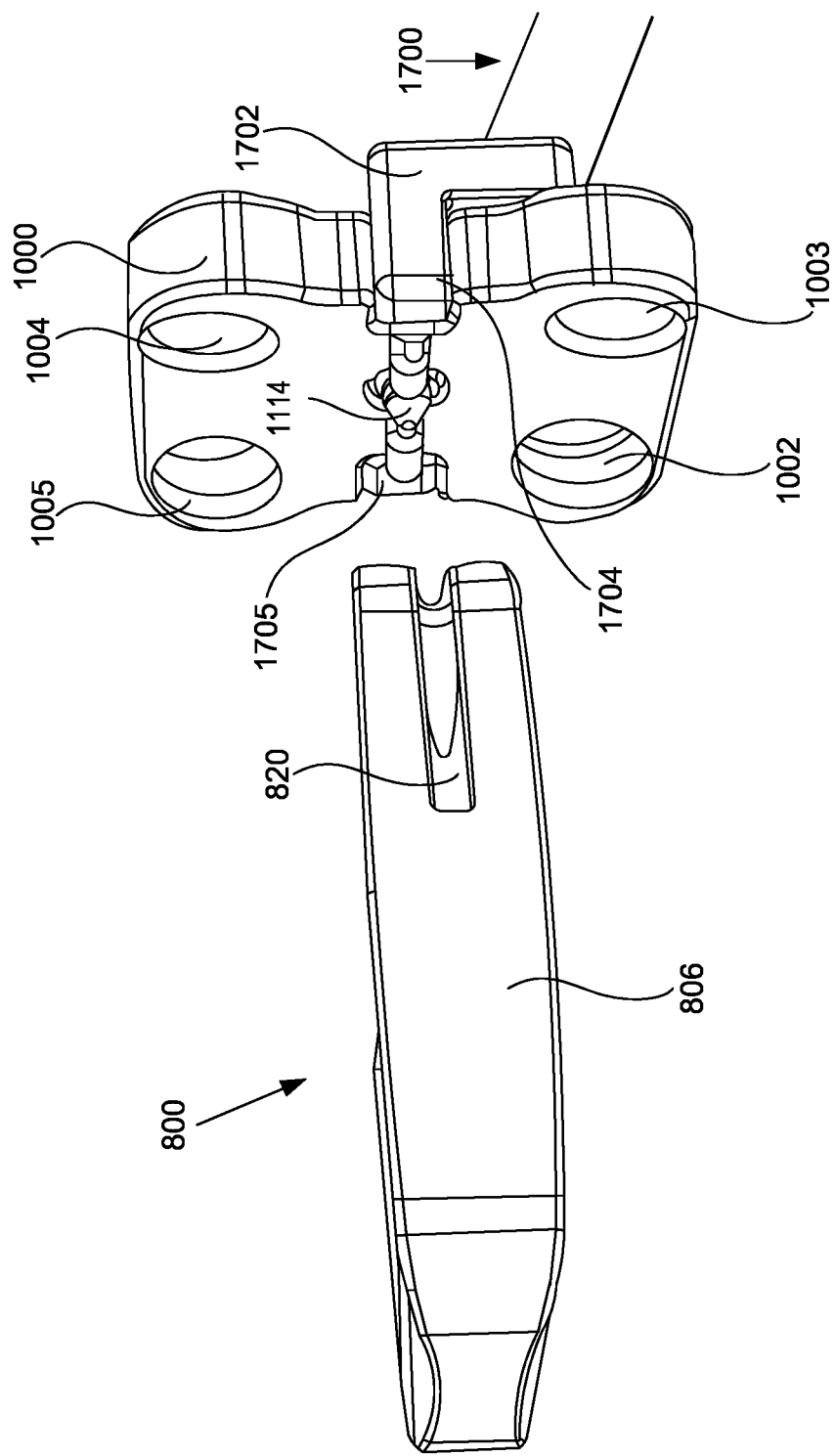
FIG. 44 depicts a side view of an assembled combination of an inserter and an interbody plate, and an interbody cage, according to FIG. 43.

In another method of installing the cage 800 and plate 1000, as illustrated in FIGS. 43 and 44, the cage 800 can first be inserted into the spine using a freehand inserter (not shown). After the cage 800 has been inserted into the desired position relative to the spine (not shown), using an inserter 1700. The inserter may include a guide plate 1702 which includes a pair of guide posts 1704 and 1705 extending from the distal end of the guide plate 1702.

The pair of guide post are configured to be received by and engage with the pair of grooves 1008 and 1010 of the plate 1000, enabling a user to secure and stabilize the plate 1000 with respect to the inserter 1700 during insertion of the plate 1000 into the spine of a patient. The central screw 1114 may also be used to secure the plate to the guide plate 1702 of the inserter 1700. After the plate 1000 is firmly secured to the guide plate 1702, the plate 1000 can then be positionally manipulated with the inserter 1700 such that a user can position the plate 1000, with respect to the spine and the cage 800, in a desired position, and then the user can use fasteners (not shown) to secure the plate to the spine, as discussed above with respect to other similar embodiments.

Once the cage 800 and plate 1000 are positioned properly into the spine of the patient, the inserter 1700 can then be disengaged from the plate 1000 and removed.

Figure 45:
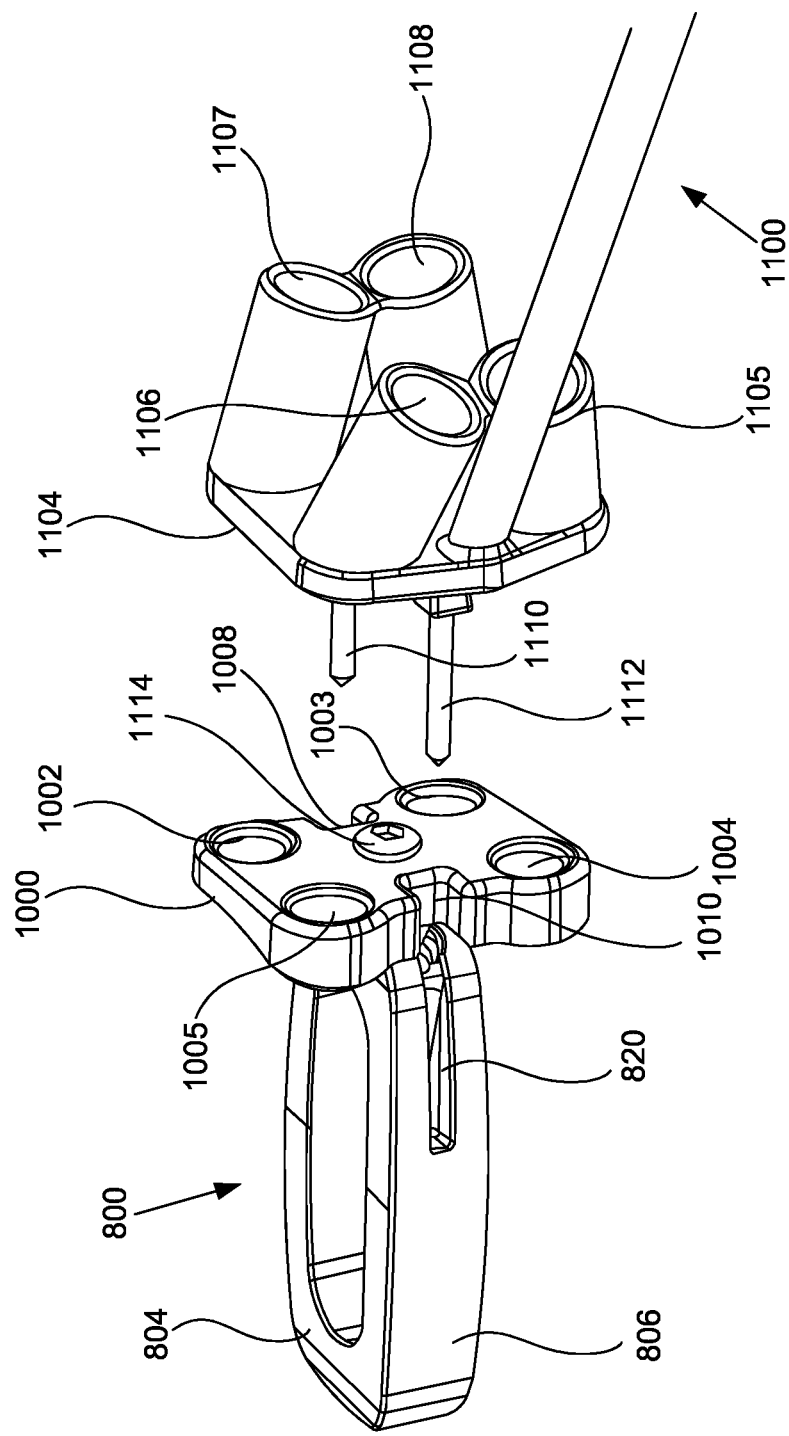
FIG. 45 depicts a perspective view of an assembled combination of an interbody plate and an interbody cage, and an elongated guide member according to another embodiment of the present disclosure.
Figure 46:
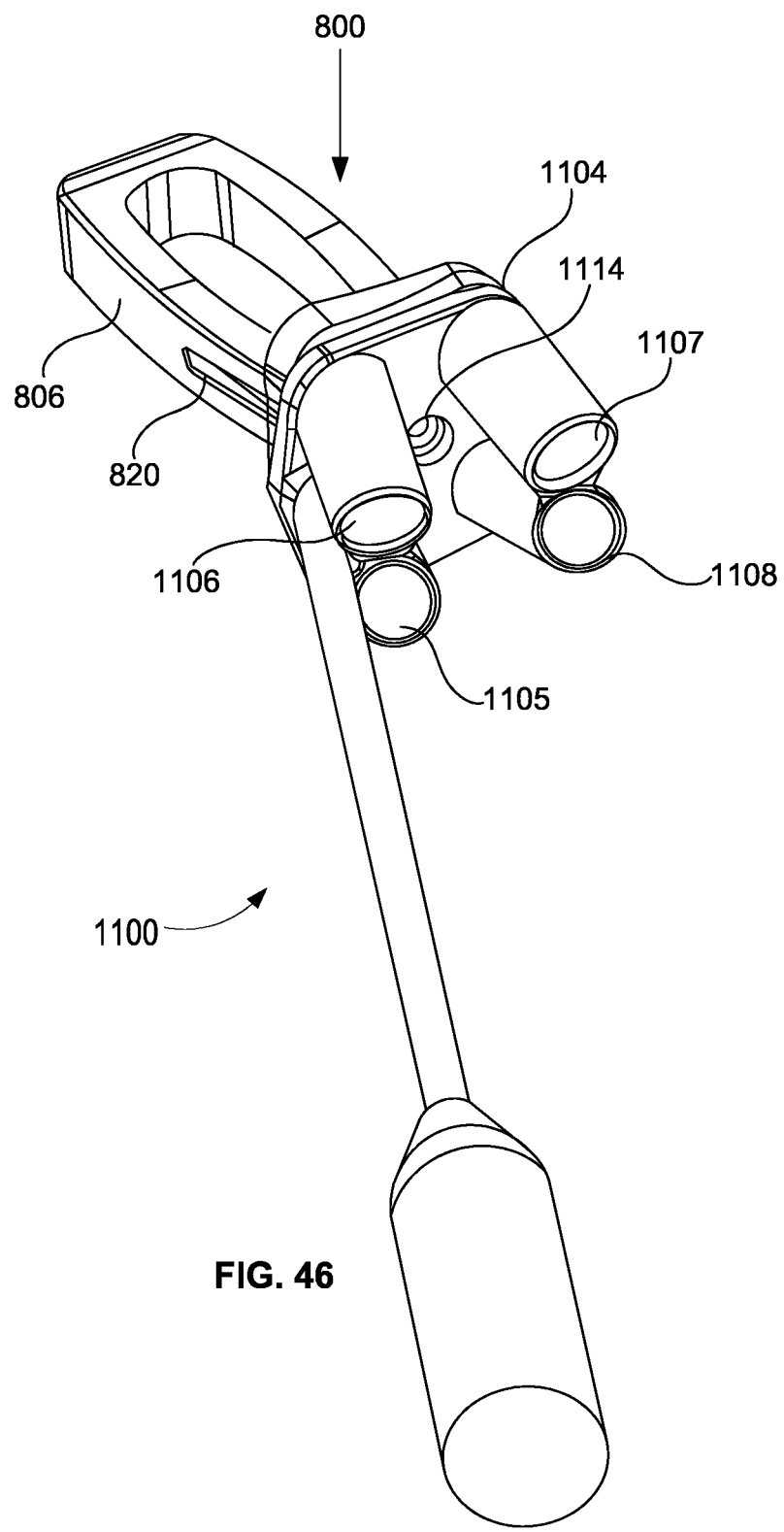
FIG. 46 depicts a perspective view of an assembled combination of the elongated guide member, the interbody plate and the interbody cage according to FIG. 45.

In another method of installing the cage 800 and plate 1000, as illustrated in FIGS. 45 and 46, the cage 800 and plate 1000 can first be secured together via the central screw 1114 inserted into the spine using a freehand inserter (not shown). Using this method, the relative positioning of the cage 800 with respect to the plate 1000 be firmly secured, before either of the cage 800 or plate 1000 are inserted into the spine of the patient.

Once the cage 800 and plate 1000 have been secured together, the elongated guide member 1100 can be used to manipulate and position the cage 800 and plate 1000 into the desired position in the spine (not shown) of the patient. The drill guide 1104 of the elongated guide member 1100 can engage the cage 800 and plate 1000 via the guide posts 1110 and 1112 which mate and engage with the grooves 820 and 822 of the cage and grooves 1008 and 1010 of the plate 1000. The engagement of the guide posts 1110 and 1112 with the cage 800 and plate 1000 add stability and restricts the rotational and lateral motion of the cage 800 and plate 1000 with respect to the drill guide 1104 while the cage 800 and plate 1000 are inserted into the spine of the patient, which give the user or surgeon increased maneuverability of the cage 800 and plate 1000.

Once the cage 800 and plate 1000 have been properly positioned in the spine, the user or surgeon can utilize the guide holes 1005-1008 to properly drill and secure fasteners (not shown) through the holes 10002-1005 of the plate 1000 and into the adjacent vertebrae (not shown) as described above with respect to other methods and embodiments.

After the cage 800 and plate 1000 are positioned and secured properly into the spine of the patient, the elongated guide member 1100 can then be disengaged from the cage and plate 1000 and removed.

The above method of securing the cage 800 and plate 1000 together before insertion in the spine can also be used with different cage and plate embodiments disclosed above, having the same or similar benefits and advantages.

Those having ordinary skill in the relevant art will appreciate the advantages provided by the features of the present disclosure. For example, it is a feature of the present disclosure to provide a spinal plate selection and positioning system. Another feature of the present disclosure is to provide a guide member that removably attaches to an interbody cage, the guide member aligning and positioning an interbody plate and drill guide. It is a further feature of the present disclosure, in accordance with one aspect thereof, to provide an interbody cage with grooves in its superior and inferior surfaces for allowing passage of fasteners utilized to secure an interbody plate.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Additional Specification Support

Embodiment 1. A method for stabilizing a spine, the spine having a first vertebra and a second vertebra, the first vertebra and the second vertebra being adjacent and defining a disc space between them, said method including:

installing an interbody cage in the disc space between the first vertebra and the second vertebra, using an elongated guide member removably secured to the interbody cage;

aligning and positioning an interbody plate over the interbody cage using the elongated guide member removably secured to the interbody plate;

securing the interbody plate to at least one of the first vertebra and the second vertebra; and removing the elongated guide member from the interbody cage and the interbody plate.

Embodiment 2. The method of embodiment 1, wherein said aligning and positioning the interbody plate, further including:

inserting a portion of the elongated guide member, into the interbody cage.

Embodiment 3. The method of embodiment 2, wherein the elongated guide member includes a drill guide having a plurality of guide tubes that extend through the drill guide.

Embodiment 4. The method of embodiment 3, wherein the plurality of guide tubes extend through the drill guide at fixed angles.

Embodiment 5. The method of embodiment 2, wherein the portion of the elongated guide member includes a first leg and a second leg extending from a distal end of the drill guide.

Embodiment 6. The method of embodiment 2, wherein the interbody cage includes at least one opening configured to receive to receive the portion of the elongated guide member.

Embodiment 7. The method of embodiment 6, wherein the at least one opening of the interbody cage is a first groove.

Embodiment 8. The method of embodiment 6, wherein the at least one opening of the interbody cage includes a first groove and a second groove, wherein the first groove and the second groove are formed in opposite lateral sides of the interbody cage.

Embodiment 9. The method of embodiment 1, wherein the elongated guide member includes a first shaft and a second shaft, wherein the first shaft is proximal to the second shaft and wherein the first shaft is fixed to the second shaft forming an obtuse angle.

Embodiment 10. The method of embodiment 9, wherein a drill guide is fixed to a distal end of the second shaft.

Embodiment 11. The method of embodiment 9, wherein the first shaft includes a slot configured to receive at least a portion of a drill.

Embodiment 12. The method of embodiment 3, further including drilling pilot holes in the first vertebra and the second vertebra using the drill guide.

Embodiment 13. The method of embodiment 11, further including drilling pilot holes in the first vertebra and the second vertebra using the drill guide, wherein a portion of a drill extends through the slot in the first shaft of the elongated guide member.

Embodiment 14. The method of embodiment 13, further including securing the interbody plate to the first vertebra and the second vertebra using the guide tubes of the drill guide to guide fasteners into the pilot holes.

Embodiment 15. A method for stabilizing a spine, the spine having a first vertebra and a second vertebra, the first vertebra and the second vertebra being adjacent and defining a disc space between them, said method including:

removably securing an interbody plate and an interbody cage to an elongated guide member;

installing the interbody cage in the disc space between the first vertebra and the second vertebra, and installing the interbody plate over the interbody cage, using the elongated guide member;

securing the interbody plate to at least one of the first vertebra and the second vertebra; and removing the elongated guide member from the interbody cage and the interbody plate.

Embodiment 16. The method of embodiment 15, wherein said aligning and positioning the interbody plate, further including:

inserting a portion of the elongated guide member, into the interbody cage.

Embodiment 17. The method of embodiment 16, wherein the elongated guide member includes a drill guide having a plurality of guide tubes that extend through the drill guide.

Embodiment 18. The method of embodiment 17, wherein the plurality of guide tubes extend through the drill guide at fixed angles.

Embodiment 19. The method of embodiment 16, wherein the portion of the elongated guide member includes a first leg and a second leg extending from a distal end of the drill guide.

Embodiment 20. The method of embodiment 16, wherein the interbody cage includes at least one opening configured to receive to receive the portion of the elongated guide member.

Embodiment 21. The method of embodiment 20, wherein the at least one opening of the interbody cage is a first groove.

Embodiment 22. The method of embodiment 20, wherein the at least one opening of the interbody cage includes a first groove and a second groove, wherein the first groove and the second groove are formed in opposite lateral sides of the interbody cage.

Embodiment 23. The method of embodiment 15, wherein the elongated guide member includes a first shaft and a second shaft, wherein the first shaft is proximal to the second shaft and wherein the first shaft is fixed to the second shaft forming an obtuse angle.

Embodiment 24. The method of embodiment 23, wherein a drill guide is fixed to a distal end of the second shaft.

Embodiment 25. The method of embodiment 23, wherein the first shaft includes a slot configured to receive at least a portion of a drill.

Embodiment 26. The method of embodiment 17, further including drilling pilot holes in the first vertebra and the second vertebra using the drill guide.

Embodiment 27. The method of embodiment 25, further including drilling pilot holes in the first vertebra and the second vertebra using the drill guide, wherein a portion of a drill extends through the slot in the first shaft of the elongated guide member.

Embodiment 28. The method of embodiment 27, further including securing the interbody plate to the first vertebra and the second vertebra using the guide tubes of the drill guide to guide fasteners into the pilot holes.

Embodiment 29. A system for fusing a first vertebra and a second vertebra of a spinal column, the first vertebra and second vertebra defining a disc space, said system including:

an interbody cage having a proximal end, a distal end and a pair of lateral sides, each of the lateral sides having an opening, and the interbody cage configured and dimensioned to fit within the disc space;

an elongated guide member having a shaft, wherein a first leg and a second leg extend from a distal end of the shaft;

wherein the elongated guide member is removably attachable to the interbody cage, by engagement of the first leg and the second leg of the elongated guide member with the openings on the lateral sides of the interbody cage; and an interbody plate having at least one bore configured to receive fastener which can removeably attach the interbody plate to the elongated guide member.

Embodiment 30. The system of embodiment 29, wherein the shaft includes a first shaft and a second shaft, wherein the second shaft extends from a distal end of the first shaft, and wherein the first shaft includes a slot that is configured to receive at least a portion of a drill.

Embodiment 31. The system of embodiment 30, wherein the slot on the first shaft extends a majority of the total length of the first shaft.

Embodiment 32. The system of embodiment 29, wherein the interbody plate includes a plurality of holes for receiving fasteners such that the interbody plate is securable to the first vertebra and the second vertebra.

Embodiment 33. The system of embodiment 29, wherein the elongated guide member includes a drill guide having a plurality of guide tubes that extend through the drill guide.

Embodiment 34. The system of embodiment 33, wherein the plurality of guide tubes extend through the drill guide at fixed angles.

Embodiment 35. The system of embodiment 29, wherein the openings on the pair of lateral sides of the interbody plate are grooves.

Embodiment 36. An elongated guide member for positioning and aligning an interbody plate and an interbody cage for fusing a first vertebra and a second vertebra of a spinal column, the elongated guide member including:

a first shaft and a second shaft, wherein the second shaft extends from a distal end of the first shaft, a drill guide extending from a distal end of the second shaft, wherein the drill guide is configured to be removably attachable to the interbody plate;

a first leg and a second leg extending from a distal end of the drill guide;

wherein the first leg and the second leg are configured to be removably attachable to the interbody cage;

wherein the first shaft of the elongated guide member includes a slot that is configured to receive at least a portion of a drill.

Embodiment 37. The elongated guide member of embodiment 36, wherein the drill guide includes a plurality of guide tubes that extend through the drill guide.

Embodiment 38. The elongated guide member of embodiments 36, wherein the first shaft is fixed to the second shaft forming an obtuse angle.

Embodiment 39. The elongated guide member of embodiment 36, where in the slot in the first shaft extends a majority of the total length of the first shaft.

Embodiment 40. A method for stabilizing a spine, the spine having a first vertebra and a second vertebra, the first vertebra and the second vertebra being adjacent and defining a disc space between them, said method including:

securing an interbody cage to an interbody plate;

installing the interbody cage in the disc space between the first vertebra and the second vertebra, while simultaneously positioning the interbody plate over the interbody cage, using an elongated guide member removably secured to the interbody cage and the interbody plate;
  securing the interbody plate to at least one of the first vertebra and the second vertebra; and
  removing the elongated guide member from the interbody cage and the interbody plate.

Embodiment 41. The method of embodiment 40, wherein said positioning the interbody plate, further including: inserting a portion of the elongated guide member, into the interbody cage.

Embodiment 42. The method of embodiment 41, wherein the elongated guide member includes a drill guide having a plurality of guide tubes that extend through the drill guide.

Embodiment 43. The method of embodiment 42, wherein the plurality of guide tubes extend through the drill guide at fixed angles.

Embodiment 44. The method of embodiment 41, wherein the portion of the elongated guide member includes a first leg and a second leg extending from a distal end of the drill guide.

Embodiment 45. The method of embodiment 41, wherein the interbody cage includes at least one opening configured to receive to receive the portion of the elongated guide member.

Embodiment 46. The method of embodiment 45, wherein the at least one opening of the interbody cage is a first groove.

Embodiment 47. The method of embodiment 45, wherein the at least one opening of the interbody cage includes a first groove and a second groove, wherein the first groove and the second groove are formed in opposite lateral sides of the interbody cage.

Embodiment 48. The method of embodiment 40, wherein the elongated guide member includes a first shaft and a second shaft, wherein the first shaft is proximal to the second shaft and wherein the first shaft is fixed to the second shaft forming an obtuse angle.

Embodiment 49. The method of embodiment 48, wherein a drill guide is fixed to a distal end of the second shaft.

Embodiment 50. The method of embodiment 48, wherein the first shaft includes a slot configured to receive at least a portion of a drill.

Embodiment 51. The method of embodiment 42, further including drilling pilot holes in at least one of the first vertebra and the second vertebra using the drill guide.

Embodiment 52. The method of embodiment 50, further including drilling pilot holes in at least one of the first vertebra and the second vertebra using the drill guide, wherein a portion of a drill extends through the slot in the first shaft of the elongated guide member.

Embodiment 53. The method of embodiment 52, further including securing the interbody plate to at least one of the first vertebra and the second vertebra using the guide tubes of the drill guide to guide fasteners into the pilot holes.

Embodiment 54. A method for stabilizing a spine, the spine having a first vertebra and a second vertebra, the first vertebra and the second vertebra being adjacent and defining a disc space between them, said method including:
  installing an interbody cage in the disc space between the first vertebra and the second vertebra, using an elongated guide member removably secured to the interbody cage;
  aligning and positioning an interbody plate over the interbody cage using the elongated guide member removably secured to the interbody plate, by inserting a portion of the elongated guide member into the interbody cage, wherein the elongated guide member includes a drill guide having a plurality of guide tubes that extend through the drill guide at fixed angles and wherein the portion of the elongated guide member includes a first leg and a second leg extending from a distal end of the drill guide configured to be received by a first groove and a second groove formed in opposite lateral sides of the interbody cage;
  drilling pilot holes in the first vertebra and the second vertebra using the drill guide;
  securing the interbody plate to the first vertebra and the second vertebra using the guide tubes of the drill guide to guide fasteners into the pilot holes; and
  removing the elongated guide member from the interbody cage and the interbody plate,
  wherein the elongated guide member includes a first shaft and a second shaft, the first shaft being proximal to the second shaft, and the first shaft having a slot configured to receive at least a portion of a drill, wherein the first shaft is fixed to the second shaft forming an obtuse angle, and the drill guide is fixed to a distal end of the second shaft.

What is claimed is:

1. A method for stabilizing a spine, the spine having a first vertebra and a second vertebra, the first vertebra and the second vertebra being adjacent and defining a disc space between them, said method comprising:
  installing an interbody cage in the disc space between the first vertebra and the second vertebra, using an elongated guide member removably secured to the interbody cage;
  aligning and positioning an interbody plate over the interbody cage using the elongated guide member removably secured to the interbody plate;
  securing the interbody plate to at least one of the first vertebra and the second vertebra; and
  removing the elongated guide member from the interbody cage and the interbody plate,
  wherein the elongated guide member includes a first shaft and a second shaft, wherein the first shaft is proximal to the second shaft and wherein the first shaft is fixed to the second shaft forming an obtuse angle.

2. The method of claim 1, wherein said aligning and positioning the interbody plate, further comprising:
  inserting a portion of the elongated guide member, into the interbody cage.

3. The method of claim 2, wherein the elongated guide member includes a drill guide having a plurality of guide tubes that extend through the drill guide.

4. The method of claim 3, wherein the plurality of guide tubes extend through the drill guide at fixed angles.

5. The method of claim 3, further comprising drilling pilot holes in the first vertebra and the second vertebra using the drill guide.

6. The method of claim 2, wherein the portion of the elongated guide member comprises a first leg and a second leg extending from a distal end of the drill guide.

7. The method of claim 2, wherein the interbody cage includes at least one opening configured to receive to receive the portion of the elongated guide member.

8. The method of claim 7, wherein the at least one opening of the interbody cage is a first groove.

9. The method of claim 7, wherein the at least one opening of the interbody cage includes a first groove and a second groove, wherein the first groove and the second groove are formed in opposite lateral sides of the interbody cage.

10. The method of claim 1, wherein a drill guide is fixed to a distal end of the second shaft.

11. The method of claim 1, wherein the first shaft includes a slot configured to receive at least a portion of a drill.

12. The method of claim 11, further comprising drilling pilot holes in the first vertebra and the second vertebra using the drill guide, wherein a portion of a drill extends through the slot in the first shaft of the elongated guide member.

13. The method of claim 12, further comprising securing the interbody plate to the first vertebra and the second vertebra using the guide tubes of the drill guide to guide fasteners into the pilot holes.

14. A method for stabilizing a spine, the spine having a first vertebra and a second vertebra, the first vertebra and the second vertebra being adjacent and defining a disc space between them, said method comprising:
removably securing an interbody plate and an interbody cage to an elongated guide member;
installing the interbody cage in the disc space between the first vertebra and the second vertebra, and installing the interbody plate over the interbody cage, using the elongated guide member;
securing the interbody plate to at least one of the first vertebra and the second vertebra; and
removing the elongated guide member from the interbody cage and the interbody plate,
wherein the elongated guide member includes a first shaft and a second shaft, wherein the first shaft is proximal to the second shaft and wherein the first shaft is fixed to the second shaft forming an obtuse angle.

15. The method of claim 14, wherein said aligning and positioning the interbody plate, further comprising:
inserting a portion of the elongated guide member, into the interbody cage.

16. The method of claim 15, wherein the elongated guide member includes a drill guide having a plurality of guide tubes that extend through the drill guide.

17. The method of claim 16, wherein the plurality of guide tubes extend through the drill guide at fixed angles.

18. The method of claim 16, further comprising drilling pilot holes in the first vertebra and the second vertebra using the drill guide.

19. The method of claim 15, wherein the portion of the elongated guide member comprises a first leg and a second leg extending from a distal end of the drill guide.

20. The method of claim 15, wherein the interbody cage includes at least one opening configured to receive to receive the portion of the elongated guide member.

21. The method of claim 20, wherein the at least one opening of the interbody cage is a first groove.

22. The method of claim 20, wherein the at least one opening of the interbody cage includes a first groove and a second groove, wherein the first groove and the second groove are formed in opposite lateral sides of the interbody cage.

23. The method of claim 14, wherein a drill guide is fixed to a distal end of the second shaft.

24. The method of claim 14, wherein the first shaft includes a slot configured to receive at least a portion of a drill.

25. The method of claim 24, further comprising drilling pilot holes in the first vertebra and the second vertebra using the drill guide, wherein a portion of a drill extends through the slot in the first shaft of the elongated guide member.

26. The method of claim 25, further comprising securing the interbody plate to the first vertebra and the second vertebra using the guide tubes of the drill guide to guide fasteners into the pilot holes.

27. A method for stabilizing a spine, the spine having a first vertebra and a second vertebra, the first vertebra and the second vertebra being adjacent and defining a disc space between them, said method comprising:
securing an interbody cage to an interbody plate;
installing the interbody cage in the disc space between the first vertebra and the second vertebra, while simultaneously positioning the interbody plate over the interbody cage, using an elongated guide member removably secured to the interbody cage and the interbody plate;
securing the interbody plate to at least one of the first vertebra and the second vertebra; and
removing the elongated guide member from the interbody cage and the interbody plate,
wherein the elongated guide member includes a first shaft and a second shaft, wherein the first shaft is proximal to the second shaft and wherein the first shaft is fixed to the second shaft forming an obtuse angle.

28. The method of claim 27, wherein said positioning the interbody plate, further comprising:
inserting a portion of the elongated guide member, into the interbody cage.

29. The method of claim 28, wherein the elongated guide member includes a drill guide having a plurality of guide tubes that extend through the drill guide.

30. The method of claim 29, wherein the plurality of guide tubes extend through the drill guide at fixed angles.

31. The method of claim 29, further comprising drilling pilot holes in at least one of the first vertebra and the second vertebra using the drill guide.

32. The method of claim 28, wherein the portion of the elongated guide member comprises a first leg and a second leg extending from a distal end of the drill guide.

33. The method of claim 28, wherein the interbody cage includes at least one opening configured to receive to receive the portion of the elongated guide member.

34. The method of claim 33, wherein the at least one opening of the interbody cage is a first groove.

35. The method of claim 33, wherein the at least one opening of the interbody cage includes a first groove and a second groove, wherein the first groove and the second groove are formed in opposite lateral sides of the interbody cage.

36. The method of claim 27, wherein a drill guide is fixed to a distal end of the second shaft.

37. The method of claim 27, wherein the first shaft includes a slot configured to receive at least a portion of a drill.

38. The method of claim 37, further comprising drilling pilot holes in at least one of the first vertebra and the second vertebra using the drill guide, wherein a portion of a drill extends through the slot in the first shaft of the elongated guide member.

39. The method of claim 38, further comprising securing the interbody plate to at least one of the first vertebra and the second vertebra using the guide tubes of the drill guide to guide fasteners into the pilot holes.

40. A method for stabilizing a spine, the spine having a first vertebra and a second vertebra, the first vertebra and the second vertebra being adjacent and defining a disc space between them, said method comprising:

installing an interbody cage in the disc space between the first vertebra and the second vertebra, using an elongated guide member removably secured to the interbody cage;

aligning and positioning an interbody plate over the interbody cage using the elongated guide member removably secured to the interbody plate, by inserting a portion of the elongated guide member into the interbody cage, wherein the elongated guide member includes a drill guide having a plurality of guide tubes that extend through the drill guide at fixed angles and wherein the portion of the elongated guide member comprises a first leg and a second leg extending from a distal end of the drill guide configured to be received by a first groove and a second groove formed in opposite lateral sides of the interbody cage;

drilling pilot holes in the first vertebra and the second vertebra using the drill guide;

securing the interbody plate to the first vertebra and the second vertebra using the guide tubes of the drill guide to guide fasteners into the pilot holes; and removing the elongated guide member from the interbody cage and the interbody plate, wherein the elongated guide member includes a first shaft and a second shaft, the first shaft being proximal to the second shaft, and the first shaft having a slot configured to receive at least a portion of a drill, wherein the first shaft is fixed to the second shaft forming an obtuse angle, and the drill guide is fixed to a distal end of the second shaft.

* * * * *